United States Patent [19]

Hill et al.

[11] 4,194,685

[45] Mar. 25, 1980

[54] VERIFYING INSERTION SYSTEM APPARATUS AND METHOD OF OPERATION

[75] Inventors: James E. Hill, Prospect Heights; Baesley I. Dahlstrom, Des Plaines; Robert D. Fisher, Melrose Park, all of Ill.

[73] Assignee: Dynetics Engineering Corp., Wheeling, Ill.

[21] Appl. No.: 832,001

[22] Filed: Sep. 9, 1977

Related U.S. Application Data

[60] Continuation-in-part of Ser. No. 768,446, Feb. 14, 1977, abandoned, which is a division of Ser. No. 615,112, Sep. 19, 1975, Pat. No. 4,034,210.

[30] Foreign Application Priority Data

Sep. 17, 1976 [CA] Canada .................................. 261445
Sep. 20, 1976 [GB] United Kingdom .............. 38812/76

[51] Int. Cl.² ........................ G06F 15/20; B65B 1/00; B41F 13/56
[52] U.S. Cl. ............................... 235/375; 53/266 A; 270/20
[58] Field of Search ................... 53/31, 29, 206, 266; 235/375, 475, 448, 487, 490, 437, 449, 454, 424; 283/58; 23/253 R; 360/53; 197/197; 270/20

[56] References Cited

U.S. PATENT DOCUMENTS

| 3,371,466 | 3/1968 | Klopfenstein | 53/206 |
|---|---|---|---|
| 3,484,097 | 12/1969 | Jory | 270/52 |
| 3,508,702 | 4/1970 | Kaiser | 229/71 |
| 3,704,015 | 11/1972 | Holovka | 270/52 |
| 3,800,124 | 3/1974 | Walsa | 235/449 |
| 3,804,226 | 4/1974 | Ellis | 400/531 |
| 3,819,173 | 6/1974 | Anderson | 270/54 |
| 3,848,112 | 11/1974 | Weichselbaum | 235/449 |
| 3,870,867 | 3/1975 | Hamisch | 235/491 |
| 3,891,492 | 6/1975 | Watson | 235/454 |
| 3,896,606 | 7/1975 | Vtsumi | 53/266 |
| 3,899,165 | 8/1975 | Abram | 270/54 |
| 3,899,381 | 8/1975 | O'Brien | 156/204 |
| 3,909,203 | 9/1975 | Young | 23/253 R |
| 3,941,308 | 3/1976 | Di Girolomo | 53/31 |
| 3,951,251 | 4/1976 | Zaccagnino | 400/580 |
| 3,961,781 | 6/1976 | Funk | 270/20 |
| 3,965,644 | 6/1976 | Stocker | 53/457 |
| 3,982,102 | 9/1976 | Cidade | 235/375 |
| 3,999,700 | 12/1976 | Chalmers | 229/68 |
| 4,003,183 | 1/1977 | Helm | 53/31 |
| 4,027,141 | 5/1977 | Dubbe | 360/53 |
| 4,091,268 | 5/1978 | Jarleton | 235/424 |

Primary Examiner—Robert M. Kilgore
Attorney, Agent, or Firm—Dulin, Thienpont, Potthast & Synder, Ltd.

[57] ABSTRACT

Apparatus and method of verification of credit cards, including sensing information thereon and comparing said information with information on a specially designed pre-printed carrier, followed by insertion of one or more cards in the matching carrier as required, folding and stacking card-inserted carriers in a manner ready for subsequent insertion into mailing envelopes. Sensing, input, comparison logic, and timed command circuitry for coordination of operation includes a pause mode of card advance and may optionally include a multiple card search mode to find matching cards when card sequence is improper.

58 Claims, 41 Drawing Figures

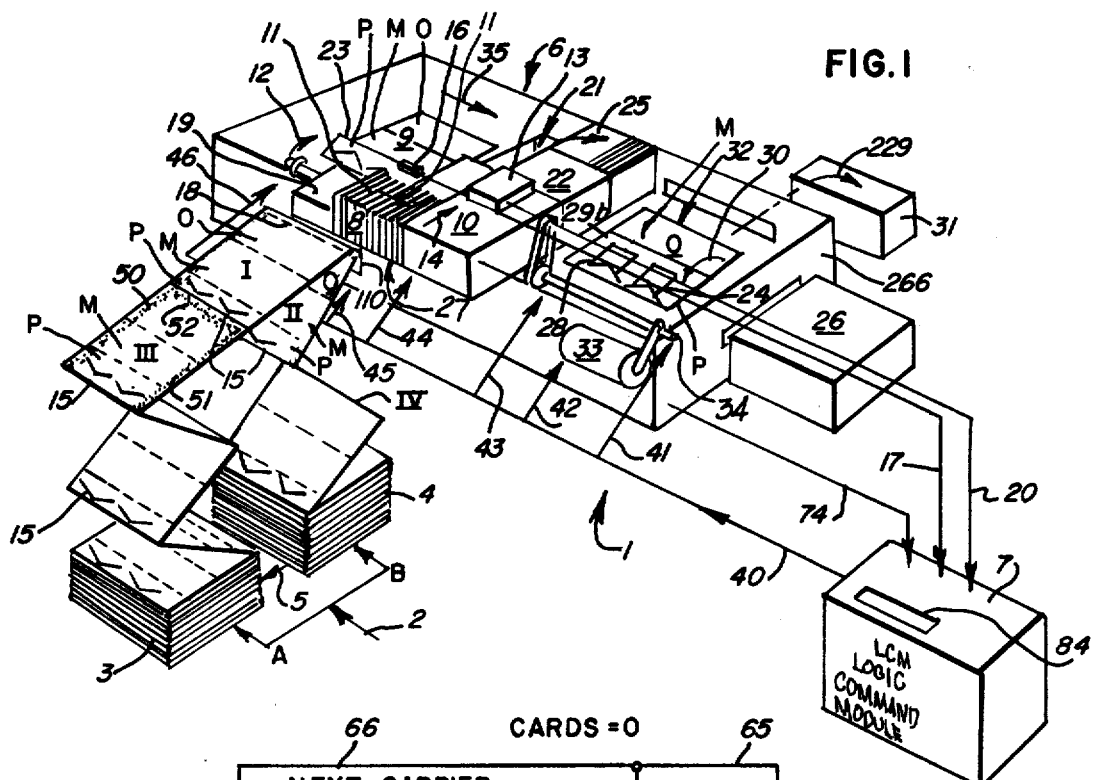

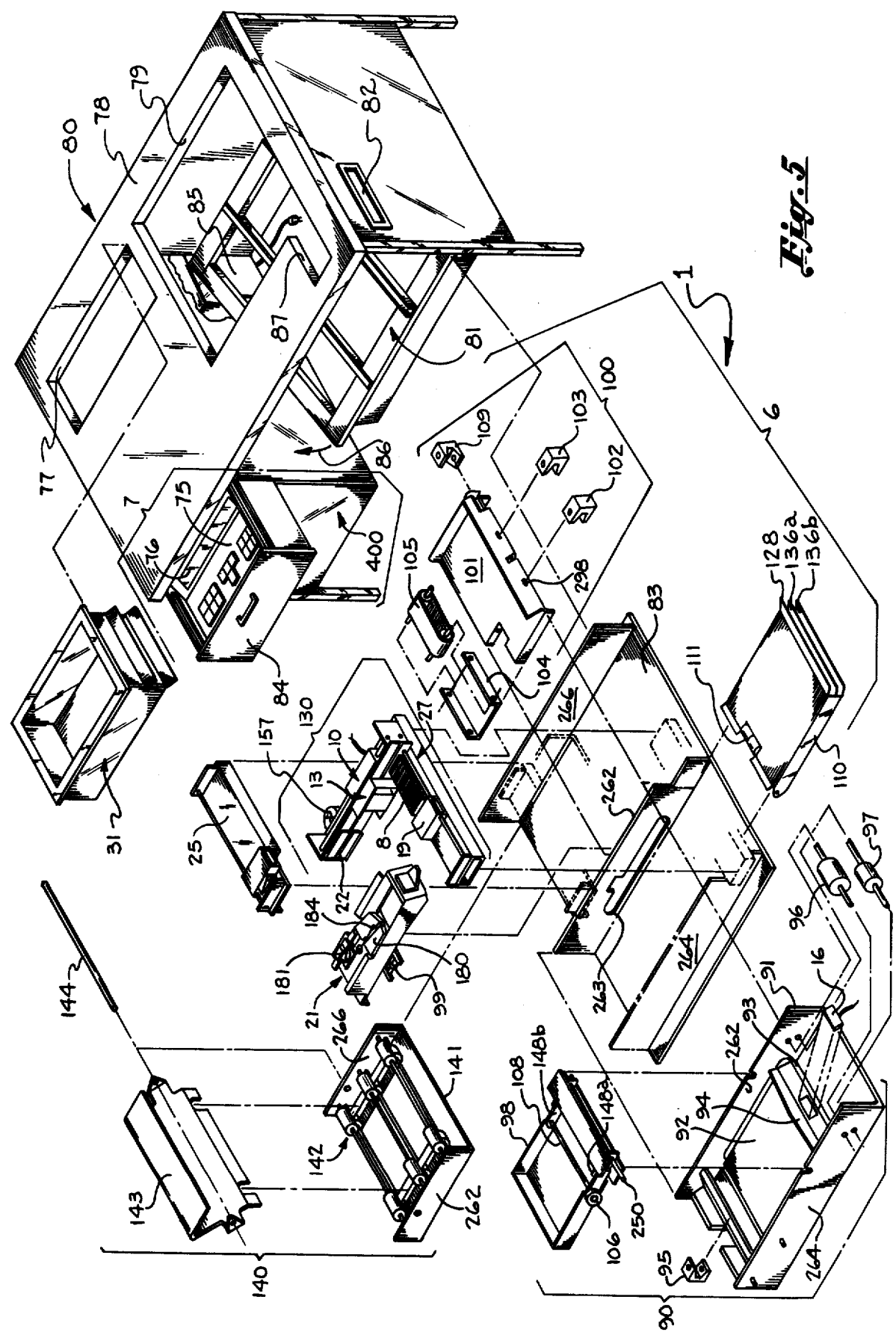

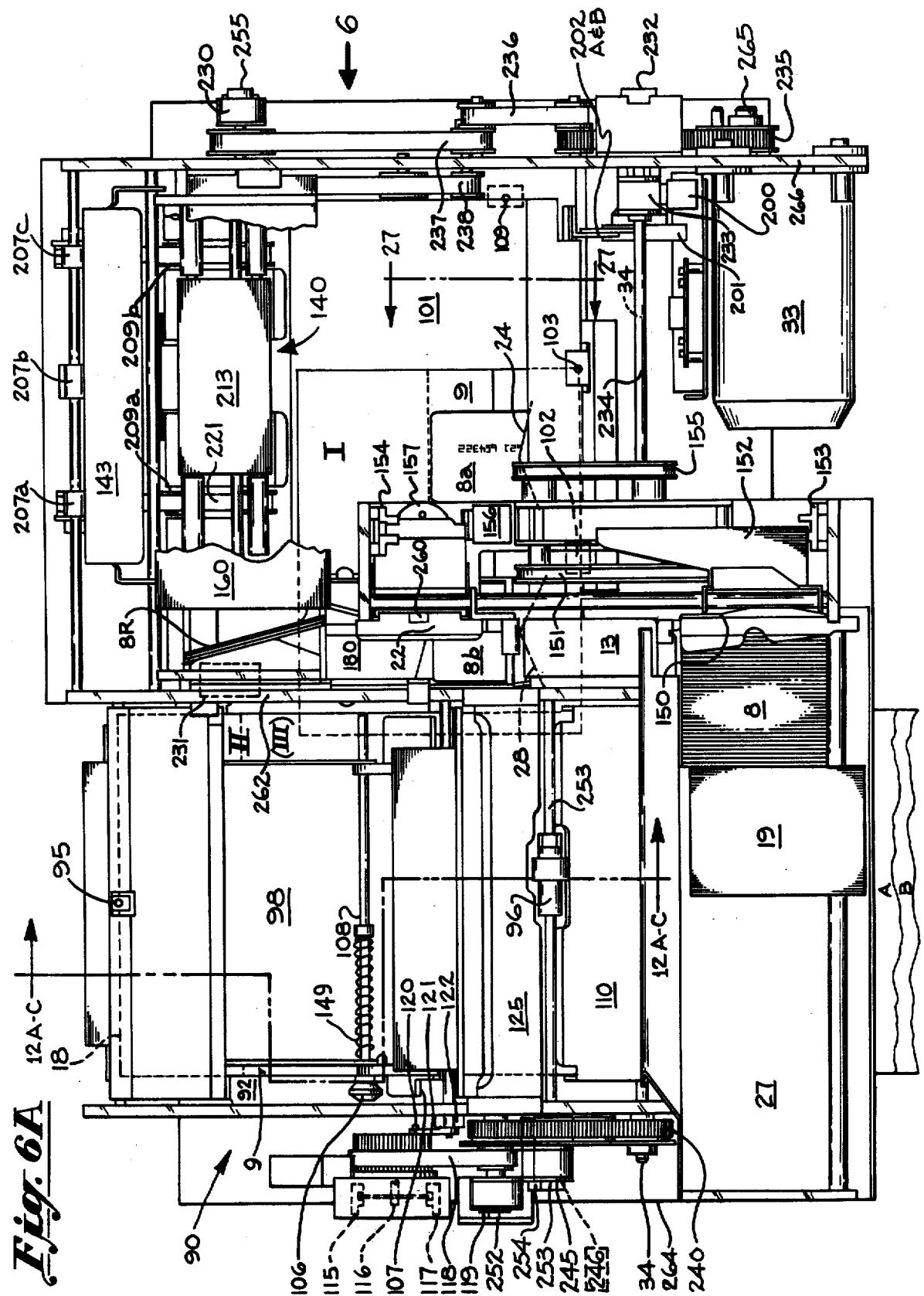

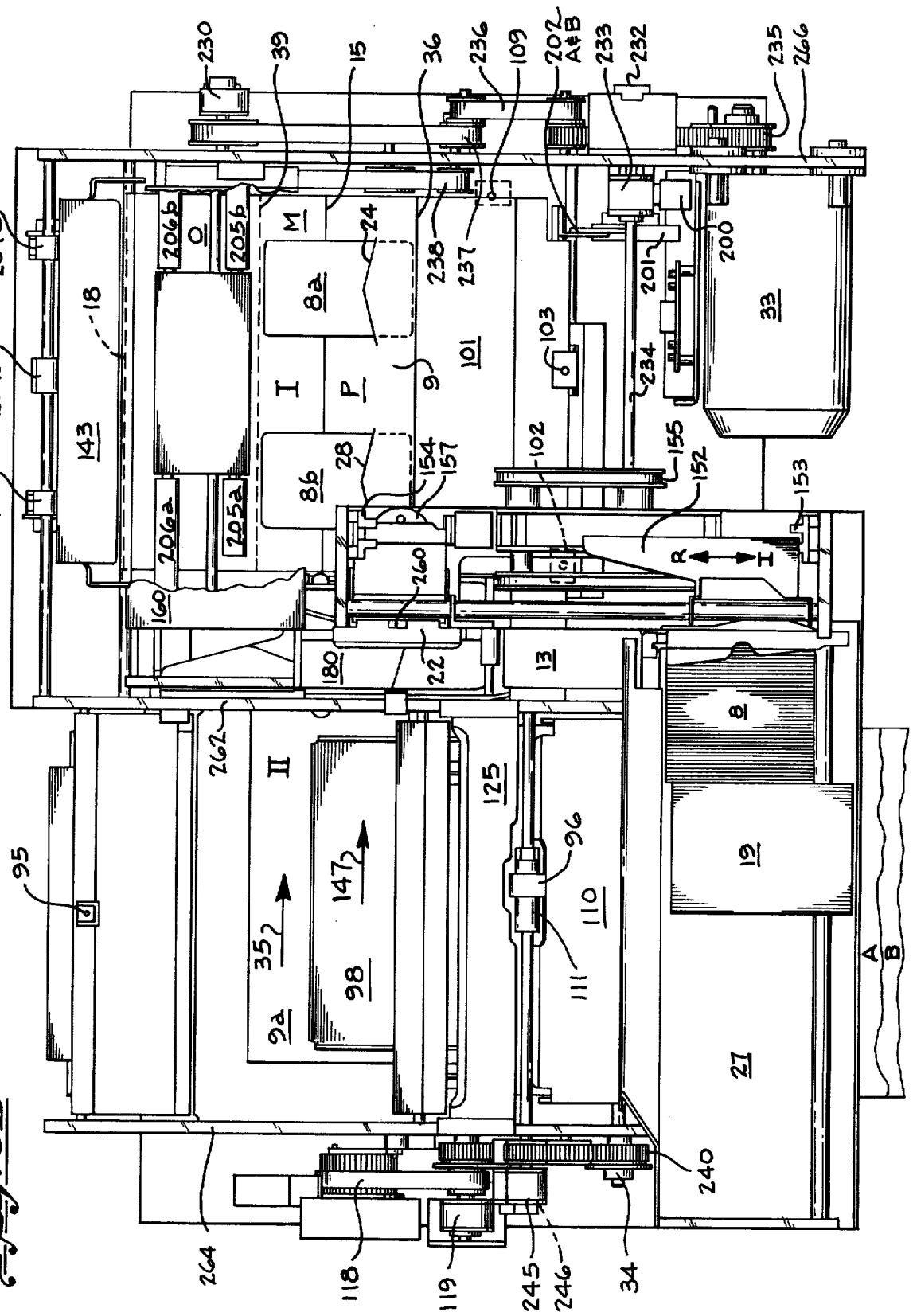

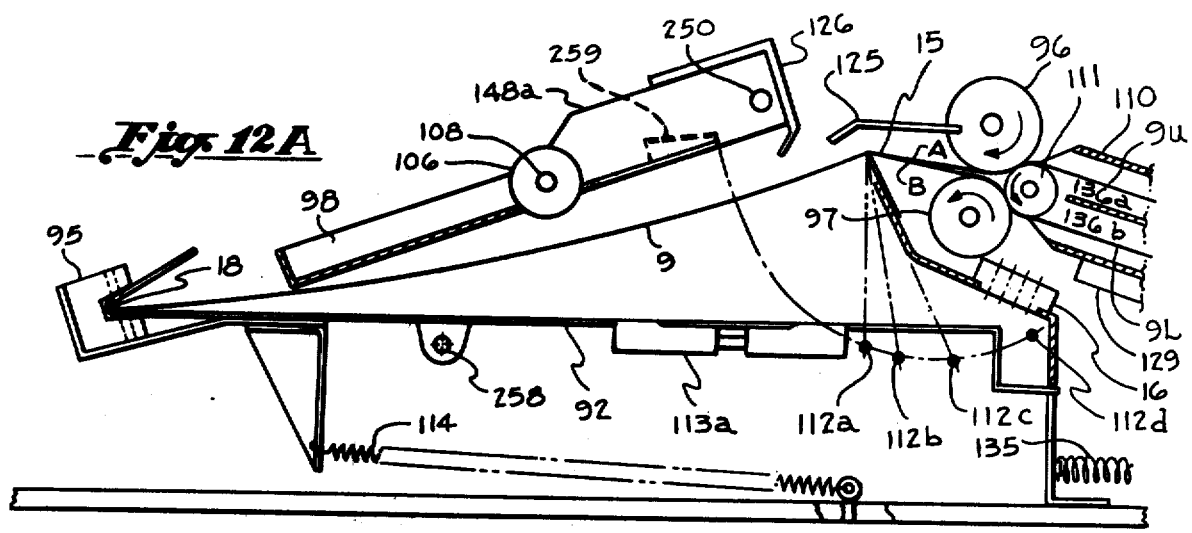
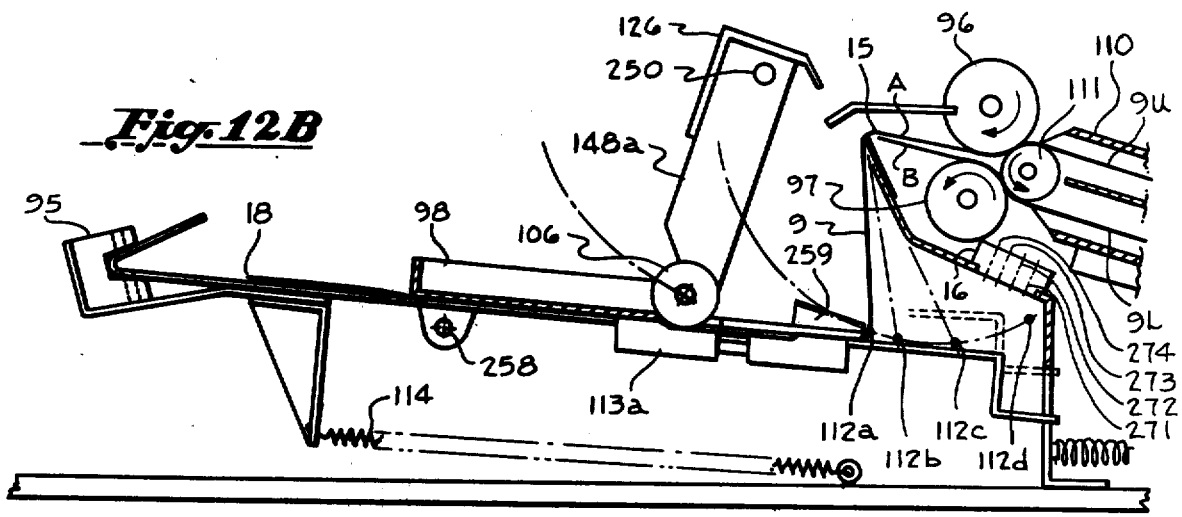
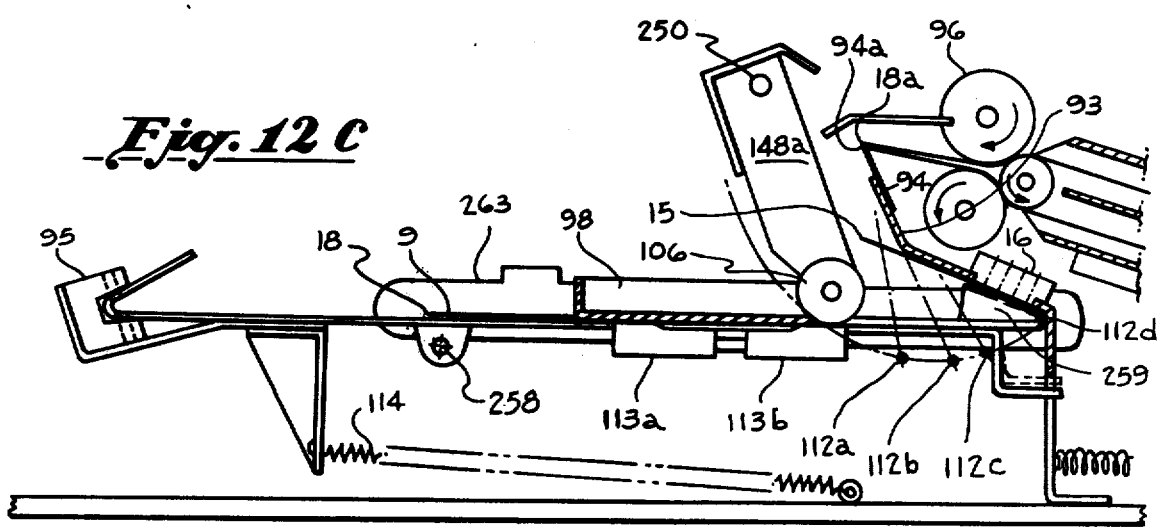

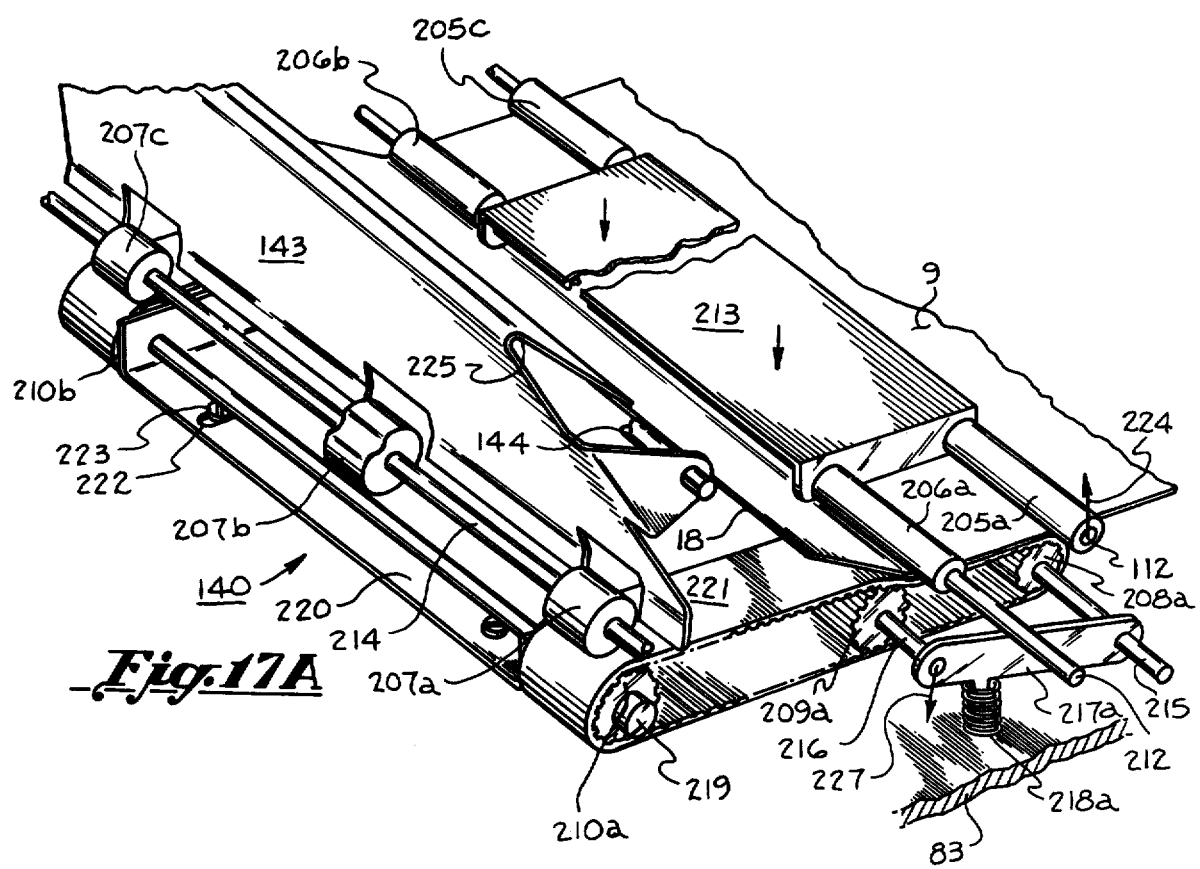
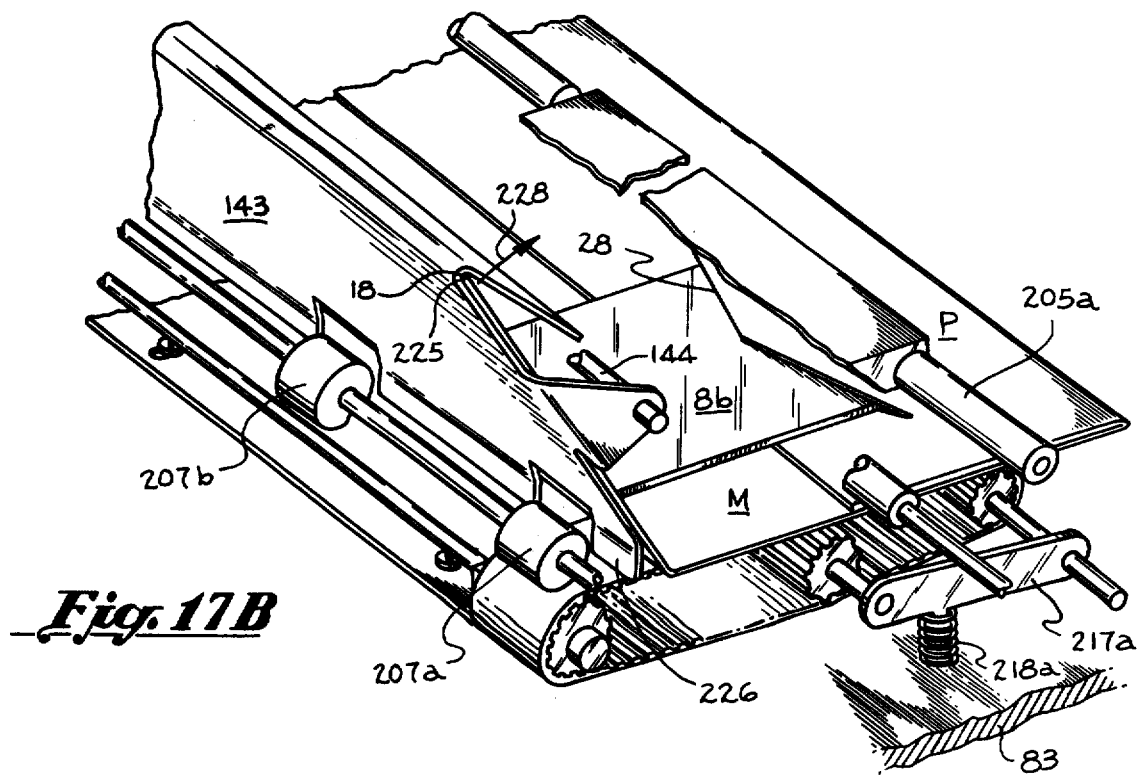

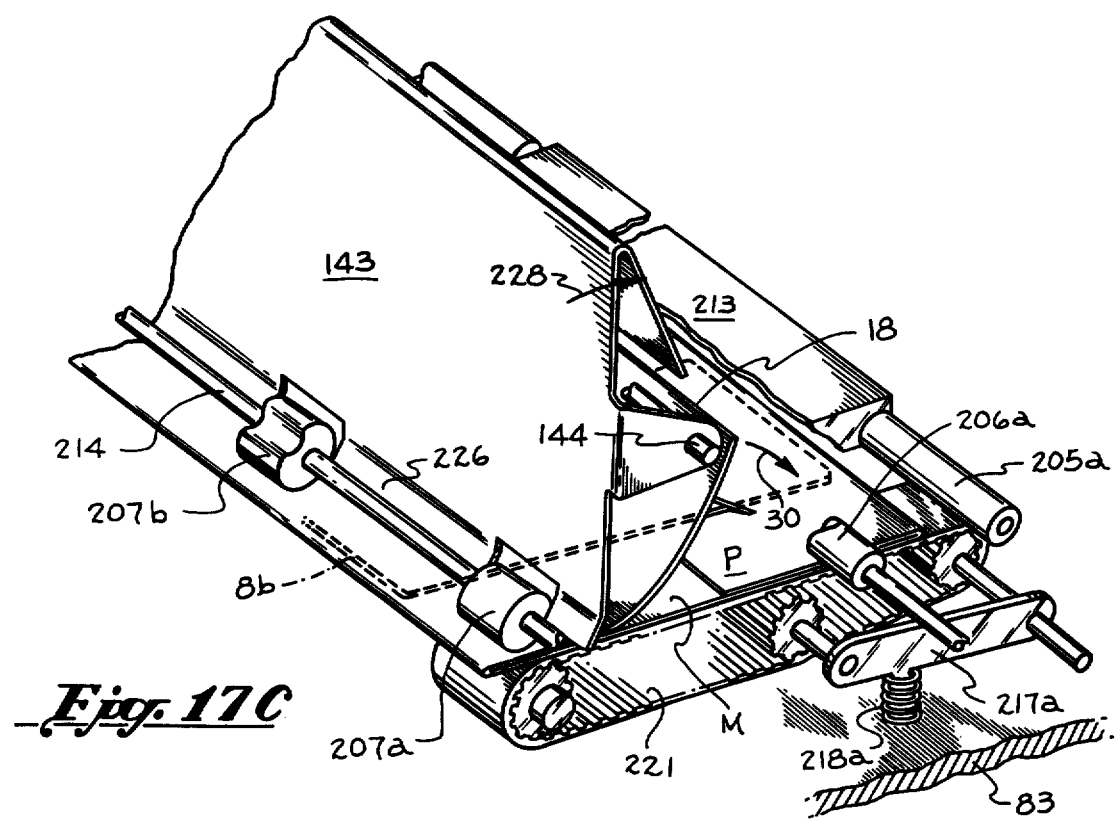
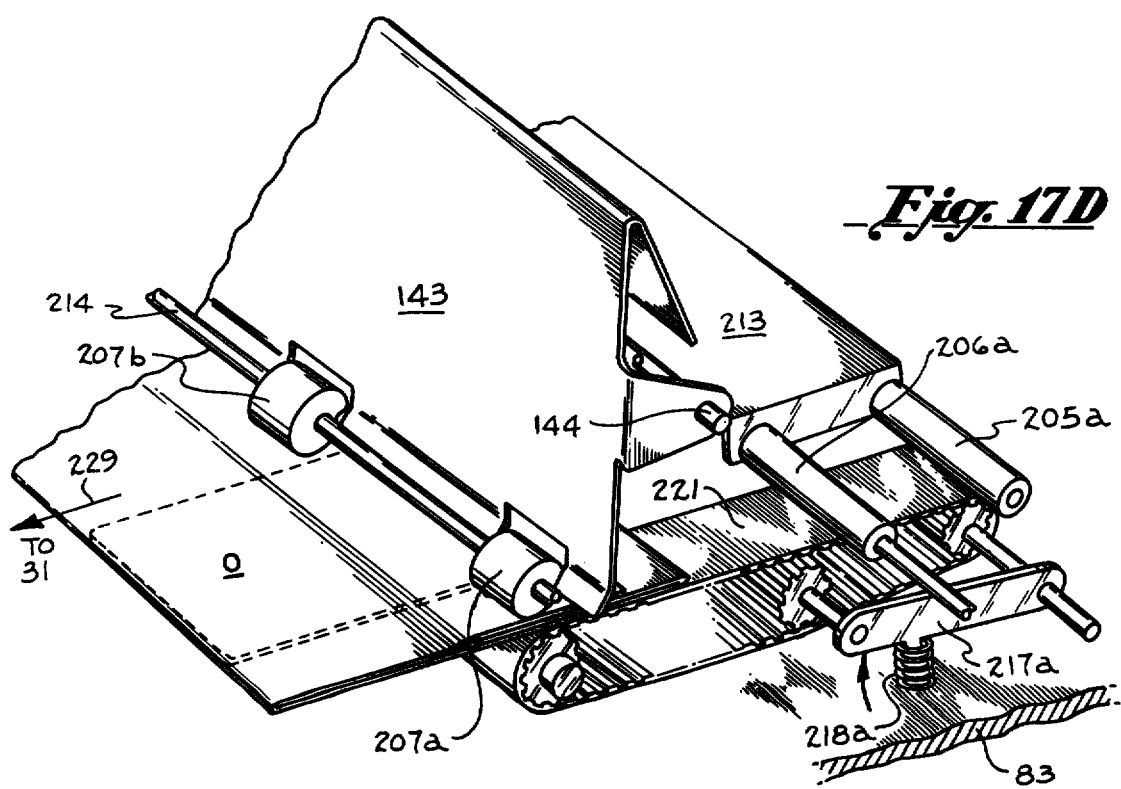

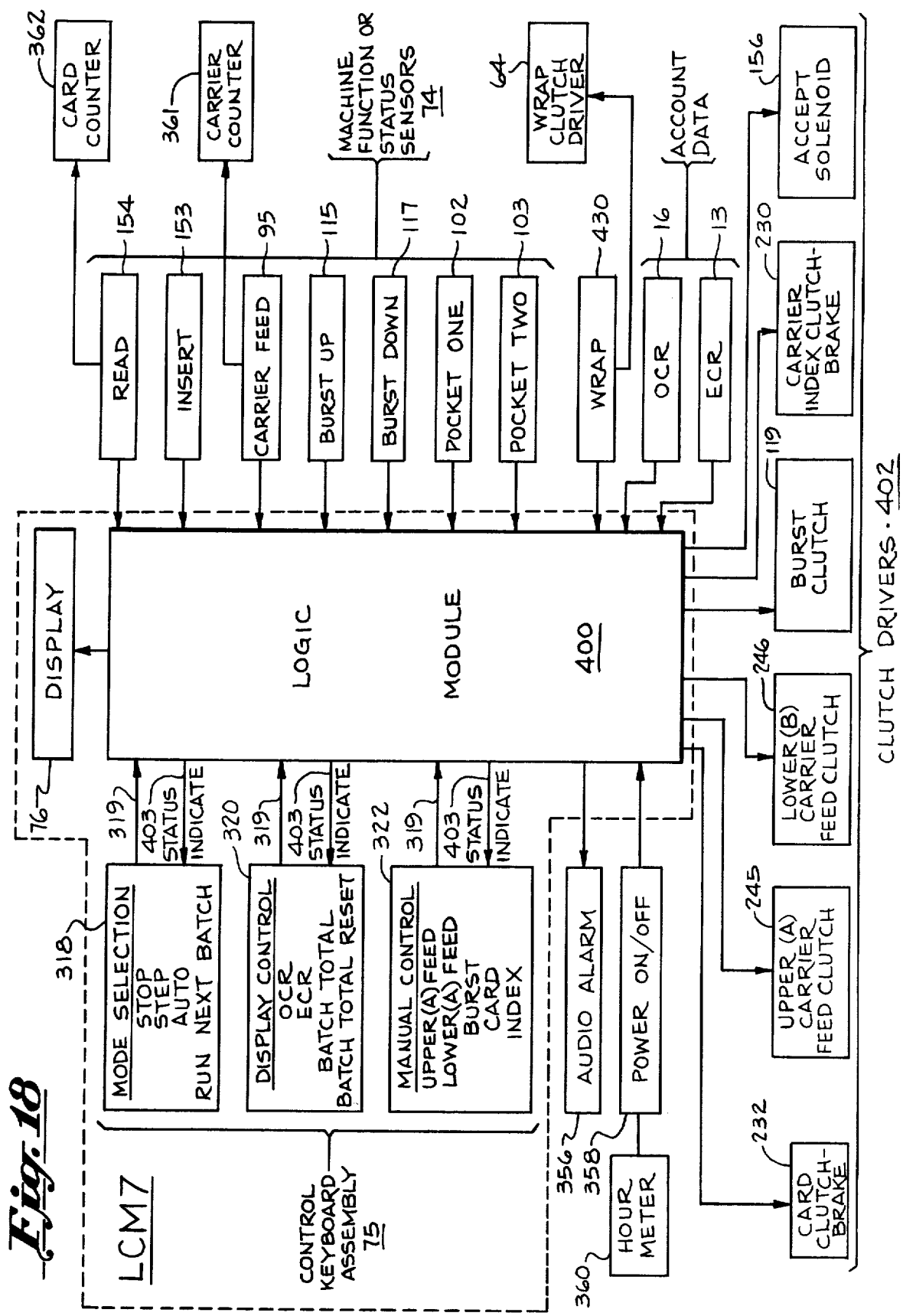

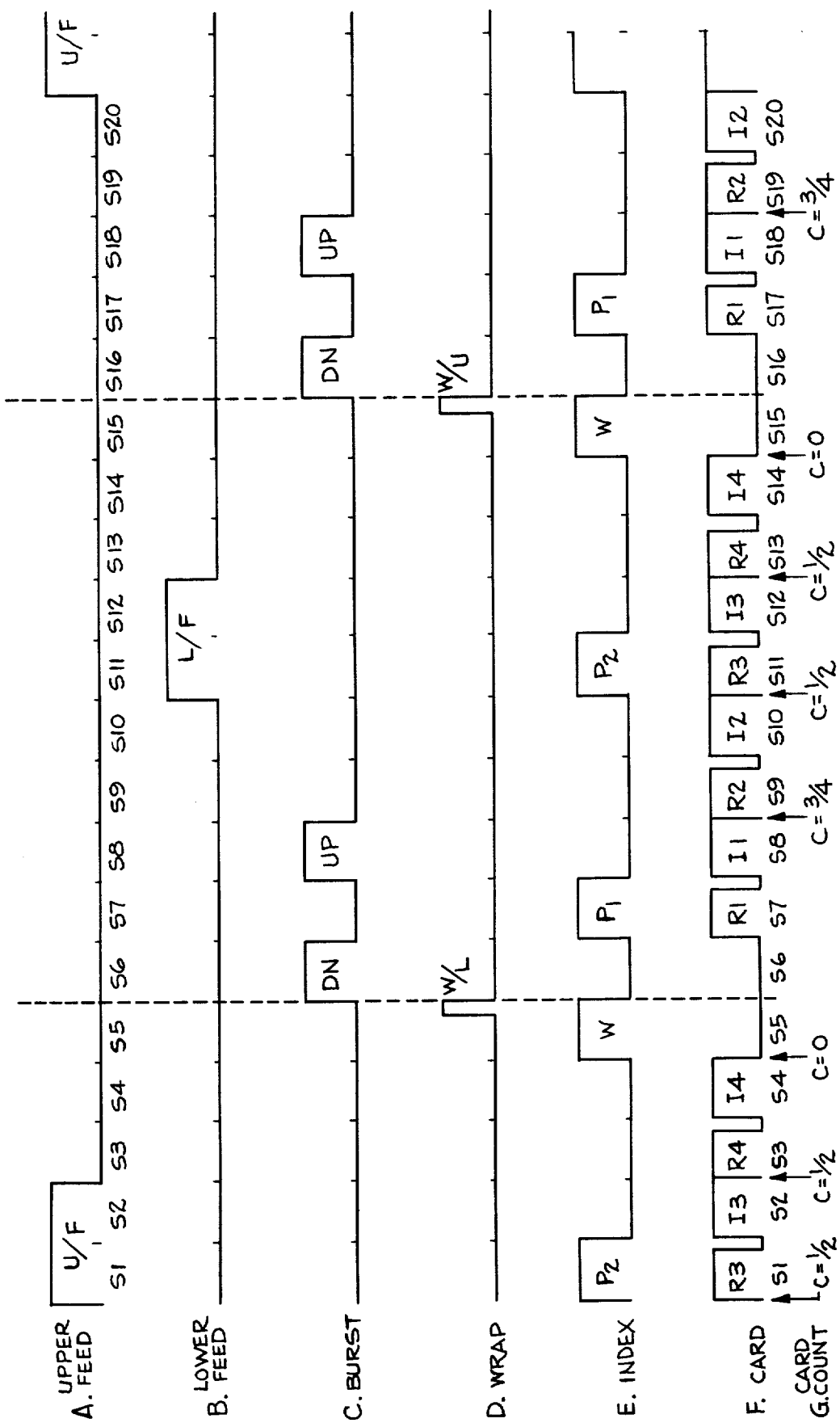

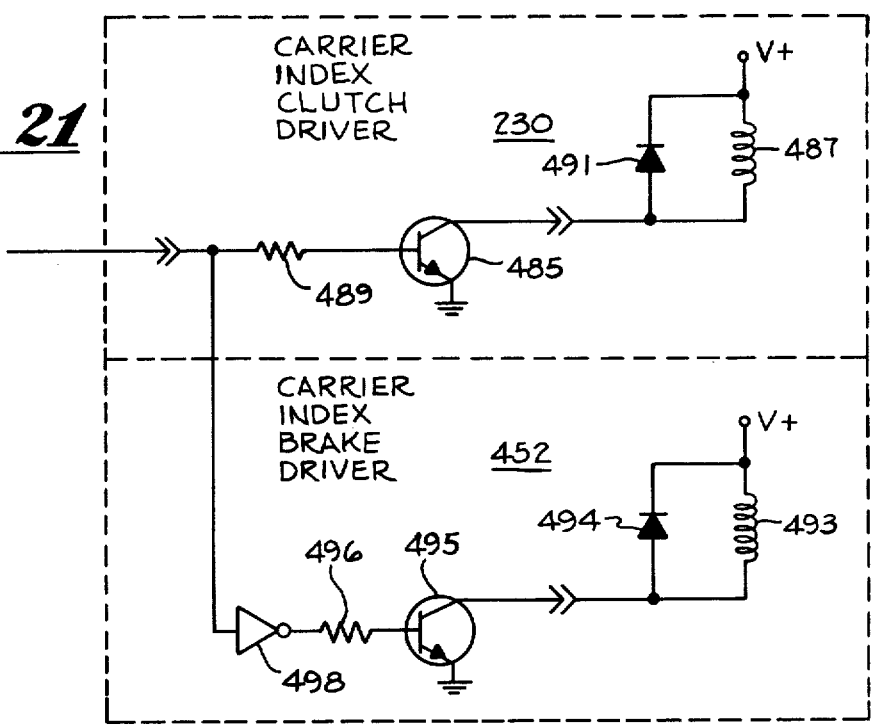
_Fig. 21_
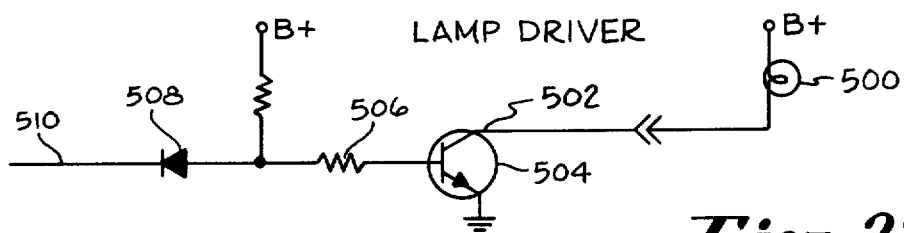
_Fig. 22_
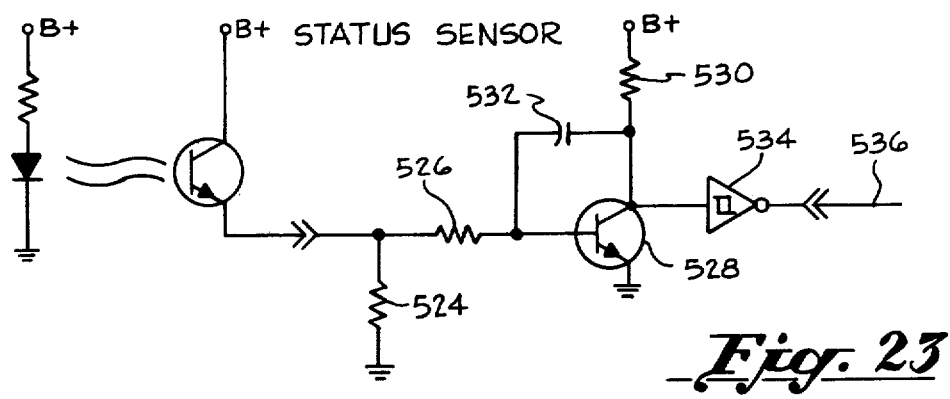
_Fig. 23_

VERIFYING INSERTION SYSTEM APPARATUS AND METHOD OF OPERATION

RELATED APPLICATION

This application is a continuation-in-part of copending application Ser. No. 768,446 filed Feb. 14, 1977 (now abandoned) entitled Credit Card Carriers, Apparatus and Methods, which in turn is a required divisional of application Ser. No. 615,112 filed Sept. 19, 1975 entitled Credit Card Carriers and Methods of Manufacture, now U.S. Pat. No. 4,034,210 issued July 5, 1977. The embossed character reader head employed in the apparatus of these applications is the subject of copending application Ser. No. 723,215 filed Sept. 14, 1976 entitled Embossed Character Reader and assigned to same assignee of the instant and other applications.

FIELD

This invention relates to apparatus for automated insertion of credit cards in special preprinted "credit"-type card carrier forms, followed by folding (wrapping), pulling and stuffing the wrapped card-containing carrier, and methods of automated operation thereof. More particularly, this invention relates to an apparatus and method for verification of credit cards and insertion thereof in a specially designed preprinted carrier, which includes sensing information on credit cards, comparing the information from the card with information sensed from special carriers therefor which are fed into the apparatus, burst and folded, then inserting the appropriate number of correctly matched cards in their appropriate carrier, completing the folding (wrapping) of the carriers and stacking them for insertion into envelopes for mailing. Pause and search modes are provided. The system apparatus preferably employs special single-sheet, multiple-flap credit card carriers having slits or slots in one or more panels for receiving and retaining by wedge trapping credit cards during manual or automated procedures of issue and mailing of the cards to card users. Special information is provided on the carrier to insure that the appropriate number of correctly matched cards are inserted in their appropriate carrier, and for manual or automated "pulls" after insertion. Such carriers are the subject of and are covered by U.S. Pat. No. 4,034,210.

BACKGROUND

In the United States there were about 500 million credit cards in circulation in 1974, and an additional 200 million were issued that year on new accounts or to cover maintenance (renewal). These numbers do not include the emerging debit card field (for bank or S and L account access), nor the ID and security card fields.

Such cards (called herein "credit cards" for simplicity) being equivalent to or providing access to money, property or credit, must be handled with accuracy under stringent security during issue of the cards, i.e., manufacturing, preparing for distribution, and actual distribution (e.g., by mailing) to the cardholder-customer. The correct number of cards must be correctly embossed and/or encoded with the cardholder's account number and other data. The embossed cards must be protected from theft until they are in the hands of the cardholders.

The preparation for distribution of the cards must likewise be done accurately under stringent security precautions. The cards are normally placed in what is called a carrier and mailed (first-class, registered or certified mail) to the cardholders. Advance notice and/or follow-up verification mailings may also be used to help insure against theft or notify promptly of non-receipt by the addressee-card user.

It is an extremely serious matter when the wrong cardholder receives the wrong card or wrong number of cards. If a cardholder is supposed to get two or three cards and receives only one, or if a cardholder receives a card of another account, there is a chance for theft of goods by credit cards. The average loss is in the four figure range with highest losses in five figures. The matter is even more serious in the case of debit cards. Such cards give access to a person's checking and/or savings account. Cards going to the wrong person creates a theft potential. This highlights the need for carrier forms and machine methods of accurate inserting and preparation for distribution.

Most cards are inserted manually in the two-slit, no-slit or pocket carriers. There are two basic approaches. In one, the person inserting the card has a stack of precut, single-sheet carriers having no account information thereon, and a stack of presequenced cards. They also have a stack of separate sheets of thin paper which are presequenced mailers with address and account information. The inserter compares the account number on the card to that on the separate mailer. The cards are inserted by hand into the slits or pockets of the carrier, assembled with the mailer, and then placed in envelopes. The second approach involves having account information typed onto the individual carriers which are presequenced and assembled with presequenced cards. A top-rated inserter is capable of inserting 1,500 accounts in an 8-hour day with an average of 1.7 cards per account. The average acceptable rate is generally, 1,000 accounts per day, and low is 750/day.

Correct presequencing of the cards and carriers or inserts is critical to any reasonable rate of manual insertion and to reducing the frequency of mismatch errors. Further, such manual insertion rates require many workers in order to keep up with the rate of production of credit or debit cards. For example, automated embossing machines have a current card embossing rate ranging from 350 to 1,500 cards/hour. The rates are the same for encoding cards bearing magnetic stripes.

We believe there is a machine available that can insert a card in a four-slit carrier by flexing the card along both its major and minor axis so the four corners can be popped into four respective corner slits. Another machine is capable of putting a dab of glue on the carrier and depositing the card thereon. However, neither machine matches the cards and carriers, so mis-match errors will occur unless exact sequencing is maintained. In automated equipment of this non-verifying type, once a sequence error occurs, all subsequent insertions will continue to be mis-matched.

There is thus a need for an improved high speed automated credit card insertion apparatus that has a verification function, i.e., that can "read" both the credit cards and carriers therefor that contain special photo-optically readable machine instruction information, cardholder identifying information, or issuer information, and compare the data to ensure there is a match of the correct number of cards for the proper carrier, and which machine is programmed to insert the cards in the carrier when the data matches.

THE INVENTION

OBJECTS

It is among the objects of this invention to provide automated apparatus and method for verification of cards and carriers, insertion of cards in carriers, folding inserted carriers, pulling bad accounts, and stuffing of completed carriers in mailing envelopes.

It is another object of the invention to provide a high speed modular verification and insertion system apparatus.

It is another object of the invention to provide a high speed modular verification and insertion system apparatus which is adapted to photo-optically read verification and/or identification information from special credit card carriers, which information includes machine instructions for the operation of the system apparatus. It is another object of this invention to provide a method of automatic verification and insertion of cards in carriers and preparation of the carriers for manual or machine insertion into mailing envelopes.

It is another object of this invention to provide a high-speed, automatic card and carrier verification and comparison machine and method capable of inserting the correct number of cards in the appropriate carriers at speeds of 1,200 cards/hour or more.

It is another object to provide a method and apparatus for optical character recognition capable of reading information from specially designed carriers which information may be processed and used in verification and insertion of credit cards in the carriers.

It is another object to provide a special continuous web, or plurality of webs of carriers, and apparatus for continuously bursting and folding individual ones of said carriers from said webs.

It is another object to provide apparatus for reading the embossed characters on the credit cards, and apparatus for converting the information therefrom into electronic form for data match comparison, verification, log and command functions.

It is another object to provide method and apparatus for continuously picking individual ones of cards in a stack and sequentially feeding them to a station where the embossed characters or magnetic codes on the cards are read in a manner to provide information for data match comparison and verification with information on or relating to carriers therefor for logic and command functions.

It is another object to read cards containing information in any one or more of a variety of modes including reading Hollerith punch, embossed characters mechanically or optically sensed or read, reading bar codes printed on the cards, or sensing information containing in the magnetic stripe of the cards.

It is another object to provide for method and apparatus for sequentially searching through stacked cards where a mismatch between cards and carrier information is observed and/or detected.

It is another object of this invention to provide apparatus and method of partially folding carriers preparatory to inserting cards therein, and completing the folding of carriers having cards already inserted therein for inserting in envelopes.

It is another object of the invention to provide special programs for automated high speed verification and insertion of credit cards into carriers.

It is another object to provide special electronic and logic circuitry for an automated high speed credit card verification and insertion system apparatus.

It is a further object to provide an automatic verification an insertion system meeting one or more of the objects above which is constructed of easily assembled modules including a mechanical module, a microprocessor module, a power supply module and a keyboard module as will be described below.

It is still another object to provide an automated apparatus of the type described infra which includes means for automatically providing appropriate instructional information to an operator for correcting a malfunction or inoperative conditions of the apparatus.

It is yet a further object to provide an apparatus having one or more of the objects above in which control of the apparatus is achieved through a microprocessor.

It is still another object to provide an apparatus having one or more of the objects above in which operations performed by the machine are automatically controlled in accordance with information contained on the very carriers being processed by the apparatus.

It is also an object to provide a machine which is controlled in accordance with a prerecorded program and information provided by sensors indicating the status of various mechanical operations performed by the machine.

It is another object to provide apparatus for verification of the number of cards in a carrier after being sealed in an envelope and rejecting those having an incorrect number of cards, and for pulling bad accounts after sealing and before mailing.

Still further and other objects of the invention will be evident from the description which follows.

FIGURES

The description which follows will have reference to the drawings, which in appropriate instances are simplified for clarity, e.g. by omitting fasteners; showing multiple parts as a single part; showing parts, functions, operations in schematic form or partly in schematic form; breaking away or removing parts not essential for the description; and in which:

FIG. 1 is a highly simplified, partly schematic overview of an apparatus and method of this invention for verification and mechanical insertion of cards in the special carriers, and wrapping of the inserted carriers;

FIG. 2 is a schematic flow diagram of the card and carrier processing steps in accord with apparatus and method of the invention;

Figure 3:
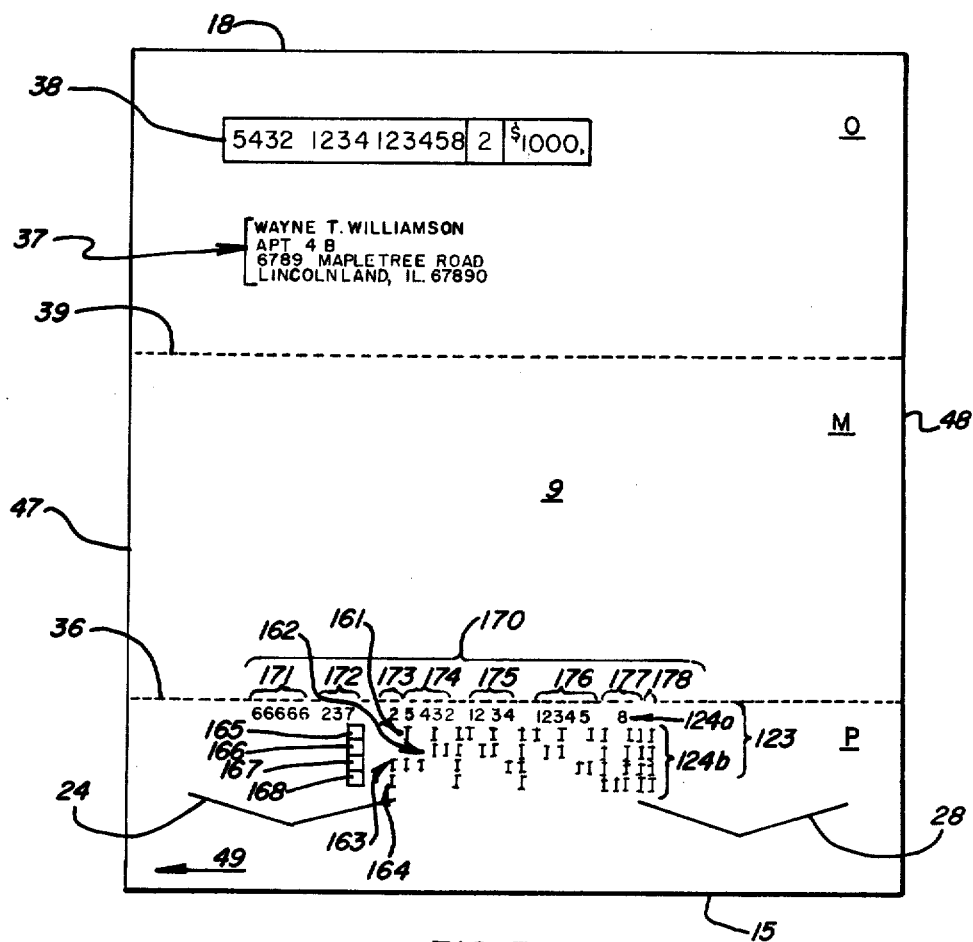

FIG. 3 is a plan view of a specially imprinted 2-pocket carrier of the type covered by U.S. Pat. No. 4,034,210 used with the verification and insertion apparatus system in accord with the method of this invention, and showing the optical character reader initial positions.

Figure 4:
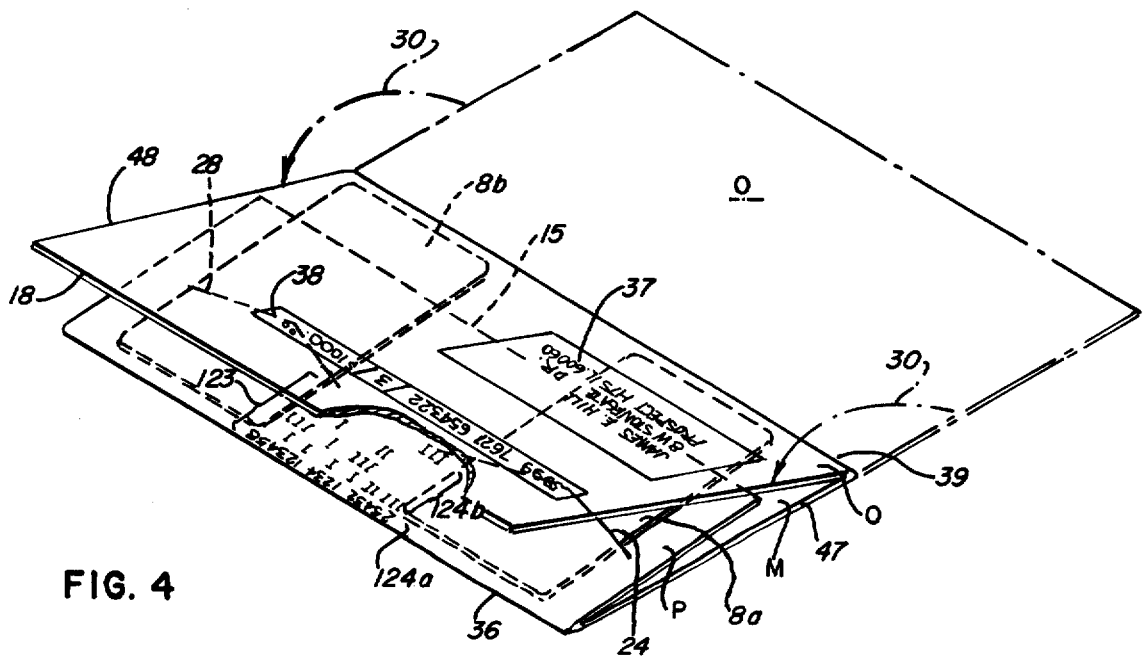
Figure 6C:
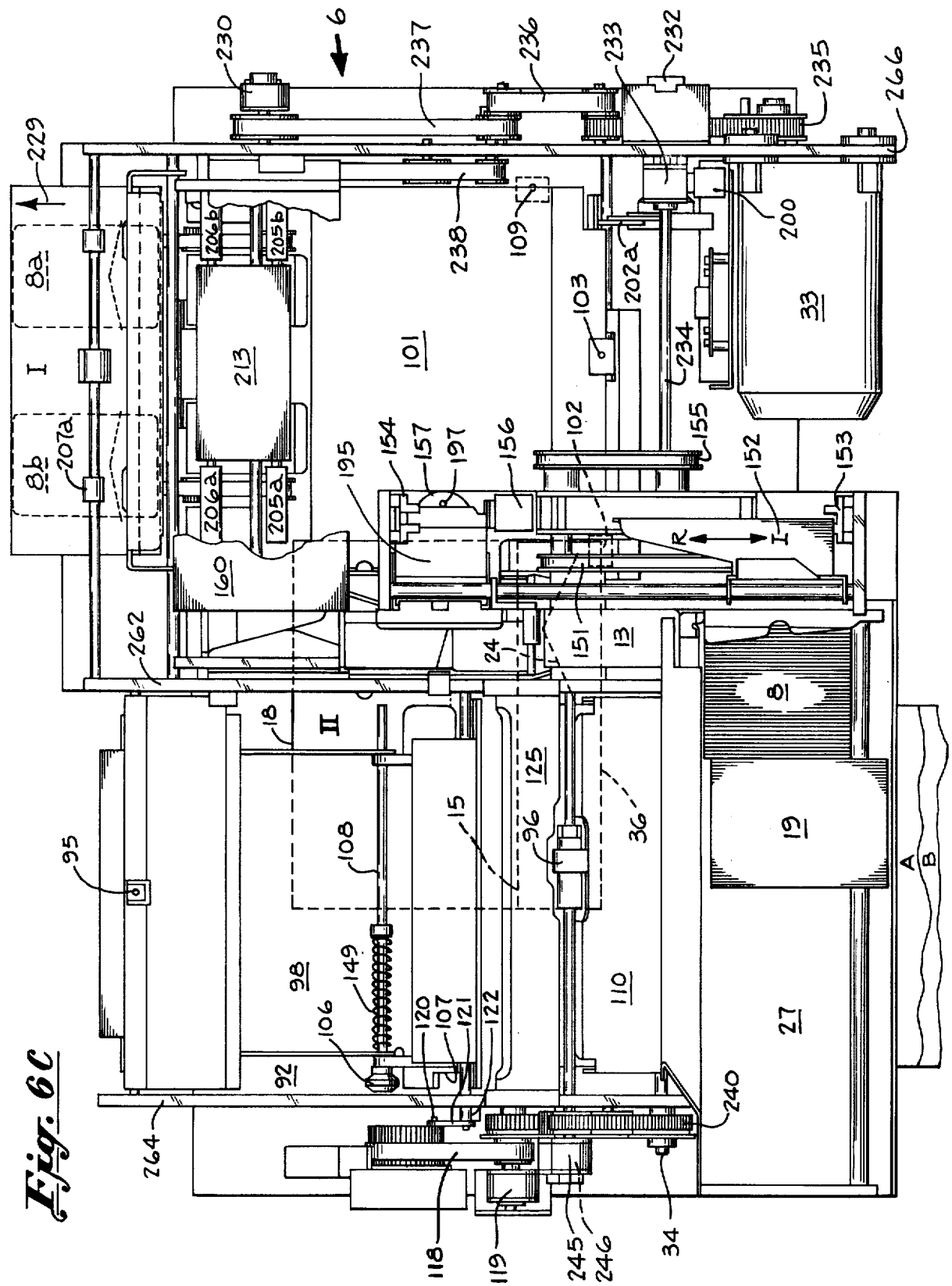
Figure 7:
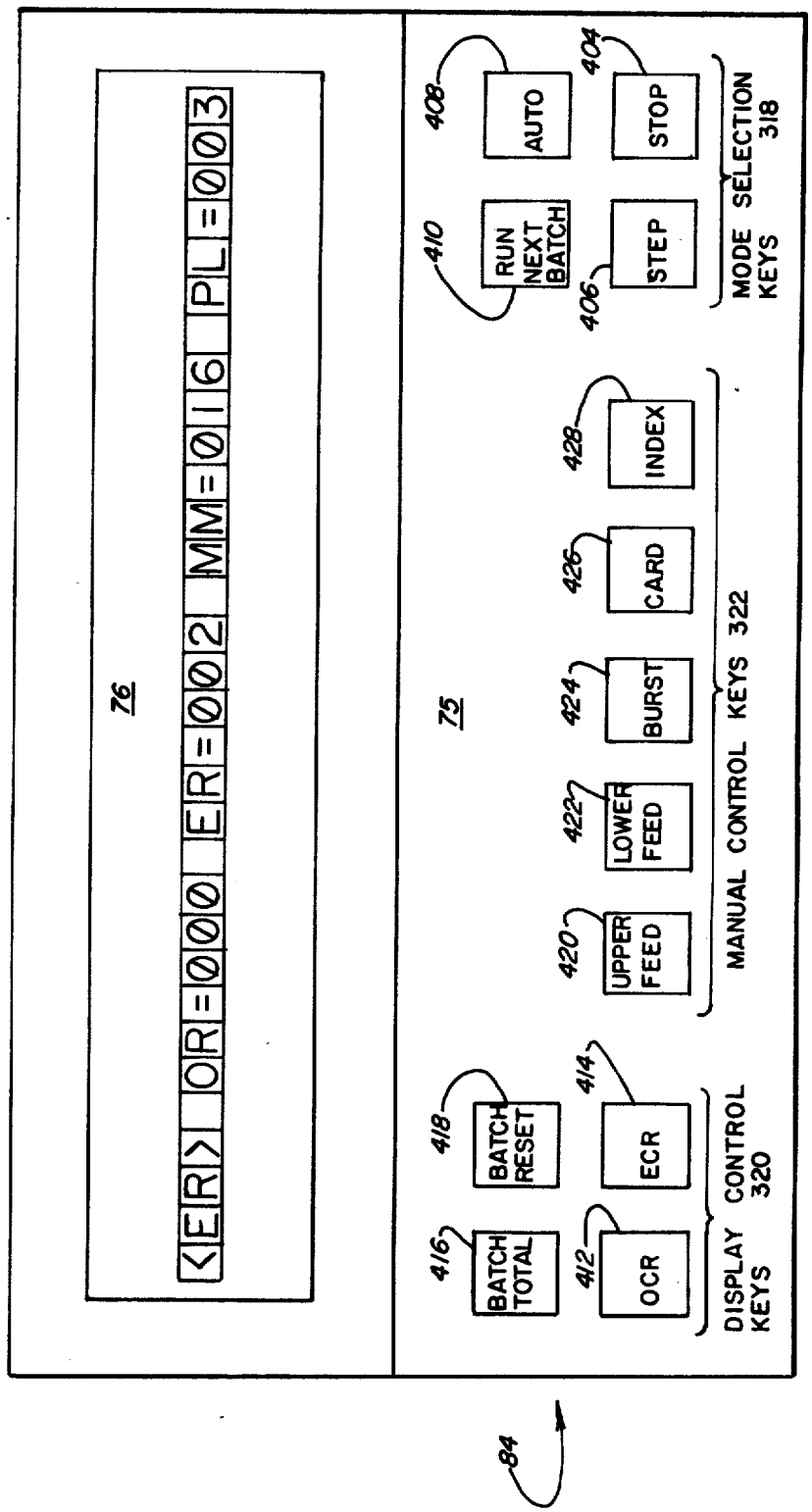
Figure 8:
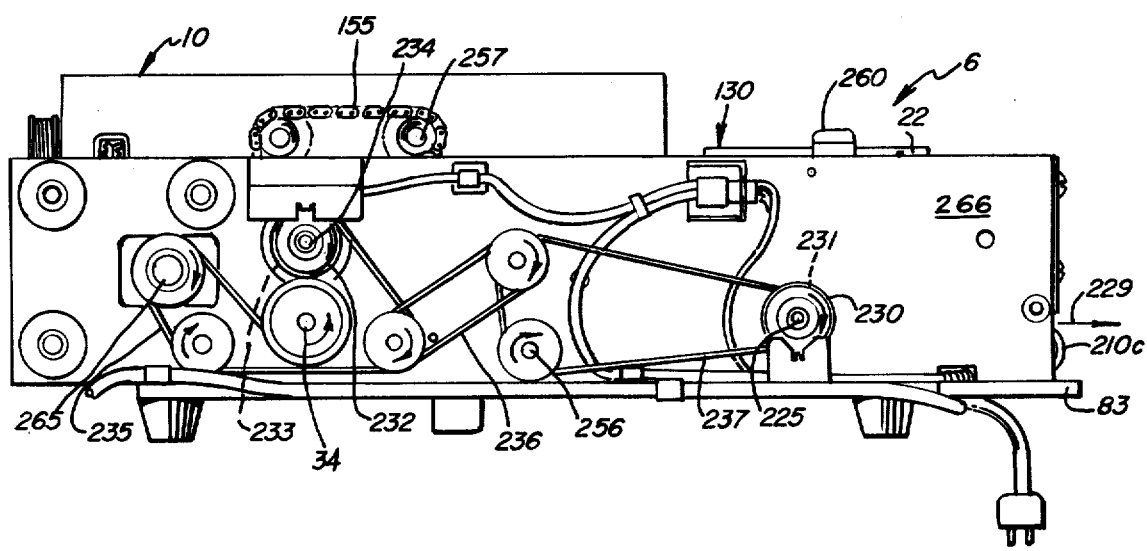
Figure 9:
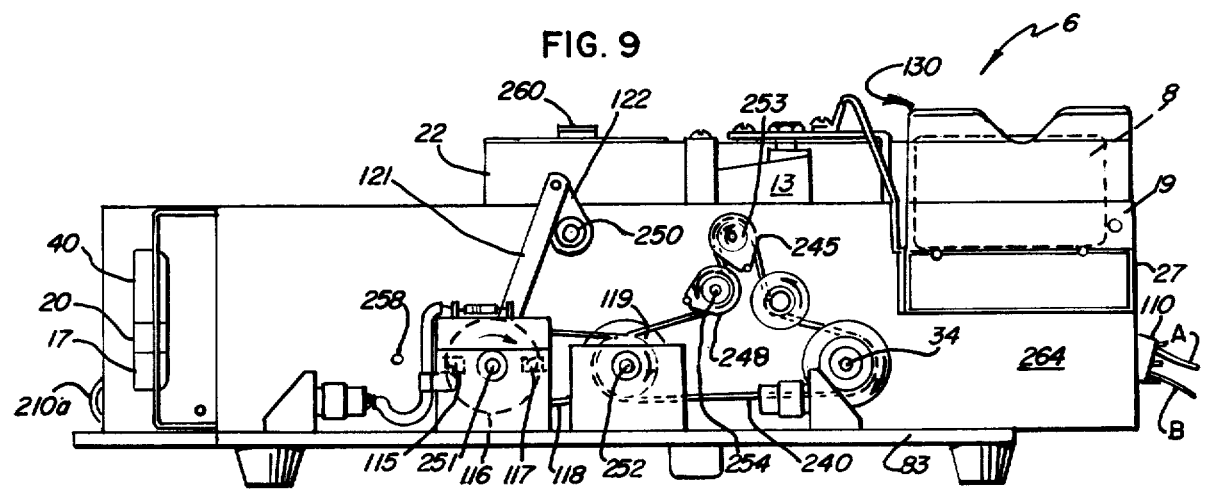
Figure 10:
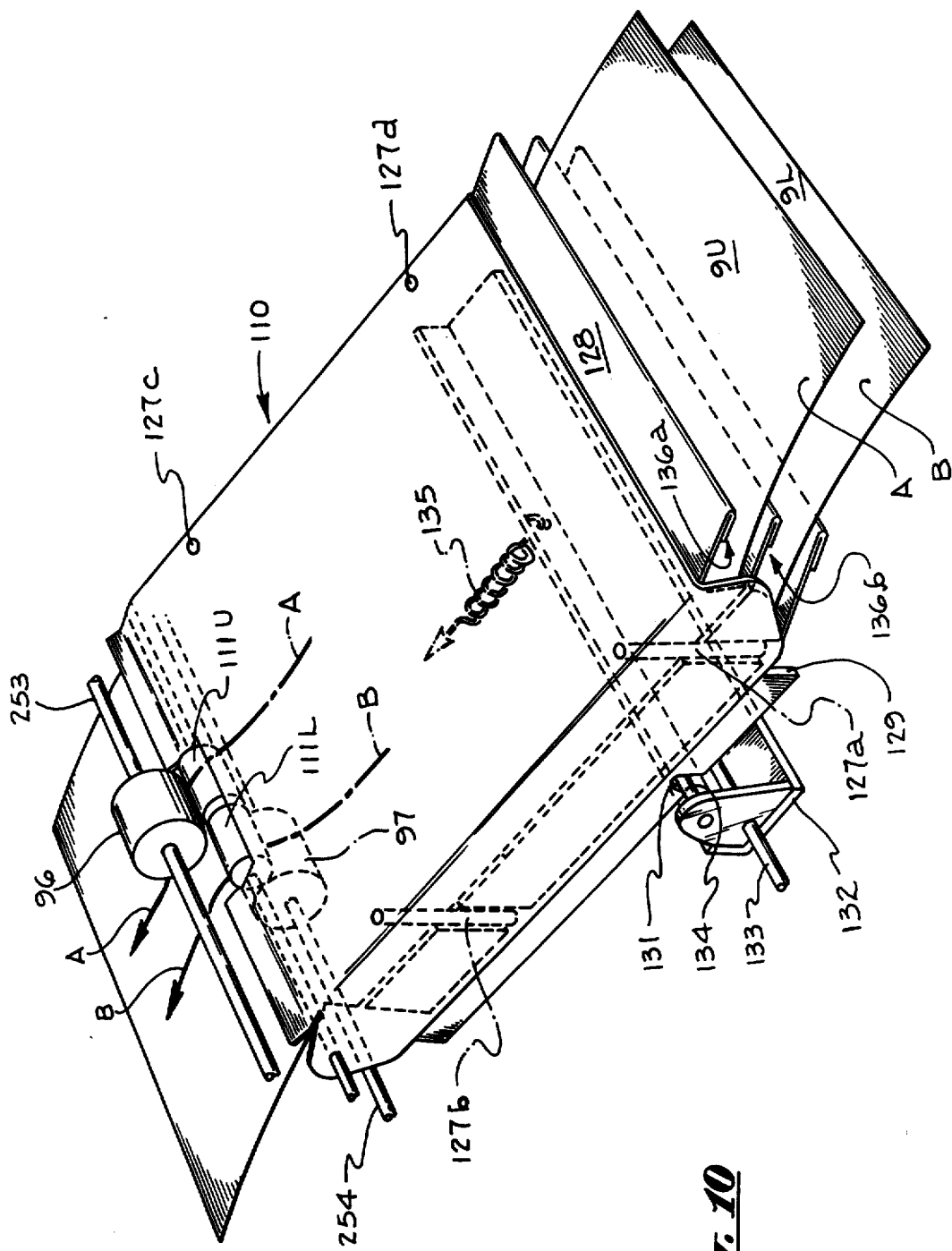
Figure 11A:
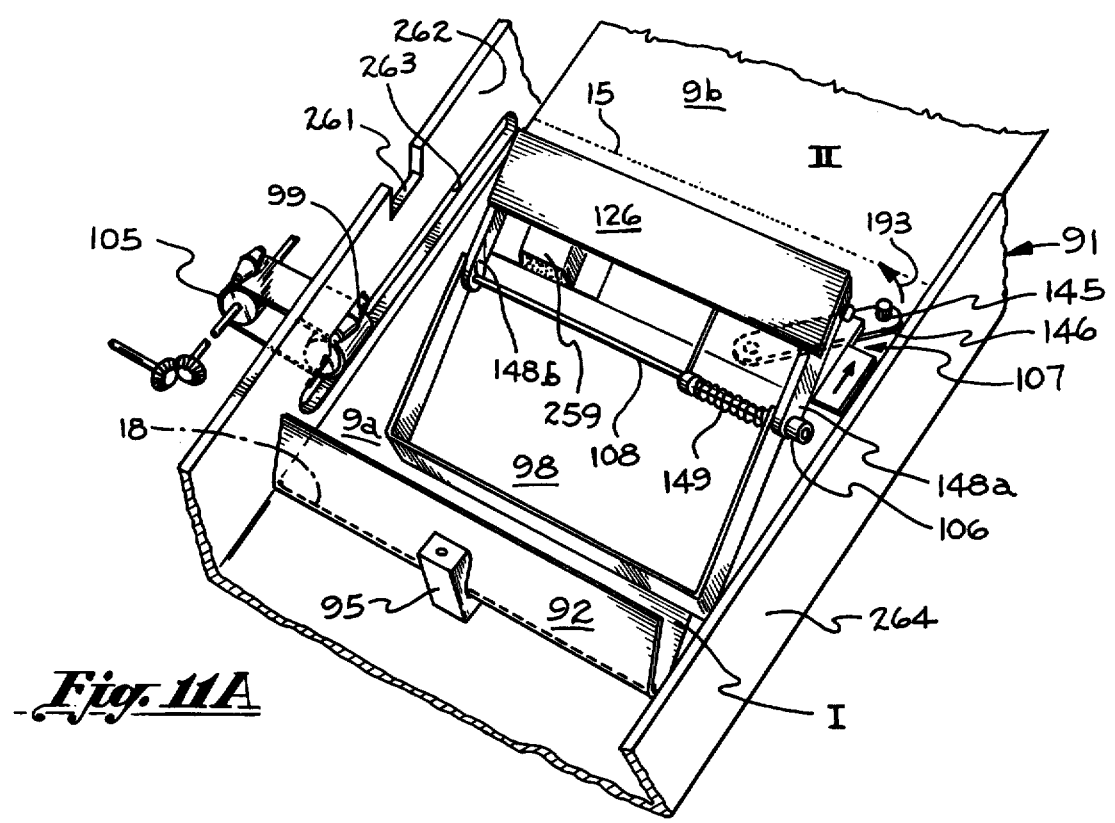
Figure 11B:
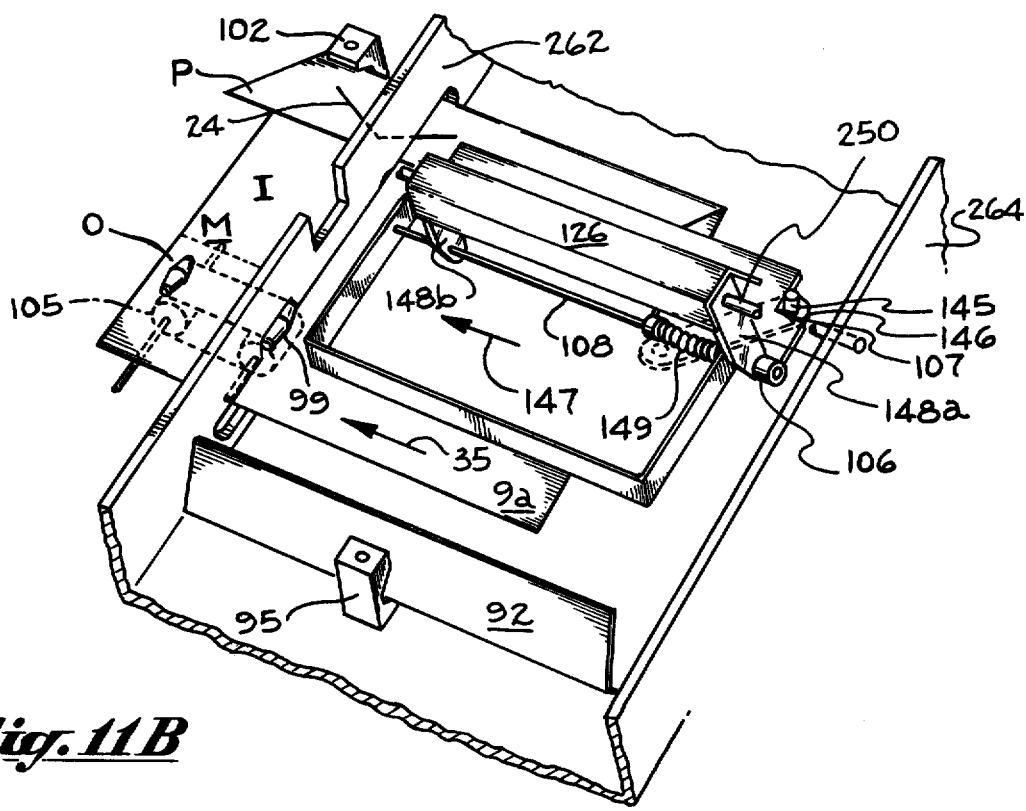
Figure 13:
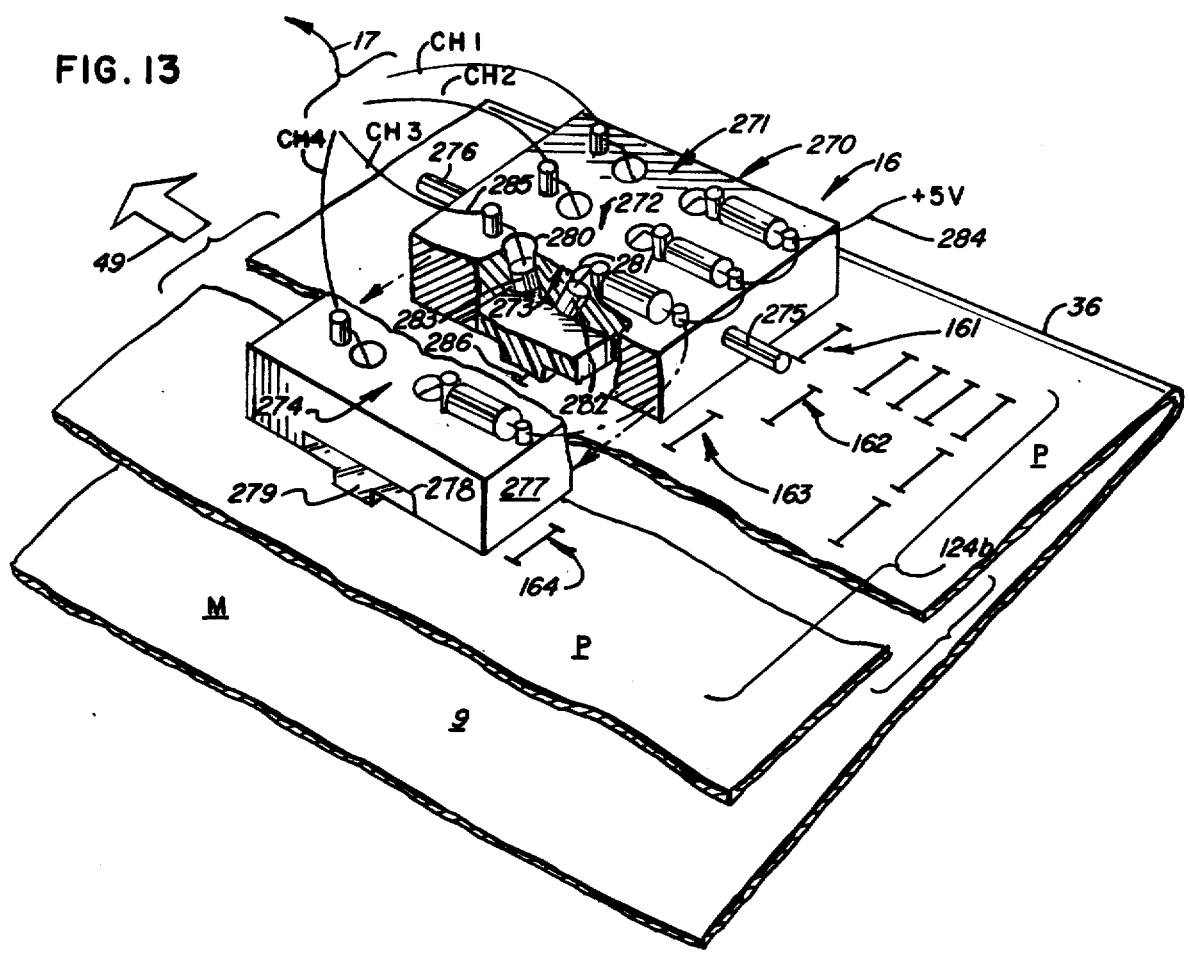
Figure 14:
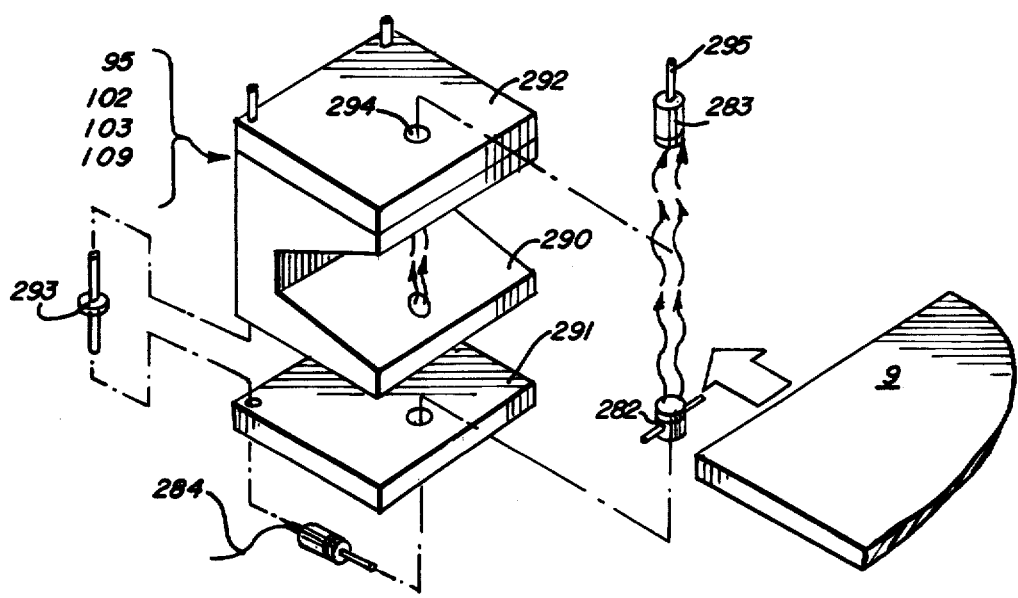
Figure 15A:
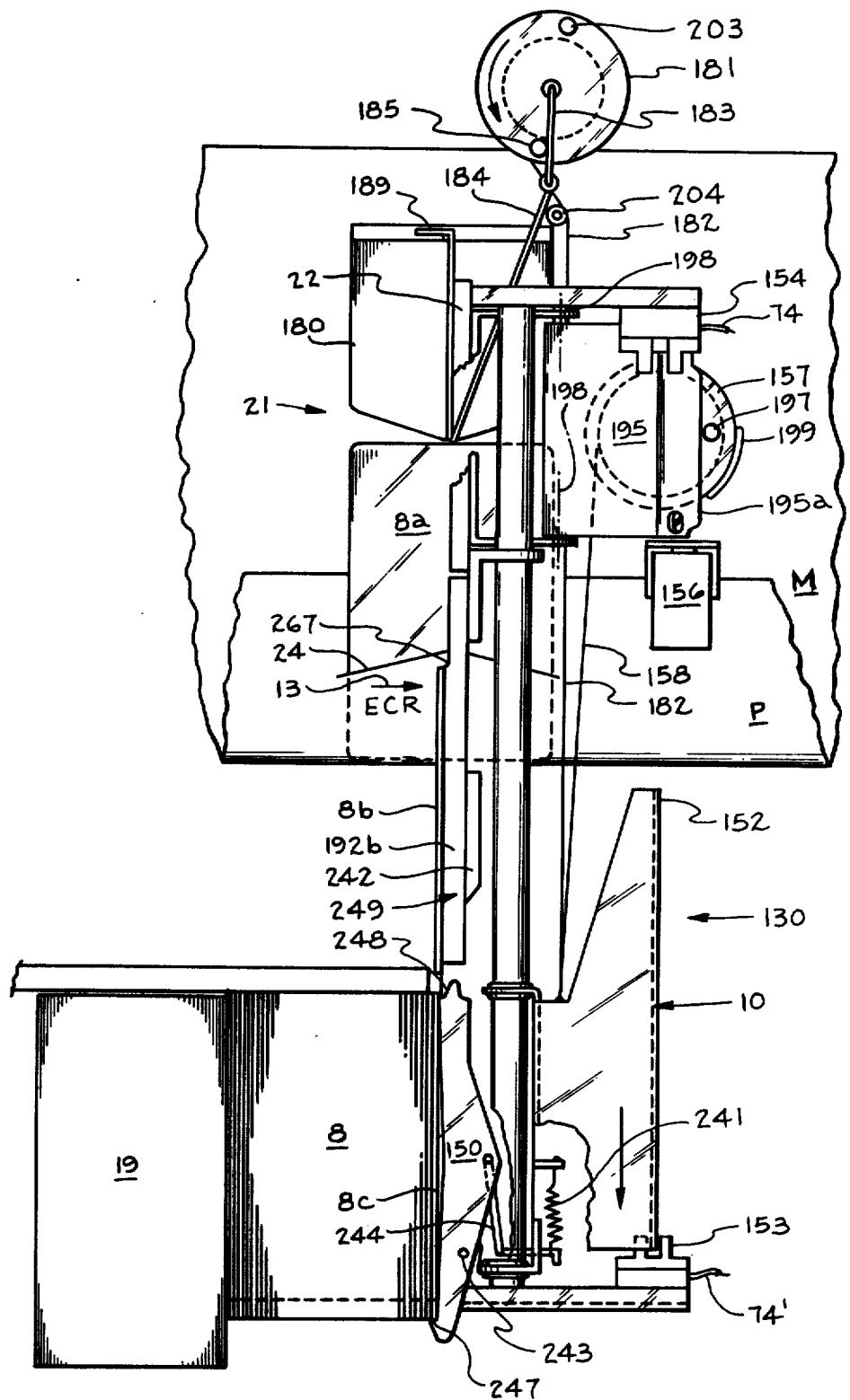
Figure 15B:
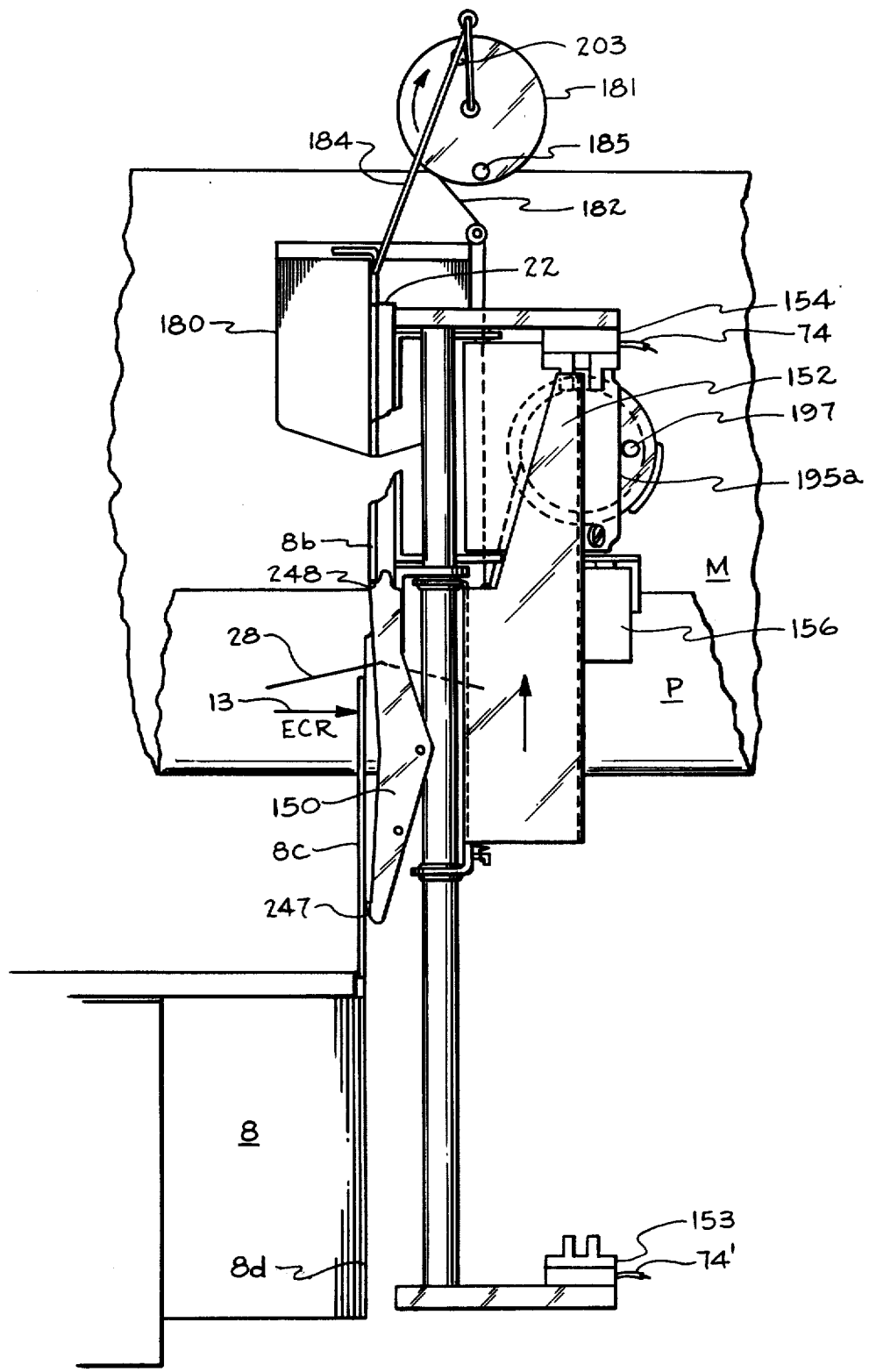
Figure 15C:
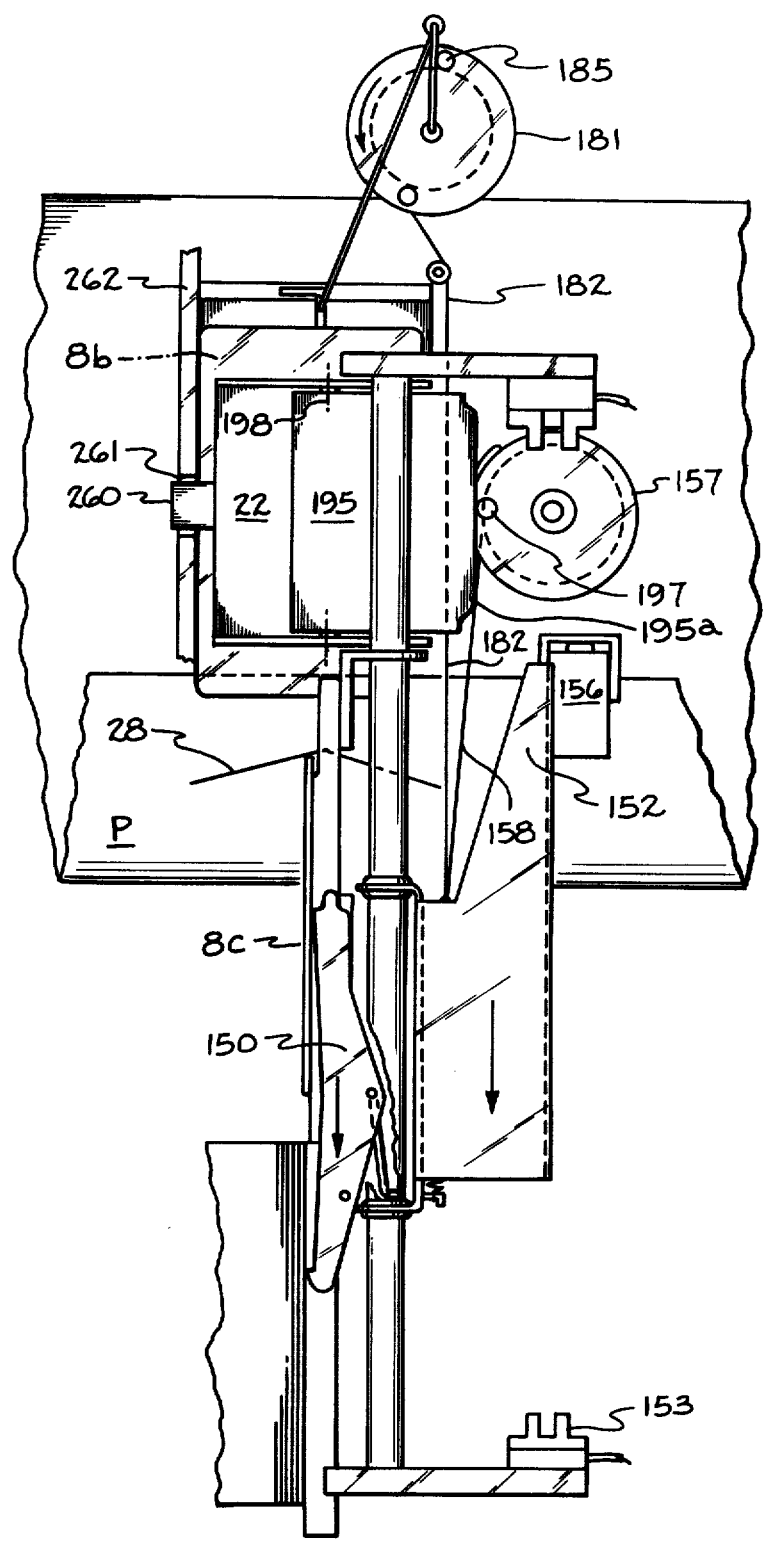
Figure 16A:
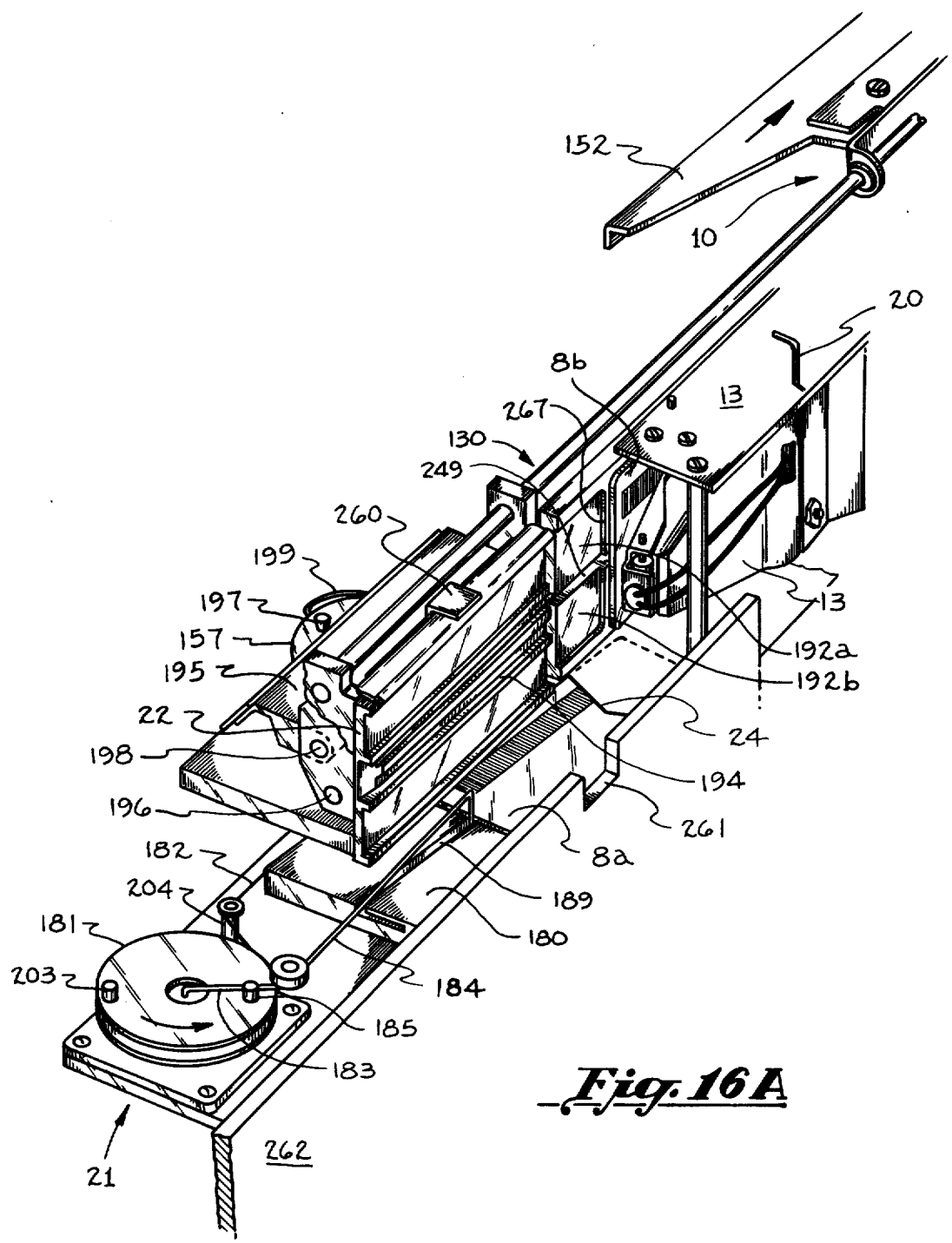
Figure 16B:
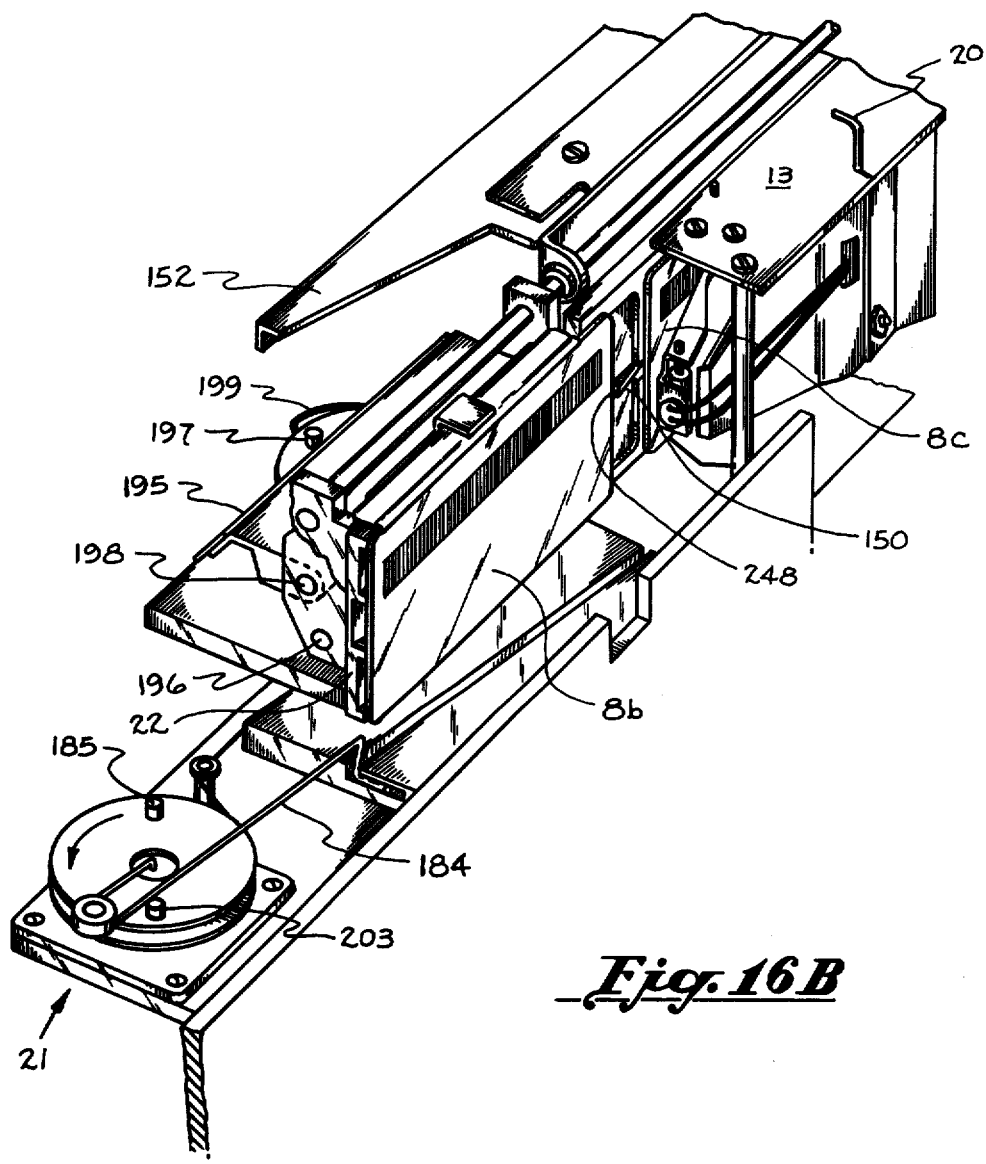
Figure 16C:
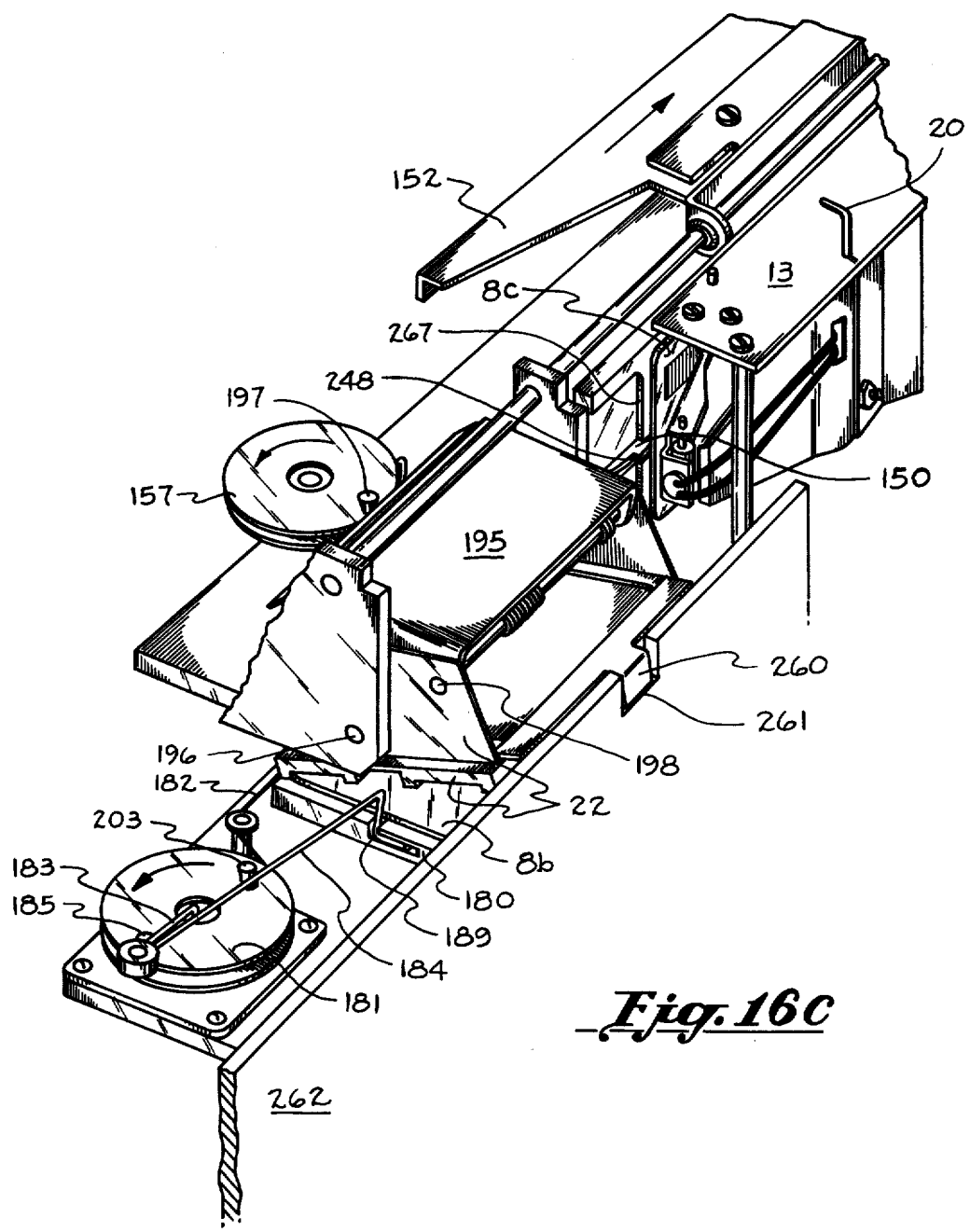
Figure 19A:
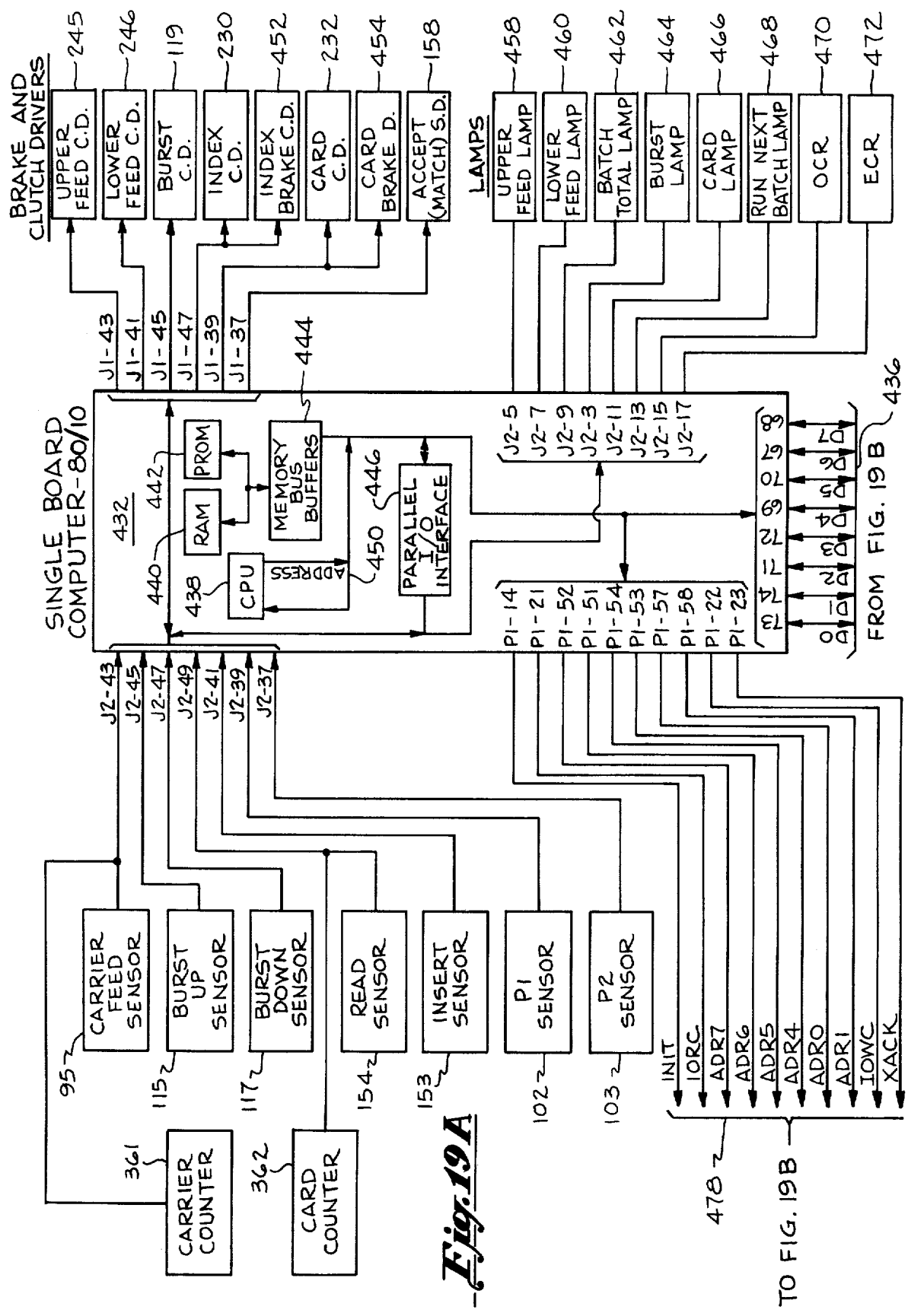
Figure 19B:
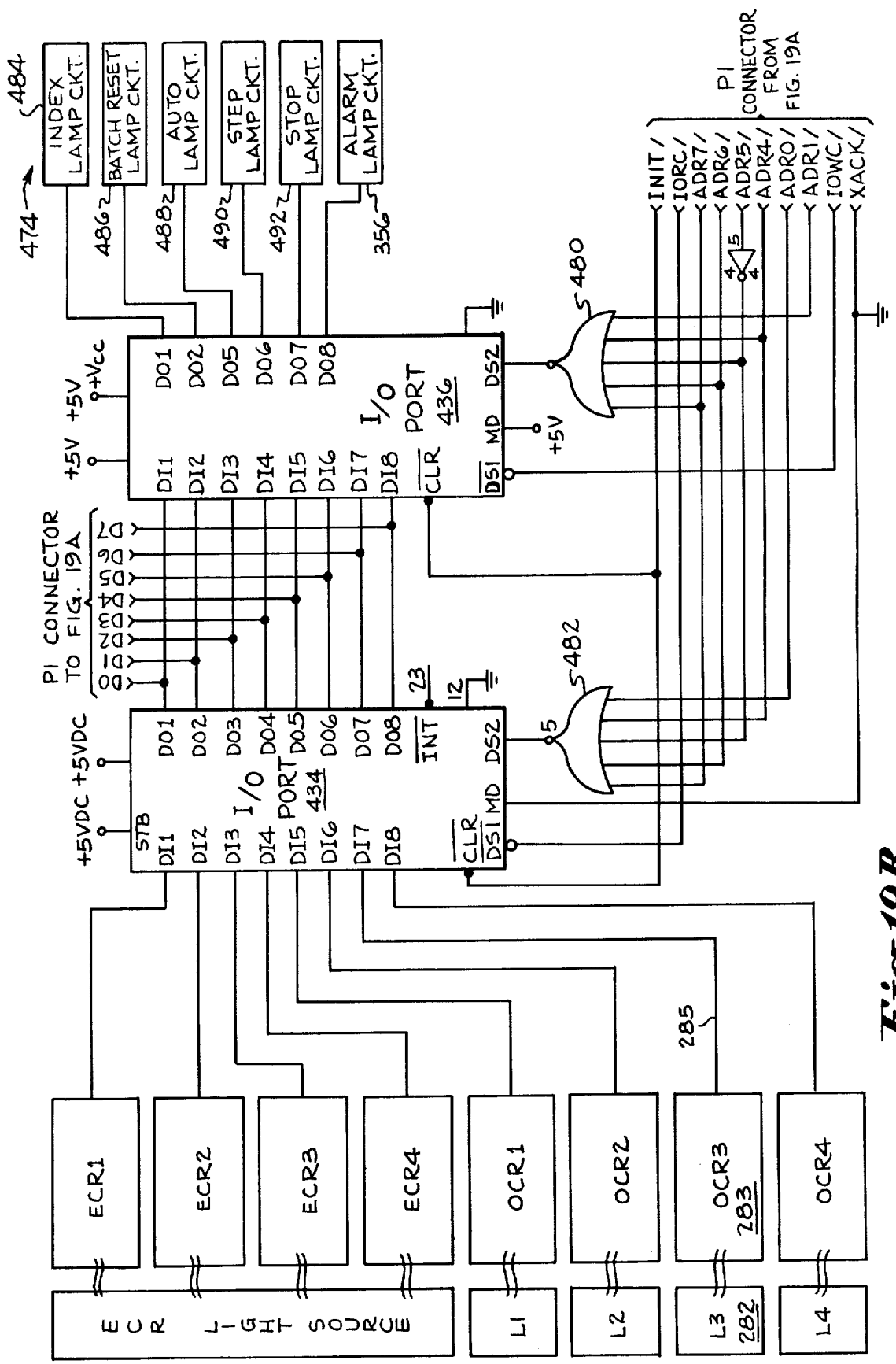
Figure 25:
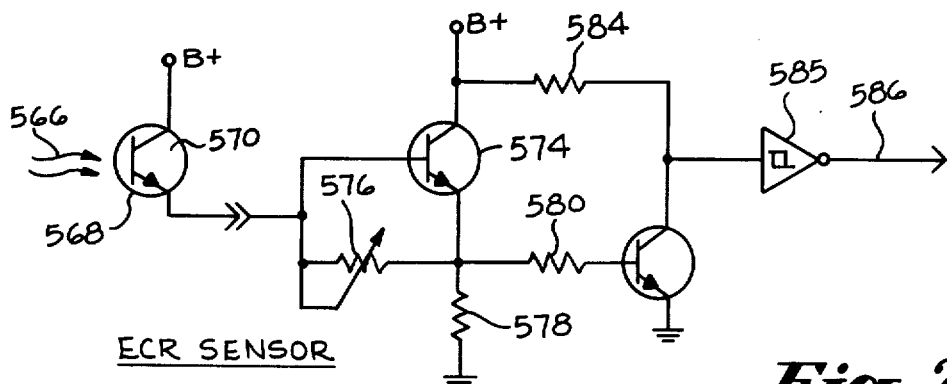
Figure 26:
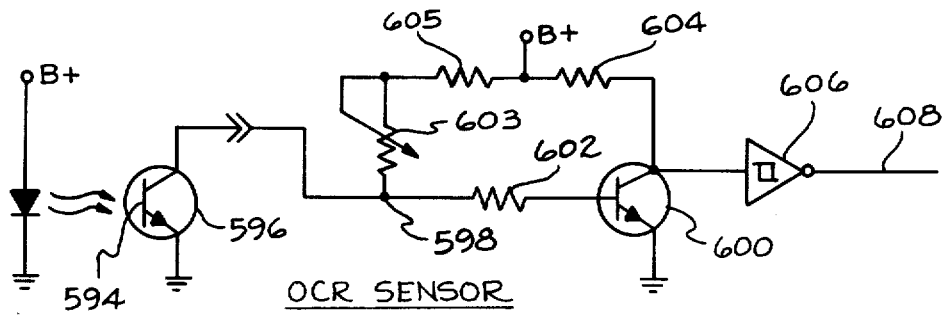
Figure 24:
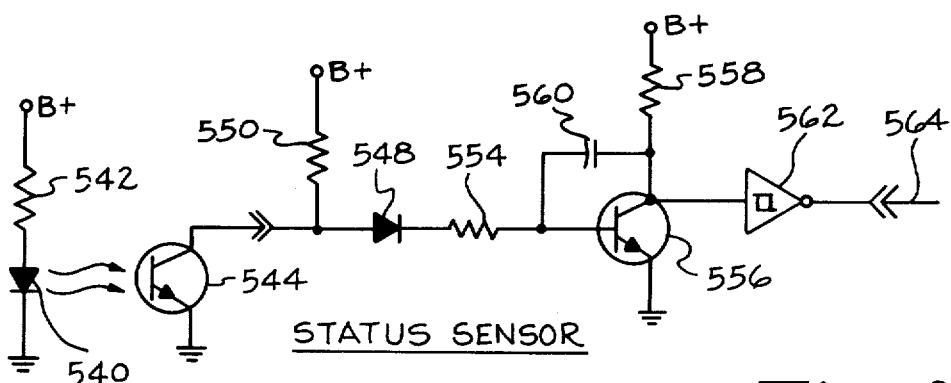
Figure 27A:
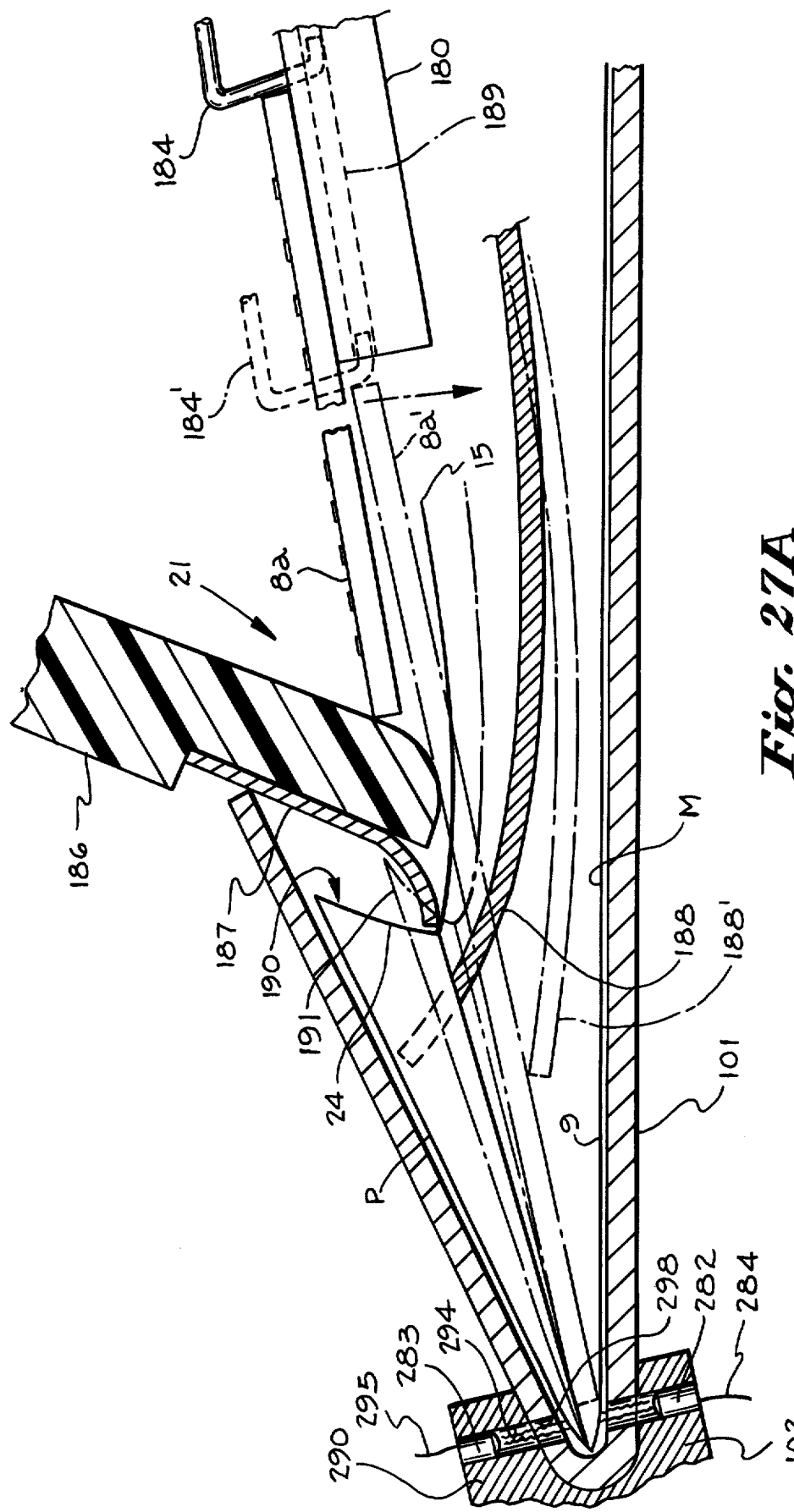
Figure 27B:
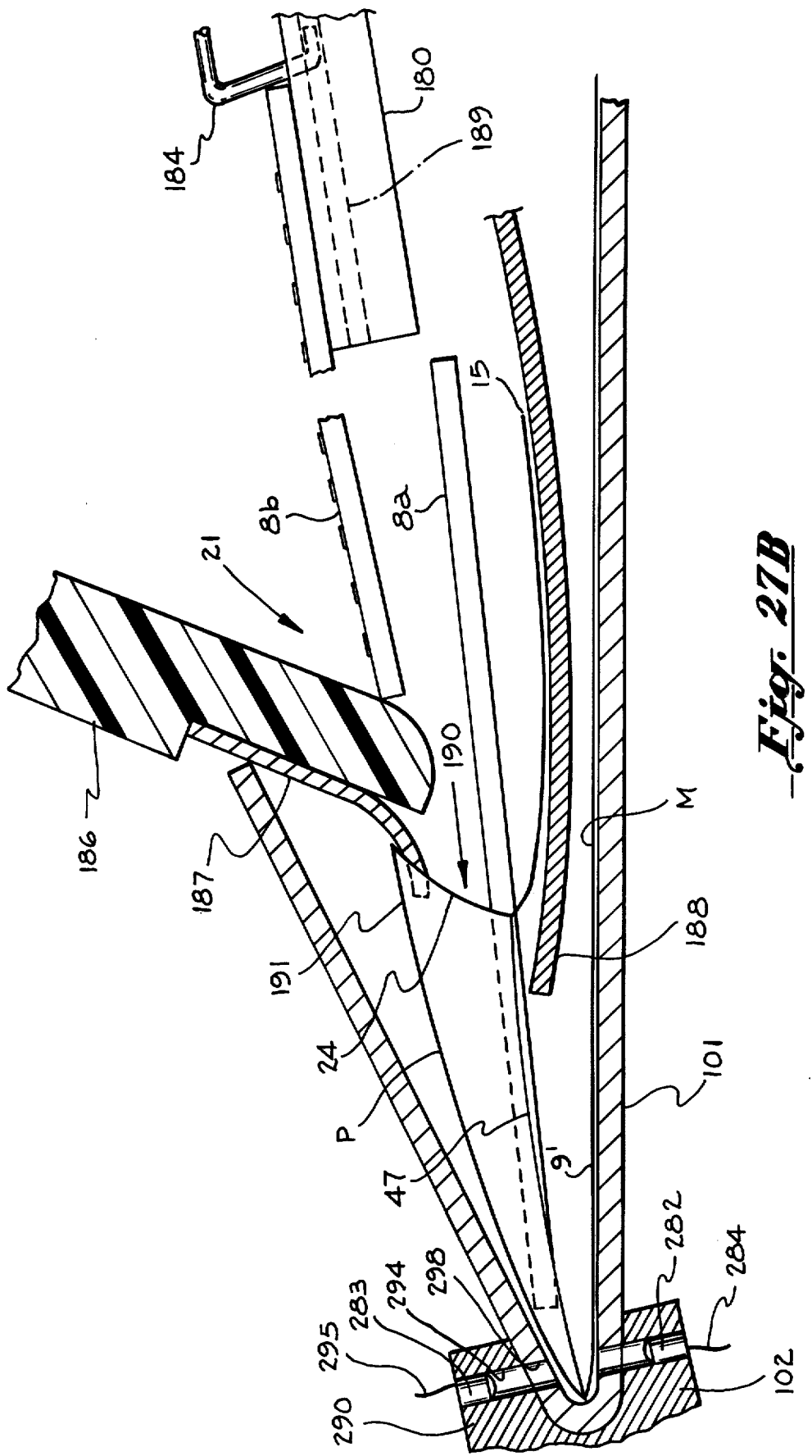

FIG. 4 is a perspective view of the inserted and nearly completely wrapped carrier after being cycled through the verification and insertion system apparatus in accord with the method of the invention, with a part broken away to show the electro-optically readable bar code thereon, and two cards inserted therein in the pockets;

FIG. 5 is an exploded perspective of the verification and insertion system apparatus of this invention showing its modular nature and arrangement of the parts;

FIGS 6A through 6C are a series in plan view of the mechanical module, with:

FIG. 6A showing a first carrier in the pocket 2 insert position while a second carrier is being fed into the unit;

FIG. 6B showing the first carrier half wrapped and the second carrier after bursting and partially indexed toward the P-1 position; and FIG. 6C showing the first carrier completely wrapped, and the second carrier now in the P-1 position with the first card being inserted;

FIG. 7 is a plan view of the keyboard and display portion of the logic command module (LCM);

FIG. 8 is an elevation view of the mechanical module showing the drive train from the wrap side (the right side of the module as seen in FIG. 5);

FIG. 9 is an elevation view of the mechanical module showing the power train, burst bar crank, card feed tray, picker assembly and the upper (A) and lower (B) carrier streams from the burst side (the left side of the module as seen in FIG. 5);

FIG. 10 is a perspective of the carrier lead-in chute with the upper (A) and lower (B) streams of carriers being fed therein;

FIGS. 11A and 11B are a series of rear diagonal perspective views showing the bursting (separation) of individual carriers from the carrier streams followed by indexing into the P-1 position during which the OCR (optical character recognition) head scans the carrier bar code, with:

FIG. 11A showing the feed of the carrier into the burst station with the burst bar in the raised (up) position; and FIG. 11B showing the lateral motion of the burst bar to bring the side edge of the carrier into the nip of the indexing pinch rollers;

FIGS. 12A through 12C are a series in elevation of the feed-in and bursting operations taken along the line 12—12 of FIG. 6, with:

FIG. 12A showing the burst bar in its raised position and a first carrier being fed into and sensed by the carrier feed sensor;

FIG. 12B showing the burst bar partly descended, the burst floor pivoting downward, and the carrier just starting "pull-up" prior to being burst by bending along its perf line across the burst blade; and FIG. 12C showing the burst bar fully forward and moving transversely during indexing and OCR "reading" of information means on the carrier after the carrier is burst from its stream;

FIG. 13 is a perspective view, partially broken away to show the detail of the OCR head and travel of carrier with respect thereto for reading during indexing;

FIG. 14 is an exploded perspective showing the sensors used for carrier feed sensing, the P-1 and P-2 sensors, and the wrap sensor;

FIGS. 15A through 15C are a series in plan view of the picking of cards from the card chute and feeding them through the ECR read station and the card insert module, with:

FIG. 15A showing the picker in the forward (home) position on completion of the insertion stroke, just removing a third card from the stack and feeding it through the entry slot, and just prior to pushing a preceeding second card through the ECR read station and on into the card laydown door, while the insert wire has just completed inserting a first card into a pocket of a carrier;

FIG. 15B showing the picker at the end of the read stroke with the picker cammed to push the second card onto the laydown door, and the picker flag hitting the read sensor and the LCM doing a data match just prior to commanding the accept/reject solenoid to be followed by laydown and insertion or rejection of a card;

FIG. 15C showing the card track mechanism in the laydown stroke and the picker halfway back to its home position preparing to pick the next card in the stack;

FIGS. 16A through 16C are a series of perspective views of the picker, ECR (Embossed Character Reader), laydown door and insert mechanisms, which views correlate to FIGS. 15A-C, with;

FIG. 16A showing the completion of the insert stroke with the card in the insert trough end partway into the P-1 pocket;

FIG. 16B showing a card just arriving in the laydown door and the insert wire in the retracted position; and FIG. 16C showing the card being dropped into the load bucket with the door at the bottom of the laydown;

FIGS. 17A through 17D are a series in perspective of the operation of the wrap station, with:

FIG. 17A showing the feed of a just-inserted carrier into the station with the C panel being deflected by the wrap pulley into the wrap bar;

FIG. 17B showing the C panel of the carrier completely fed into the wrap bar and the credit card deflecting the wrap pulley;

FIG. 17C showing the C panel being folded over the M panel by the pivoting wrap bar;

FIG. 17D showing the completely wrapped carrier exiting the station;

FIG. 18 is a block diagram of the logic control module or LCM 7 including the keyboard control input switches 75, the display 16 and the logic module 400, together with a block diagram of the various machine function sensors 74 providing inputs thereto and the various clutches to which output signals are provided;

FIGS. 19A and 19B form a composite block diagram illustrating in greater detail the logic module 400 and the various connections of its inputs and outputs with related circuitry;

FIG. 20 is a comparative timing diagram illustrating the sequence of operations performed by the logic module 400;

FIG. 21 is a schematic diagram of a preferred circuit for one of the clutch and brake driver blocks of FIGS. 19A and 19B;

FIG. 22 is a schematic diagram of a preferred circuit for a representative one of the status indicator lamp driver blocks of FIGS. 19A and 19B;

FIG. 23 is a schematic diagram of a preferred circuit for one of the function or status sensor blocks of FIGS. 19A and 19B;

FIG. 24 is a schematic diagram of a preferred circuit for another one of the function sensor blocks of FIGS. 19A and 19B;

FIG. 25 is a schematic diagram of a preferred circuit for a representative one of the sensor channels of the ECR head shown in block form in FIGS. 19A and 19B;

FIG. 26 is a schematic diagram of a preferred circuit for a representative one of the sensor channels of the OCR head shown in block form in FIGS. 19A and 19B;

FIGS. 27A and 27B are a series of section views through lines 27—27 of FIG. 6A illustrating the insertion of cards in a carrier pocket and the action of the long and short tongues.

SUMMARY

The invention includes apparatus and method for verification and insertion of cards in continuous and singlesheet, plural-cardholding, multi-panel (or flap) credit card carriers. The carriers are used for retaining the cards during certain credit card issue procedures, including mailing to the cardholders. A first marginal panel, the P panel, contains from one to four specially designed slits for receiving the cards by manual or automated insertion, in vertical (preferred) or horizontal orientation. The cards may be inserted sequentially or simultaneously, single or piggy-backed (two or more in a single slit). The P panel cooperate upon folding along internal perf lines with a central M panel and a second marginal panel, the O panel, to retain the cards by wedge trapping without loss or misalignment (cocking) during handling and mailing.

The P panel contains special positions thereon for receiving and carrying information relating to the account which may be read visually by manual inserters or by checker-operators, or may be read automatically by mechanical, optical, electromechanical, electro-optical (photo-optical), magnetic and/or electronic scanner means to provide information during automated insertion or thereafter, e.g., stuffing or pulling operations. Typically, the information is in the form of alphabetic, numeric or optical characters (e.g., 1-bar or I-bar code) or mag stripes and contains information about the account, the card issue, number of cards to be placed in the particular carrier, and the like. Account indicia, for example, may be numeric and positioned adjacent to an internal perforation (carrier form fold line) so that account numbers may be presented for visual scanning when the carriers are completely inserted, folded and stacked ready for insertion (stuffing) into mailing envelopes.

The carriers are produced by a multi-step process, broadly broken down in two stages: Stage 1 is production of blank carriers or carrier webs in continuous form or single sheets. Stage 2 involves printing of the individual issue and account information by data processing equipment to ready the carriers for card insertion, folding, pulling and stuffing into mailing envelopes.

The carriers may be fan folded along perf lines (called burst/fold lines) and boxed for shipment to data processing centers of the card issuer of service organization. Alternately the carrier web or sheets may be fed directly to the Stage 2 imprinting operations.

Stage 2 imprinting involves applying individual account information to the front and/or back face of the individual carrier forms, typically by data processing equipment such as impact (line or drum) or non-impact printers. Such printers may be computer controlled and apply preselected information about the accounts to individual carrier forms in the proper sequence. These printers may also apply machine-readable code, such as 1-bar or I-bar code, variable space or variable width bar code, and the like to preselected portions of the carriers. These codes are positioned on the carriers to cooperate with read heads in automatic card inserting machines and to supply instructional (command) or verification information to such machines.

In one embodiment, a special I-bar binary code presents information which identifies the number of cards to be inserted in the carrier, the card issue (run number), the issue number, cardholder account number, spaces, and an end signature or batch instruction. This carrier information is compared by the machine with information on the cards, and command logic initiates mechanical insertion of the appropriate number of correctly matched cards in their appropriate carrier.

The code information also permits last minute automated pulling of bad accounts after insertion and just before stuffing by permitting in-line or stack scanning of completed inserted/folded carriers to produce an updated issue. The up-dated issue of completed/folded carriers is then stuffed into window-type mailing envelopes with the address indicia oriented for visual reading.

The instant verification and insertion system (VIS) apparatus and method involves: sensing information in or on cards (embossed, magnetic strips, printed, punched, inlaid, permanent magnetic code embedded cards, and the like); feeding continuous carriers or single-sheet carriers into the VIS apparatus; in the case of continuous carriers, separating individual carriers from the web; sensing information carried on the carriers; comparing the information on the cards and carriers; automatically inserting the appropriate number of correctly matched cards in the appropriate carrier; and folding the carrier in a form ready for automated stuffing into mailing envelopes; pulling bad accounts after folding; and stuffing in mailing envelopes. Reject, pause and search modes of operation are provided.

It should be understood that throughout, the term "credit card" is a shorthand reference to any type of card susceptible of being or requiring transporting or handling by a carrier, and includes by way of example credit cards, bank cards, debit cards, retail cards, identification cards, account cards, security cards, pass cards, key cards, photo ID cards, charge cards and the like.

"Carriers" or "credit card carriers" include carriers of any kind and include mailers and/or envelopes therefor where applicable. "Information" includes information relating to the cardholder and/or account as applicable and includes any form of representation. "Indicia" or "number" includes markings of all sorts, numbers, letters, designs, fonts, codes and the like. "Pulses" include any form of information bit transfers whether mechanical, electrical or in the electromagnetic wave spectrum, for example, electrical signals, visible, UV or IR light waves, microwave, magnetic bubbles and the like. "Readable" or "scannable" includes any manual (visual) or mechanical manner of ascertaining information from the carriers or labels, and by "mechanical" is meant to be included in whole or in part any optical, electro-optical (photo-optical), magnetic, electronic, electromechanical, electric, and purely mechanical methods and apparatus. Reference to "cardholder account number" or "account number" includes any unique identifying or code number relating to an individual cardholder and is not restricted to a financial-type account. It may include a number assigned to an employee permitting access to certain buildings, rooms, files and the like. "Web" includes an extent of sheet material whether in single sheet form or continuous form. "Verification" or "verifying" or "verifier" refers to apparatus and method of reading data from cards and carriers and comparing them to see if there is a match of the data. This may include storage of the data and initiation of commands (machine instruction pulses) in accord with a predetermined program depending on the condition of match or mismatch. The term "data match" and "match of data" are used interchangeably in a descriptive sense.

The apparatus comprises a series of operatively interconnected modules: (1) the mechanical module, (2) the logic command module (LCM), including its keyboard (input/display) submodule and (3) the power supply module. There are, of course, a housing or desk for these modules including wrapped carrier output hopper, and necessary cabling and connectors. In the case of continuous 2-wide carrier forms, a slitter/merger/interleaver, such as a Standard Register Model SMI/300, may be employed to separate the forms into an A-stream and B-stream of carriers ready for continuous feed into the carrier lead-in chute of the mechanical module.

The mechanical module, in turn, is an assembly of a series of sub-modules, comprising: (a) mechanical module frame, (b) carrier lead-in chute including feed roller idlers; (c) burst station including burst frame, providing burst floor, burst bar, burst blade, feed rollers, OCR (optical character recognition) head, carrier feed sensor, burst sensors, and associated drives; (d) card tract assembly, including card input hopper, ECR (embossed character recognition) assembly, picker/drive assembly, card laydown assembly; (e) card reject hopper; (f) load bucket (card insertion) assembly; (g) indexing assembly, including index floor, pocket tongues, sensors (P-1 and P-2 sensors), index rollers (driven), indexing pinch rollers (idlers) and associated drives; (h) wrap station assembly, including wrap frame with pinch and drive rollers, wrap fingers, wrap bar, and wrap sensor.

The logic command module (LCM) comprises (a) a keyboard/display; (b) an interface board; (c) a microprocessor; and (d) associated processor chips and controls. The interface board (IB) takes data and conditions it (converts it to digital pulses) for input to the microprocessor.

The IB contains the following:

| a. Inputs | b. Outputs |
| --- | --- |
| 1. 4 ECR; | 1. Machine drive clutches; |
| 2. 4 OCR | 2. Keyboard status; (button signal) lights; |
| 3. 8 Machine function (status) sensors; and | 3. Display (Burroughs) |
| 4. Keyboard | 4. Card and account cummulative counters; and |
| | 5. Audio alarm (error buzzer). |

The Microprocessor comprises: (a) a machine operations program; (b) 4K bytes of EPROM (Eraseable Program Read-Only Memory) and (c) 1K bytes RAM (Random Access Memory), on an appropriate mounting board and connections.

The Keyboard/Display comprises a housing in which are disposed: (a) a Burroughs Model SSD 00132-0040 gas tube display; (b) 13 status command/control buttons (lighted, push type); and (c) PC board with appropriate connections and switching. The Power Supply Module includes supply for ±5 V D.C., ±12 V D.C., ±14 V D.C., +250 V D.C., audio alarm, account counter, card counter, and hour meter.

In the operation of a principal embodiment, web line printed carrier pairs are separated longitudinally into a pair of fan-folded carrier streams, an A stream and a B stream, which are fed into the Mechanical Module of the apparatus in alternate, step-wise fashion. Individual ones of the carriers are then burst from the stream, a first flap (the P panel) folded, and the folded carrier advanced (indexed) to a first card insertion position, the P-1 position. While being indexed, information printed or contained on the carrier in a specially oriented position is read by a photo-optical head (the OCR) to provide information about the account (including the number of cards to be inserted to the carrier) to the logic and command circuitry (LCM). As carriers are fed into the system, credit cards are picked individually from a load track (card hopper), advanced through a reading station where information about the individual cards is sensed by the ECR head and forwarded to the logic and command module (LCM). In the LCM the information about the account is compared with information from the cards. If there is a match in the data (data match), the correct card and correct number of cards are automatically, mechanically inserted sequentially in the special carrier slits or slots.

Where, for example, the account information indicates only one card is appropriate for the carrier, the carrier will be cycled sequentially through the second insertion position without additional cards being inserted. This is accomplished by a programmed command function which causes the picker to stop, while the carrier continues to be advanced. In addition, where there is a carrier/card mismatch, the LCM can optionally command the mechanical module to cycle through a plurality of cards while the carrier remains stationary. Rejected cards are retained in a reject hopper and may be recycled to the load track. This preprogrammed search mode may be repeated as desired by an operator. The carrier with its individual complement of from one to eight cards is then advanced through a wrap station where a third flap (the O panel) is folded along the second transverse fold line completing the wrapping of the carriers.

The folded carriers exit the apparatus into the carrier output hopper folded and in account sequence. The completed carriers are oriented in a manner that account information is visible along the upper edge, which information is presented so that it may be selectively read or sensed for further processing, pulling or checking. The completed carriers, alone or with other mailer information, may then be inserted or stuffed into envelopes for mailing to customers.

The carrier sensing or read station function may be carried out by any appropriate sensing apparatus, such as photo-optical sensing heads, bar code readers, or the like. The code on the carrier may be of any type, including bar code, special optical characters, or the like. We prefer to use 1-bar or I-bar code oriented in 1, 2 or 4 lines which gives unique information to the input/logic/command module of the apparatus of this invention. Optionally, the account information may be magnetically encoded on a magnetic stripe provided on the carrier, or may be embossed in the carrier or provided as holes punched though the carrier. More detailed description of the carriers and information is presented in copending U.S. Pat. No. 4,034,210, the disclosure of which is incorporated by reference herein.

The card sensing or read station may employ any appropriate sensing or "reading" devices for recognition of the embossed characters on the cards and/or of information in the magnetic stripes on the cards, where applicable. Thus, magnetic pick-up heads, photo-optical devices or mechanical sensing means may be employed to obtain information from the card and forward it to the LCM. These include means for sensing or reading Hollerith punches, optically or mechanically sensing embossed characters, optically reading bar codes, and sensing information encoded on magnetic stripes on the cards. We prefer to use a special mechanical/fiber-optic/photo-transistor sensing head that reads the front (raised) or back (recessed) side of the card, which device is the subject of our copending application Ser. No. 723,215, filed Sept. 14, 1976, entitled "Embossed Character Reader", the disclosure of which is incorporated by reference herein.

The device and process of the instant invention may be used in combination with tape or computer-driven credit card embossing machines to feed embossed cards directly into the card tray or picker station. It can also feed completed carriers directly into envelope stuffers or inserters. The device and process can also be preceeded in operative combination with a line or drum printer, and where the carrier forms are two (double-up) or more wide, with an intermediate slitter and/or slitter/merger/interleaver. Use of a drum printer with a one-wide web in which the axis of the card-holding slits in accord with this invention are oriented adjacent one margin and parallel to the longitudinal axis (rather than a one, two or more wide web printed transversely with a line printer) is also within the scope of this invention. In this alternate embodiment, the carriers are fed continuously transversely into the carrier read station without change of web or carrier direction.

DETAILED DESCRIPTION

The following detailed description has reference to the figures and specific examples which are by way of illustration and not by way of limitation of the principles of the invention. The description which follows may be divided into subheadings which refer to subassemblies and/or their functions, carriers, and process operations, for ease of understanding, and such subdivision is not meant to limit the combinational or subcombination aspects of the inventions disclosed herein.

VIS SYSTEM OVERVIEW

By way of introduction, FIG. 1 shows in perspective one embodiment of a verifier-inserter system 1 for automatic folding and inserting of credit cards in the carriers of the present invention. A two-wide carrier form set 2 (not shown) is split or boned along its center and drive strip perfs to provide an A stream an a B stream which are fan folded into two stacks 3 and 4, respectively. The stacks are shown separately in FIG. 1 but they may be interleaved as shown by arrow 5. The streams are fed into the mechanical module 6 of the VIS unit 1, in an upside down orientation (the side shown in FIG. 3 being down; this is the side containing the OCR readable machine instruction information), with the B carrier stream under the A stream. The B stream is advanced into the VIS unit by a friction drive engaging the carrier stream web centrally thereof. The marginal drive strip has previously been boned (peeled off) the carrier form prior to the first folding step. Similarly, the A carrier stream is advanced by a corresponding friction drive (See FIG. 11) into the mechanical module.

It is preferred to slit or bone off any pin drive strips with a decollator prior to the carrier streams entering the VIS unit. Boning is breaking the ties (pieces of paper between cuts; a cut plus tie is a perf), and this may be accomplished in a conventional decollator, for example, a Moore Business Forms, Inc. Model 284B decollator or a Standard Register SMI 300. Boning is preferred to slitting as the operator may misalign the central and marginal slitters to produce the wrong-sized forms. Where the strips are boned or slit prior to feeding into the VIS, advancement of the carrier forms through the VIS are by friction drive rather than by pin drive.

The carriers enter the unit, O panel first through carrier lead-in chute 110. The carrier form is then separated (burst) from the subsequent carrier along stream fold/burst lines 15 and 18 (as the case may be), e.g., by drawing the carrier under tension across a relatively sharp edge or wire. The P panel of the separated carrier 9 is simultaneously or sequentially folded back toward the M panel as shown by arrow 12 and retained at an acute included angle as shown at 23 in FIG. 1. The carrier is then advanced or indexed sideways, as shown by arrow 35 so that read head 16 scans the information means 124b (see FIG. 3). In this embodiment, the read head is an optical character reader (OCR) scanning 1-bar code. The head may be any other type above-described to scan the appropriate mode of information from the carrier, i.e., mag stripe, mag code, delta distance code, punch holes, embossed characters or the like. The scanned information is transmitted by line 17 to a logic and command module 7 (LCM). The LCM stores the information about the carrier including account identification number and number of cards to be inserted in that carrier.

A stack of credit cards 8 is placed in a receiving tray 27 of the VIS unit. The cards are advanced by pusher 19 to picker 10 as shown by arrow 11. The cards are removed from the stack one by one and advanced through an embossed character reader (ECR) 13 as shown by arrow 14. The ECR reads the account number embossed on the card and the information is transferred to the LCM 7 via line 20. It should be understood that the card reader may be any type of reader and is not limited to an embossed character reader. For example, the reader may contain heads for reading magnetic stripes, indicia or bars on or embedded in cards, or an optical reader for reading characters, indicia, fonts, color bars and the like printed on or embossed in the cards. The preferred head is more fully disclosed and claimed in co-pending application Ser. No. 723,215 referred to above.

The LCM compares the information from the carrier and the card, e.g., bar code to embossed, or embossed to magnetic, magnetic to magnetic, punch to embossed, punched or embossed to magnetic, and the like, or vice versa. If there is a match, the card is placed into an insertion mechanism load bucket 21 by a laydown mechanism 22 and inserted into the first slot or slit (pocket) 24 of the carrier. If the card does not match the carrier, the card is ejected to reject tray (hopper) 25, or the carrier is advanced to reject tray (hopper) 26. The LCM then initiates a search mode in which cards 8 are advanced through the read station 13 until the correct card for the carrier is found. Alternately, the VIS can serch through the carrier by advancing them through the read station 16 until the matching carrier is found. It is preferred to search the cards since the rejects may be replaced, in sequence, from reject tray 25 to the card feed tray (hopper) 27 more simply then refeeding carriers after finding the correct card. Further, if one or more cards have been inserted in the carrier it is simpler to find the card than advance the carrier.

Where there is verification, i.e., a match between card and carrier, the card is laid down and inserted. Where the information from the carrier indicates a second card is required, the carrier is advanced to align a second pocket 28 with the insert mechanism 21. The cards and carriers are advanced simultaneously so that the card will be in place for insertion in the pocket upon indexing (advancing) of the carrier pocket into position.

When the correct number of cards are inserted in the carrier, two are shown in FIG. 1 in pockets 24 and 28 at position 29, the carrier is advanced again out of the insert mechanism into the wrap station 140 and the O panel folded over the exposed cards in the P panel as shown by arrow 30. The completed, inserted and folded (wrapped) carrier is then ejected 229 and stacked in carrier output hoppper 31, or forwarded directly to a mailing envelope stuffing operation, or to be scanned prior to stuffing in a premailing pulling and checking operation.

The command outputs from the LCM 7 are shown in FIG. 1 in schematic as carried by line 40 to activate the VIS motor 33 which transfers power to the various subunits described above by jack shaft 34. Power is selectively transferred to the individual subunits by selective activation of clutch means on the jack shaft on command from the LCM via lines 44 through 46; in one embodiment to the power clutch (line 41), motor stat (line 42), and to the picker and card laydown mechanism 43. Likewise, power is activated off the jack shaft via line 44 for indexing the carrier, via lines 45 and 46 advancing the carrier streams into the VIS unit, and for the final fold, all by clutches on command from the LCM. Machine status sensor inputs to the LCM are shown via line 74. The keyboard/display is 84.

The numbers I, II, III, and IV in FIG. 1 refer to four individual carriers fed into the mechanical module of the VIS unit in that numerical sequence. Items 50, 51 and 52 are optional glue strips adjacent the side edges of the carriers so that when folded the carrier is sealed by the adhesive forming a completed (mailable) envelope. This is more completely described in our U.S. Pat. No. 4,034,210.

FIG. 2 is a schematic diagram of the method of this invention and further illustrates the operative steps of the VIS unit as described above with respect to FIG. 1. The upper, A-stream 3 and lower, B-stream 4 of merged interleaved carriers 5 are alternately fed into the burst station 90 of the mechanical module. In the mechanical module, the P panel is folded 12 and the individual carrier (see carrier 9 in FIG. 1) is indexed 35 through the carrier read station where the OCR head reads the information specially imprinted on the carrier. The carrier data 17 is transferred to the LCM 7.

A supply of cards 8 is placed in the card feed hopper 27 which are then advanced 11 to the card feed picker mechanism 10. The picker removes each card in sequence from the stack and advances it 14 past the ECR station 13. The ECR reads embossed or mag stripe information on the card. The card data 20 is transferred from the ECR to the LCM. The picking of the next card in the stack automatically transfers 61 the card which had just been read to the card laydown mechanism 22. he indexing 35 of individual carrier has been completed and it is now in the first pocket insert position 29a.

The LCM is preprogrammed so that if the card data from the ECR matches the carrier data from the OCR, a data match condition 60 occurs, the card is accepted and dropped by the laydown door 22 into the card insert mechanism (load bucket) 21, which inserts 62 the card into the first pocket 24 of the carrier. Depending on the information read by the OCR from the carrier, additional cards may be inserted into the carrier as follows: Where the special information imprinted on the carrier indicates that two cards are required, the LCM is preprogrammed to command the carrier to be advanced by the indexing mechanism to the P-2 carrier pocket position. As noted in more detail below, the binary numers 11 through 14 on the carrier indicate one through four cards to be inserted in the typical two-pocket carrier. When the binary number is 11, the carrier is further advanced 32 through the wrap station 140 and out to the wrapped carrier output hopper 31. Thus, when the card quantity equals 0, the command 65 for advancing through the wrap station to the output hopper is initiated by the LCM. At the same time, the command 66 to the burst station (item 90 FIG. 5) is initiated to call for the next carrier in sequence for its feeding and bursting operation 12.

Where the card number is binary 12, 13, or 14, the preprogrammed LCM commands 67 the next card to be fed from the card picker through the ECR for data match and insertion into an appropriate pocket of the carrier. This next card command occurs when the card number does not equal 0, that is, additional cards remain to be inserted in the carrier. In addition, the LCM is preprogrammed so that any card quantity that is not a valid number, i.e., is not binary 11-14, automatically sets the card quantity to 0 and the carrier goes right on through the wrap station to the output hopper, being effectively pulled from the card insertion sequence.

There is also an optional card search mode preprogrammed into the VIS unit LCM. Where the data from the card and carrier does not match, i.e. a match error 68 occurs, the LCM can cause the card to be rejected 69 and the card then forwarded 70 to the card reject hopper 25. Optionally, the LCM can include a preprogrammed card search mode. In this mode, the LCM is preprogrammed so that upon a match error 68, the LCM can command 71 the card feed picker to advance another card through the ECR to check the data for match. If a match then occurs, the normal program is reentered and the card is inserted into the appropriate pocket of the carrier. In the optional card search mode, the LCM may be preprogrammed to search through ten or twenty cards in the stack to find the correct card to match the carrier in the P-1 or P-2 position in the insert station. If no card has data matching that called for on the carrier, an operator warning light or alarm buzzer may be sounded alerting the operator to termination of the operation for that cause, or the machine can automatically shut down at that step. In normal processing, the wrapped carriers in the output hopper are then transferred to a stuffing machine 72 such as a Phillipsberg machine which inserts the wrapped carriers in mailing envelopes. Optionally, bad accounts may be pulled 73 at that point in the processing.

The LCM also receives inputs from function sensors 74 of the mechanical module. In the specific embodiment described in more detail below, there are eight sensors on the machine, seven of which indicate the status of operation of the machine to the LCM during cycling operation. These inputs permit the LCM to compare the actual stage of operation of the machine with the program, and if the machine parts and carrier therein are in their proper positions, the machine automatically proceeds through the program in proper operational sequence. The LCM has a keyboard display assembly 84 which includes a keyboard 75 and a display portion 76. This is connected as at 77 for 2-way transfer of information. The keyboard functions to permit operator input of commands to the microprocessor and signal light confirmation of actuation via an interface board described in more detail below. The display permits output display of the status of the machine and operating steps of the program to a human operator. It also can display the account number and number of cards being read either by the ECR or OCR heads.

Referring now to FIG. 3, this figure illustres in plan view one side of a credit card carrier in accordance with our U.S. Pat. No. 4,034,210 which is used in conjunction with the VIS unit of this invention. The carrier shown here is a two pocket carrier containing two spaced-apart V-shaped slits 24 and 28 in the P panel. This is joined to the O panel by an M panel centrally thereof. First transverse fold line 36 along with the marginal edges 47, 48 and 15 define the P panel. Likewise, the second transverse form fold line 39 along with form marginal edges 47, 48 and 18 define the outer O panel with the M or middle panel aligned therebetween. Address indicia 37 and account indicia 38 are located in this example on the O panel, but is should be understood that they may be located on any suitable panel or side of the carrier. In this example, the margin 48 also forms the central longitudinal perf line of a 2-wide form.

The special information means which is readable by the VIS unit of this invention may be disposed on any panel of the carrier, and may comprise the numeric (Arabic) account information 38, or the alphabetic and-/or numeric address information 37 on the O panel, or the information means 123 on the P panel. It should also be understood that the slit or slot means for retaining the credit cards need not be disposed solely on the P panel, but may also be located on the M or the O panel, depending on the manner in which the carrier is folded. The closed type of letter fold shown in FIG. 4 is given by way of example only. The open-type letter fold (also known as a Z-fold) may also be employed. Where the Z-fold is employed, wedge trapping of the cards is best achieved by having the card carrying slits or slots disposed in the M panel.

It should be understood that the machine readable information 123 may be of any suitable type, such as is readable by optical character recognition type devices, or as magnetic stripes or bars which are electromagnetically and electronically encoded and read. The information may also be presented as Hollerith type punches, as bar codes readable by photo-optical scanners, as embossings readable optically or by mechanical devices having sensing fingers, as OCR readable font (such a IBM 1428 or OCR Type A), as OCR readable delta distance code (like the universal product code found on grocery items), as codes or indicia printed in fluorescent ink or struck from fluorescent ribbon and OCR readable under ultra-violet illumination, as mark sense codes, as bars printed in magnetic ink or struck from magnetic ribbon and readable by electromagnetic readers, as visually or OCR readable color bars, as magnetic ink or struck ribbon font readable by electromagnetic readers (like MICR readable font on checks), and the like. By way of example the bar code form is shown herein, but it should be understood that the principles of the invention apply equally to the other forms mentioned or contemplated.

Referring still to FIGS. 1–4 and 13 (and most particularly to FIGS. 3 and 13), information means 123 may be placed on any panel, on a label disposed on a panel, or on an envelope or label on an envelope. In the following discussion, by way of specific example, there is particular reference to I-bar or 1-bar code information 124b readable by the OCR head 16, but it is understood that any part or all of the information 123 may be machine "read", including the arabic numerals 124a in OCR 1428 type A font or the like, as above described. Note that the I-bar or 1-bar code 124b is the binary translation of the information 124a for ease of reading by the particular OCR head used by the VIS system of this invention. "Reading" the information 123 directly (reading 124a) or indirectly (reading 124b) is equivalent for machine function. The information means 123, and more particularly machine readable information 124b, may be placed on any panel, on a label disposed on a panel, or on an envelope or label on an envelope.

The information 123 should be disposed in a position to be scanned visually or by the mechanical reading means for inserting, verifying, pulling and/or stuffing devices. The information 124b is particularly suited to be disposed on a carrier panel juxtaposed opposite a special window in a mailing envelope, so that it is readable therethrough. This permits sealed enveloped detection and pulling of accounts even after stuffing in envelopes. In another embodiment, information 124b is printed in transparent fluorescent ink over the address indicia 37 and is readable under ultra-violet illuminated through a standard envelope window, yet the code does not obscure the address and is not detectable by ordinary means.

The bar code specifically illustrated is 1-bar code in FIGS. 1, 3 and 4, and I-bar code in FIG. 13, as these are printable by standard printing devices, such as line printers, drum or roll printers, non-impact printers and the like. I-bar or 1-bar is preferred over |-bar code as the top and bottom crossbars assist in producing reject error messages (cross talk) if vertical line weave occurs. The code 124b is different for each carrier, and contains information which serves a plurality of functions including identification of the particular carrier as that of a particular account (person), instructions as to the number of cards to be inserted, the card number to be inserted for verification (matching) of cards being supplied, the issuer number, issue number, run number, series number, carrier sequence number, and the like.

In FIGS. 3, 4 and 13 the bar code is shown as disposed in four horizontal rows, but may be in two sets of two rows, or as a single row. This code is a binary code of 4 bits 1, 2, 4 and 8, the bars in each row representing 1 bit value. Referring to FIG. 3, the uppermost row 161, each 1 represents a one, the next row 162 below that contains the twos bars, the third row 163 contains the fours bars, and the bottom row 164 contains the eights bars. The rows can be paired with a first pair to the left of a second pairs, for example, the ones and twos rows to the right of the fours and eights rows. In the alternative, the ones and fours rows may be spaced to the left with two and eights to the right. In short, any convenient pattern of rows may be employed so long as the scanning device for reading the bar code is oriented appropriately.

| 1 4. | or | 1 2. | or | 1 8. | or | 8 2. | etc. |
| 2 8 |  | 4 8 |  | 4 2 |  | 1 4 |  |

The rows may also be spaced along a single line with the rows order illustrated being 1, 2, 4, 8; of course, any convenient sequence may be employed: 1, 8, 2, 4; 4, 1, 8, 2, etc.

Another form of single line code that may be used is double frequency coherent phase encoding (an encoding technique developed by Aiken in 1954). The data is comprised of data and clocking bits together. An intermediate bit occurring between clocking bits signifies a one, the absence of an intermediate bit between clocking bit signifies a "zero". Of course, other techniques of encoding, single or multiple line, may be employed.

The areas 165, 166, 167, 168 represent initial starting portions that scanner heads look at when the carrier is properly indexed into the automated card insertion/carrier folding apparatus (mechanical module 6). When the carrier and scanner heads are moved relative to each other, e.g., in the direction shown by arrow 49 in FIGS. 3 and 13, the four binary bit rows are scanned simultaneously. In the alternative, the rows may be scanned sequentially, if desired, by applications of the scanner head or controlling the carrier motion.

Vertical spacing of the rows is not particularly critical. Standard vertical spacing of line printers is either ⅛ inches of 1/6 inches. "I" or 1 symbols are preferred rather than plan vertical bars to detect vertical crosstalk. Only the center portion of the bar is optically scanned; therefore vertical spacing drift into the row above or below results in a much longer dark pulse width producing a detectable error from the optical character reader with an alarm to notify the operator to correct the vertical alignment of the line printer.

Similar error detection has been designed into the system for horizontal spacing errors. For the 0.1 inch bar code spacing shown, the printer can shift position ±0.050 inch, i.e., a half-space, yet the code is readable. Ability to accept carriers within such a latitude is an important aspect of the invention.

For example, in the four line bar code should one or more lines drift left or right, the phase of the four channels would be not synchronous. For a 3-pocket carrier used for up to 3-card issues, 1 card pocket, in the event the horizontal drift or error becomes so large as to approach a full space (1/10 inch), the logic is arranged to require a binary number code 11, 12 or 13 in the first digit, a binary number code 14 in all blank digits, and a binary number code 15 in the last digit space. It is obvious that these conditions would not be met, and the horizontal error would be immediately detected. Of course, other unique logic arrangements can be used to detect misalignment errors due to faulty printer set up.

For a 2-pocket carrier, the "first" position or column (see column position 173 in FIG. 3) is reserved for card quantities one through four (for up to a 4-card issue), and a binary number 11 through 14 is utilized in that position. If binary 11–14 appears in any other position, it is an invalid word, and may represent, among other things, a line printer error, error in input, or the like. If any binary number other than 11–14 for card quantity appears in the "first" position, the program automatically sets the card quantity to zero and the carrier is pulled, i.e., cycled on through the VIS without cards being inserted. In columns 2–20 (positions 174–177 in FIG. 3), a binary 1 through 10 appears. The VIS is programmed so that a data match between card input 20 from the ECR 13 and carrier input 17 from OCR head 16 occurs only with those numbers. In columns 2–20, a binary 15 represents a space so that if there is drift, that number changes to a 14 or an 8 etc. and there is a match error. The 21st position (position column 178) is batching instruction position for the machine. A binary 15 in that position is used for all but batch carriers and as an end sentinel for non-batch carriers. A batch carrier is the last carrier in a batch. That carrier may have any binary number 1–10 (or optionally 11–14) in the 21st position. It could even be left blank; absence of a number could signal a batch carrier. Thus, the LCM can be programmed so that anything but a binary 15 (or any other preselected number) in the selected batching instruction position indicates the batch carrier and instructs the mechanical module to go through selected shut down procedures, or other selected steps (start processing next batch, call operator, etc.).

The code sequences of indicia 124a are important, and the binary bar code representation 124b of the indicia 124a is specially adapted for the instant VIS invention. Code sequence 170 (see FIG. 3) has a number of subunits, some of which are optional. Unit 171 is the zip code of the account (cardholder). Unit 172 is conveniently the batch number of cards in that particular issue. Unit 172 may also be or include an issue number, a batch number, quantity number, process date (Julian day), or an issue and batch number, or an issue, batch, card or carrier sequence number depending on the number of digits and spaces. While shown as a three-digit number, it may be any number of digits to include the desired identification. Units 171 and 172 may be to the left of unit 173 as shown, or to the right of unit 178.

Unit 173 is the number of cards in the account, e.g., 1 to 4 in the examples herein. An important aspect of this invention is the binary designation of 11 for one card, 12 for 2 cards, 13 for 3 cards, and 14 for 4 cards in the account. Where there are up to eight cards in a carrier (four retail card slits carrying two cards each in piggyback configuration), the unit 173 may be 2 or 3 digits (spaces or positions) wide for the appropriate binary code. Thus, binary 14 in the first space followed by binary 13 in the second indicates 7 card total (4+3); 13, 12, 10 (or 15) indicates 5 cards (3+2+0), and the like. In normal binary code the values are 0 through 9, whereas in the present code the values are 1–10. In normal binary, nothing (no mark) in a space means zero. In the present code, zero is an error and detectable as such in the present binary bar code. For spaces between numbers or units, a binary 15, i.e., a 2 bar plus 4 bar plus 8 bar is used in the instant code, and is detectable as such. There is no confusion between a zero and a space in the code of this invention.

Unit 174 is the number of the issuer, e.g., the bank, savings and loan, company, etc. Unit 175 is the branch number of the bank, factory number, type of account, state code or the like, as desired. Unit 176 is the account holder number. Unit 177 may be unused and provides for growth in the number of accounts, or may be used as a carrier sequency number, or the like. Unit 178 is a stop scan command number, batch carrier position, or the like.

There are a maximum of 19 digits, including spaces, in a credit card account number. In the carriers of this invention, we provide a minimum of twenty-one and a maximum of twenty-eight words or positions, including spaces, in the field 170 or subfield 173–178. Nineteen of these words correlate to the credit card account number, and one word is for an end sentinel (stop scan signal), batch carrier number, or the like 178. In the figures, one word (position, space, character or binary digit) has been provided for the number of cards 173 for our minimum of 21. When more than four cards are inserted in the carriers, up to two additional words are provided for the number of cards 173. Optionally, we provide one word for start scan and one for a parity check, for a total of 25 words in the field length. In the carrier illustrated, the distance between adjacent slit center lines is 4.2 inches (10.668 cm) for standard credit cards. The scan path length is 3.5 inches (8.89 cm) since the carrier moves relative to the OCR 16 that length when the carrier is indexed into the first pocket 24 insertion position P-1. This permits expanding the field length to 28 words or more to satisfy other functions, e.g., for sequence numbers, issue code numbers, batch numbers, batch numbers, issue code numbers, batch numbers, and the like. The second index to the P-2 position for insertion of the second (or third and/or fourth cards) is 4.2 inches (10.668 cm), and the final indexing to the wrap sensor 109 is 3.8 inches (9.652 cm). Non-account information, such as 171, 172 (FIG. 3) may lie to the right or left of the field 173-178. If it is to be scanned, the scan start positions 165-168 would, naturally, lie to the left (FIG. 3) of the first position to be read, e.g., to the left of unit 171.

Note also that the binary 15 is a space in the bar code 124b, and the stop scan or batch number is also a binary 15. Thus, the binary representations of numbers 1-9 are conventional, zero is binary 10, and 11-15 have special meaning as described above. Thus, if an 11-15 appears in a number space due to printer misalignment of the bars, it is detected as an error signal. The zip code and issue or batch numbers may be omitted where desired from the indicia line 124a. The brackets 173-178 above the indicia 124a correlate below to the bar code 124b, and the bar code can be visually read if desired.

FIG. 4 shows in perspective a carrier 9 folded with the O panel (the outer or end panel) folded over cards 8a and 8b which have been inserted into pockets 24 and 28 respectively. The carrier with cards inserted into the pockets is shown with the O-panel flat in phantom. The wrap station, as shown below in FIG. 17a and 17b, folds-over the O panel as shown by arrow 30. This presents the address indicia 37 to be juxtaposed to a window in a mailing envelope. A portion of the O panel is broken away to show the machine instruction information indicia 123. The various side margins and other panels of the carrier as identified in FIG. 3 are also shown in FIG. 4.

MECHANICAL MODULE CONSTRUCTION & OPERATION

FIG. 5 is an exploded perspective view of the VIS unit 1 showing the various modules above identified in their interrelated position and as they can be conveniently housed in desk unit 80. The mechanical module 6 slides into and is supported by the mechanical module support frame 81 which is then latched upwardly as shown by arrow 86 to hold the mechanical module in position so that the carrier lead-in chute 110 is positioned opposite the carrier lead-in slot 82 in the side wall of the housing 80.

The logic command module 7 includes a logic submodule 400, and a control keyboard/display submodule 84 which are conveniently housed in the lower and upper drawers of the desk housing 80. The power supply module 85 with its power supply cord may be housed in a rear portion of the housing 80. The wrapped carrier output hopper 31 is receivingly disposed in aperture 77 in the top 78 of the housing 80. Aperture 79 is also provided in the top to permit access to the mechanical module when it is in position in the housing. A notch 87 is provided as part of that aperture for access to the card input hopper 27. This permits loading the card input hopper from the top, and removal of rejected cards from the card reject hopper 25. In addition, it permits access to the burst station 90, the indexing assembly 100, the wrap station 140 and the card track assembly 130, without removal of the mechanical module from the housing, when desired.

The mechanical module 6 comprises a frame or base 83 having a burst wall 264 and a wrap wall 266. The carrier lead-in chute 110 is mounted between burst wall 264 and center wall 262. Mounted behind the lead-in chute is the wrap station 90 which comprises a burst frame 91, a pivoting burst floor 92, a burst blade support 93 having mounted thereon the burst blade 94, and the OCR head 16. Just forward of the burst and burst blade support are the carrier feed roller drives, with element 96 referring to the upper drive roller and 97 the lower drive roller. These carrier feed rollers cooperate with the feed idlers 111 attached to the carrier lead-in chute 110. At the rear end of the pivoting burst floor is the carrier feed sensor 95 which detects the presence of the marginal edge 18 of the O panel of the carrier when it is fed into the burst station. Mounted in the burst frame is the burst bar assembly 98 which is driven by burst shaft 250, and slides transversely on burst slide shaft 108. The burst cam roller 106 contacts and actuates the pivot of the burst floor during the carrier bursting operation. The operation of the burst station is shown in more detail below in FIGS. 6 A-C, 11 A B, and 12 A-C.

The burst station bursts individual carriers from the streams of carriers fed into the upper track 136a of the carrier feed-in chute and alternately the lower track 136b. As noted above, the carriers are fed-in upside down, that is, with the side showing in FIG. 3 being downwardly. The individual carriers are burst from the upper, A stream of carriers first, and then alternately from the lower, B stream. The burst bar folds the P panel of the carrier along the transverse form fold line 36 and feeds it through aperture 263 in burst frame wall 262 into the indexing assembly 100. The indexing assembly comprises index floor 101 to which is mounted index drive roller frome 104 containing index drive rollers 105. The drive rollers are powered by a miter gear assembly shown in more detail below. The marginal edge 47 of the carrier is received between the belt of the index drive rollers and the idler index pinch rollers 99 which are mounted beneath the inserting mechanism (load bucket) 21. The indexing assembly 100 advances the carrier across the OCR head 16 to the P-1 position as sensed by the P-1 pocket sensor 102. After a card is inserted, the indexing assembly then advances the carrier to the P-2 pocket postion as sensed by the P-2 pocket sensor 103. After the second card is inserted by the insert mechanism 21, the carrier is then advanced over to the right-hand edge of the index floor 101 as sensed by the wrap sensor 109.

A pair of wrap fingers 202a and 202b (see FIGS. 6-C) then push the inserted carrier backward into the pinch of the wrap station 140. The wrap station comprises a wrap drive frame portion 141 of the midwall and wrap wall into which is mounted the wrap roller assembly 142, and the wrap bar 143 which is pivoted on the wrap bar pivot shaft 144. This mechanism is shown in more detail in FIGS. 17A-D. The wrap station folds the O panel over the inserted cards as best shown in FIGS. 17A-D to form the completed wrapped carrier as shown in FIG. 4. The wrap station ejects the wrapped carrier into the output hopper 31. The completed wrapped carriers can then be inserted into mailing envelopes as described above with respect to FIG. 2.

Referring still to FIG. 5, a stack of credit cards 8 is placed into the card input hopper 27 of the card track assembly 130. The card pusher block 19 urges the cards against the picker finger 150 (FIGS. 15A-C) of the picker assembly 10. The card pusher block is biased toward the picker assembly by a cable wrapped around a spring-biased spool on the picker assembly. The picker finger removes each card in sequence and passes it through the ECR station 13 which reads the embossed characters on the card and transfers the data to the LCM. Details of operation of the embossed character reader are best shown in copending application Ser. No. 723,215 which is incorporated herewith by reference. The data earlier read by the OCR head 16 and transferred to the LCM is compared in the LCM with the ECR card data. If there is a data match, the card is advanced to the card laydown door 22, and dropped into the load bucket insert mechanism 21 by the laydown spool 157 which is cable actuated by the picker assembly 10. Likewise, the insert spool 181 on the insert mechanism 21 actuates the insert wire 184 to push the card into the open pocket of the carrier. If the data from the card does not match that from the carrier, the card laydown door is not actuated and the picker assembly, upon removing the next card from the stack will advance the rejected card to the card reject hopper 25.

The keyboard display assembly 84 has a number of control buttons 75 and a display 76 so that the machine can be put on automatic cycling operation with the status of the machine operations being displayed, or can be operator-stepped through its cycle as desired.

Referring now to the series of FIGS. 6A-C and FIG. 7, these figures show in plan view the operation of the mechanical module 6 as controlled by the LCM and its keyboard. FIG. 6A shows all the parts numbered, while in FIG. 6B through 6C only the parts, cards or carriers, that have changed position or are not earlier seen in FIG. 6A, are numbered. This series 6A-C shows the machine processing carriers in the auto-cycle mode.

By the way of background, the start-up sequence is as follows: we shall assume the machine was empty of all cards and carriers when power was turned on. The power-up routine for the LCM clears the RAM memory and awaits operator instructions. The operator would normally select the auto-mode key 408 shown on the keyboard 75 (FIG. 7), and the logic command module would prompt the operator by displaying a "select upper/lower" message on display 76. The operator then selects the appropriate upper or lower carrier stream by pressing buttons 420 or 422. The LCM scans the eight function sensors to enter the program at the proper point, and then drives the appropriate clutches in the mechanical module to position the first card in the read position, the picker in the insert position and the burst bar in the up position. Each of the function sensors are used to signal the LCM that the function has been completed. In turn, the LCM then turns off the associated drive clutch. If the card track is empty and the picker cannot position a card under the ECR head in the read position, the ECR head will sense a card track empty condition and the LCM will prompt the operator with a "load card" message on display 76. Once the operator has loaded cards and selected the carrier, the LCM will control the first carrier feed, burst of the carrier, index into P-1, and collection of OCR and ECR data to make a match and decrement the card quantity for each card inserted. For each condition or position of the mechanical module, the LCM scans the eight machine function sensors. Depending on the remaining card quantity to be inserted, the LCM determines whether to: (a) read and insert another card in the first pocket; (b) read and move to P-2 to insert a card in the second pocket 28; or (c) cycle the completed carrier through the wrap station to the output hopper 31 if the card quantity has decremented to zero. A more detailed description of the operation follows with simultaneous reference to FIGS. 6, 11 and 12 as they show plan, perspective and section views of aspects of the operation.

FIG. 6A shows the mechanical module after inserting the last card 8b required for carrier I in the second pocket 28. Carrier II has just been fed into burst station 90 so that carrier edge 18 interrupts feed sensor 95. The burst bar 98 is in the "up" position. After carrier II is cycled (FIG. 6C) the next carrier, III, is fed in and takes the place of carrier II. The picker 150 and flag 152 are in the home position having just contacted the insert sensor 153.

FIG. 6B shows the completed carrier I just after having been indexed into the wrap sensor 109 causing the wrap cam clutch 200 to rotate the wrap cam 201 through one revolution, thereby actuating the wrap fingers 202a (and 202b, which is hidden in this view) to push the carrier into the upper floating wrap roller pulleys 209a and 209b and upper wrap rollers 206a and 206b deflecting the O panel upward into the wrap bar 143.

FIG. 6C shows the I carrier completely wrapped and exiting the output rollers 207a, b, c into the output hopper 31, while the next carrier II has been indexed into the P-1 position for card insert into the first pocket 24.

The burst cycle is shown in schematic sectional view in FIGS. 12A, B and C, and in perspective in FIGS. 11A and B. Referring to FIG. 6A (carrier II in the upper left), FIG. 12A for a section view, and FIG. 11A for a perspective view, either the upper carrier 9U or the lower carrier 9L coming in through the feed chute 110 is fed between the nip of appropriate feed roller 97 (upper) or 97 (lower) and pressure rollers 111U or 111L between the carrier feed guide 125, the carrier feed deflector 126, and the burst blade 94, thence below the burst bar 98 until the marginal edge 18 of carrier 9 interrupts carrier feed sensor 95. After the carrier has been properly positioned, the burst bar 98 moves downward (FIG. 12B), the forward edge of which follows the path as indicated by dotted line 112. The burst clutch 119 (FIG. 6A) rotates burst pivot shaft 250 to which are attached burst bar arms 148a and b. The burst bar 98 is pivoted from the arms on burst/slide shaft 108. The pivoting burst floor 92 moves downward around shaft 258 responsive to pressure from the burst cam roller 106 on shaft 108 pressing on cam 113 (compare FIGS. 12A-C).

FIG. 12B shows roller 106 falling off the step in cam 113a, causing the burst floor spring 114 to bias the burst floor upward to clamp the carrier 9 between the floor and bar with the fold line 36 at the nose edge of the burst bar. Further motion of the burst bar around pivot shaft 250 from point 112a to 112b causes tension in the carrier to pull fold line 36 to the nose of the burst bar (fold line search), and also pulls the burst line 15 to the top edge of the burst blade 94a. Burst, or separation of the carrier from the stream, starts at the center of V-shaped blade 94a, working outward in both directions progressively breaking the ties to keep the burst tentions at a minimum and ensuring burst along the proper line 15.

FIGS. 6A (plan view), 12C (section), and FIG. 11B (perspective) show the burst bar 98 in fold-down position with cam roller 106 having stepped-up onto the shoulder of cam 113*b* forcing the burst floor downward away from the burst bar releasing the clamp and allowing free movement of the carrier into the P-1 sensor during indexing. During final burst bar travel, positions 112*c* to 112*d*, the burst bar slide roller 145 working into notch 107, slides the burst bar sideways in direction 147 into index pinch roller 99. (See FIGS. 6B and 11B)

As best seen in FIGS. 11A and 11B, notch 107 in burst bar 98 contacts roller 145, on burst/slide roller arm 146 (partly shown in dashed lines), which is pivoted at its other end (as shown) under the burst floor 92. As the burst shaft 250 continues to rotate and the arms 148*a* and 148*b* move the burst bar forward, the burst bar is urged to one side (arrow 147) by the pivoting (arrow 193 in FIG. 11A) of the roller 145. The burst bar is free to move laterally on shaft 108. Spring 149 is compressed (FIGS. 6A, 11A & 11B). As the burst bar moves backward the spring urges the burst bar to the right in FIG. 11B returning it to its starting position.

The OCR pressure pad 259 ensures intimate contact of the carrier P panel with the OCR head 16. Upon completion of the burst cycle, the LCM monitors the OCR head to ensure that the carrier is properly seated against the optical window before indexing the carrier to P-1 sensor. To ensure proper OCR head contact and carrier tracking, the burst bar is held in its forward (down position) until the carrier reaches the P-1 sensor. Once the carrier has reached this position, the second index pinch roller 105 clamps the carrier for tracking control. As best seen in FIGS. 11A and 11B, the carrier passes through aperture 263 in mid wall 262 to reach the P-1 sensor 102.

FIGS. 6C and 11B show the No. II carrier in the P-1 position subsequent to the P-1 index stroke described above. During the P-1 index stroke, OCR data and ECR data from the first card for carrier II are stored and compared for match when the picker flag 152 interrupts the read sensor 154 (See FIG. 6A for parts not numbered on 6B and 6C). Data match causes the LCM to set the accept/match coil 156 causing the arm 195 to drop, catching pin 197 on the laydown spool 157. The arm actuates door 22 to drop the card 8*a* which is inserted into the first pocket 24. As described earlier, the LCM then either inserts another card in the first pocket or moves the carrier to the second pocket 28 while reading the second card, and if the data matches, inserts the second card in its pocket. If the carrier were a single card issue and the card quantity remaining had decremented to zero, the LCM would cycle the completed carrier through the wrap station 140 and stack it in the output hopper 31. However, most accounts are two-card issues and the LCM would command the mechanical module to index to the second pocket 28 while reading ECR data on the second card. When the picker reaches the read sensor 154, the carrier is at the P-2 position sensor 103, and the data matched with the stored OCR data would allow insert of the second card in pocket 28. During read insert of the first card for the second pocket, the appropriate feed roller 96, 97 is feeding the next carrier into the carrier feed sensor 95 to be ready for burst. The mechanical module has completed a carrier cycle and has returned to the status of FIG. 6A, except carrier II has replaced carrier I and a carrier (III) would be in place of carrier II. The machine continuously repeats this process, alternately feeding upper and lower carriers. Nine mechanical machine steps, or positions, are required to complete a full 4-card carrier cycle. The LCM jumps two steps in the mechanical cycle for each card not required.

FIG. 8 is an elevation view of the wrap side of the mechanical module as viewed from the right-hand side of FIG. 5 and FIG. 6. FIG. 9 is an elevation view of the power drive train and clutches on the burst side of the mechanical module as viewed from the left side of FIG. 5 and FIG. 6. Referring to FIGS. 8 and 6A, power is taken from the motor shaft 265 by means of belt 235, is transmitted in the direction of the arrow to jack shaft 34, card picker shaft 234, and around two idler pulleys to power the intermediate drive belt 236 and index drive belt 237. Power is transmitted in direction of the arrows shown for driving wrap power takeoff shaft 256 and index shaft 255. The card clutch 232 and the index clutch 230 are electromagnetic spring wrapped clutches. The card brake 233 shown in FIG. 6A is mounted directly behind the wrap wall 266 and is locked to card shaft 234. The index brake 231 shown in FIG. 6A is locked to the index shaft 255. The wrap power take-off shaft 256 transfers power through the wrap sidewall to the wrap drive belt 238. The wrap drive belt drives shaft 215 in FIG. 17. The card drive shaft 234 powers the picker assembly drive 155 to the input to the card picker track input shaft 257 (FIG. 8).

FIG. 9 shows the jack shaft 34 exiting the burst wall 264 to transmit power to the burst side of the machine by means of belt 240, driving the upper carrier feed shaft 253 and the lower carrier feed shaft 254. The pulley ratios between jack shaft 34 and carrier feed shafts require two revolutions of the jack shaft for three revolutions of a carrier feed shaft corresponding to the carrier length of 8.5 inches. As seen in FIG. 9, viewed from the burst side of the machine, the jack shaft rotates clockwise and the belt path thereby causes the upper carrier shaft to rotate clockwise when upper carrier feed clutch 245 is energized and the lower carrier shaft to rotate counterclockwise when lower carrier feed clutch 246 is energized. Drive belt 240 also drives burst clutch shaft 252 in a clockwise direction and burst clutch 119 causes the burst belt 118 to rotate the burst crank pin 120 in a clockwise direction (see FIG. 6A). The pulley ratio between burst clutch shaft 252 and burst crank shaft 251 is such that each revolution of clutch shaft 252 will cause one-half revolution of burst crank 251. Burst crank pin 120 is connected to burst link 121 which in turn rotates burst bar pivot shaft 250 by means of burst arm 122. Each revolution of burst clutch 119 and shaft 252 causes one-half revolution of burst crank shaft 251 thereby causing a hole in the burst sense disc 16 to move from the burst up sensor 115 to the burst down sensor 117 causing the LCM to disengage clutch 119.

FIG. 10 shows in perspective the carrier lead-in chute 110, which comprises in cross section a rectangular housing having a center divider therein defining an upper track 136*a* and a lower track 136*b*. These tracks provide space for insertion of the upper carrier stream A into upper track 136*a* and the feed in of the lower carrier stream B into lower track 136*b*. There are a plurality of carrier edge guide pins 127*a*, 127*b*, 127*c*, and 127*d*, which keep the edges of the carriers from getting caught in the tracks at the edges where the walls meet the track floors. The carrier housing has a pair of depending flanges 129 projecting downwardly from each side of the chute. At the approximate center of gravity of the carrier chute, when disposed at the lead-in angle, is a notch 131 which cooperatively receives the lead-in chute pivot rod 134. The pivot rod is mounted in the feed chute support 132. In turn, the feed chute support 132 is pivoted on a support pivot rod 133. This pivot rod 133 is mounted in the central wall 262 and burst wall 264 of the mechanical module frame or base as best seen in FIG. 5. The chute also has a forward or nose portion into which are mounted the feed idlers 111U (the upper carrier feed idler) and 111L (the lower feed idler). These idlers contact the upper feed drive roller 96 which is mounted on drive shaft 253 and lower drive roller 97 which is mounted on its drive shaft 254, respectively. The arrow A in FIG. 10 shows the path of the upper carrier stream A as the carriers are passed between the nip of roller 96 and 111U. The arrow B shows the lower path of the lower carrier stream as it passes through the nip between driver roller 97 and the idler 111L. The entire carrier lead-in chute is biased so that the idler rollers are pressed with appropriate tension against the drive rollers by spring 135 which is attached at one end to the feed chute support 132, and at the other end to the burst plate support 93 (FIG. 12A).

FIG. 13 shows in perspective (with a portion broken away) the positioning of the OCR head 16 with respect to the P panel of an individual carrier 9 as the carrier is being indexed into the P-1 position during the bursting-/indexing operation. As shown, four rows of I-bar code 161, 162, 163 and 164 are positioned as the machine instruction information 124b on the P panel of the carrier. These are printed in appropriate alignment with four rows of sensor/emitter pairs 271, 272, 273 and 274 mounted in block 270. In turn, the block is mounted on the burst plate support 93 by means of pins 275 and 276 secured to either side of the block at the center of gravity thereof. The sensor emitter pairs 271 through 274 correspond to channels 1 through 4 of the OCR head outputs 17 to the LCM 7. As can be seen, a section 277 of the mounting block 270 has been broken away and slid over to show a perspective section view of the channel 3 sensor/emitter pair 273.

The block 270 has been grooved at 278 to receive an optically clear window member 279. Preferably, this window is made of a material such as plastic which is transmissive to the infrared light output from the SSL units. Each sensor/emitter pair or channel comprises a pair of ports 280 and 281 drilled at reflective angles through the block. Port 281 receives an infrared emitting solid-state lamp (SSL) 282 while the port 280 receives a phototransducer 283. Five volts are supplied via line 284 to the SSL's which emit infrared light. This IR passes through the optically clear window 279, and reflects off the OCR quality paper of the panel P of the carrier 9. The output 285 from the phototransducer is supplied to the LCM via line 17. When a bar code mark 286 passes underneath the sensor window in proper alignment with the sensor/emitter pair at channel 3, the dark mark absorbs some of the light and the output 285 varies giving a signal or electronic pulse which is transmitted to the LCM. Arrow 49 shows the relative direction of movement of the carrier. The outputs are processed in the LCM in appropriate circuitry to read the numbers in each column as it passes under the OCR head.

FIG. 14 shows in perspective a partly exploded view of a typical sensor, such as the carrier feed sensor 95, the P-1 pocket sensor 102, the P-2 pocket sensor 103, and the wrap sensor 109. The sensor comprises a V-block 290, a base plate 291 and a top plate 292 secured together by fasteners, such as fastener 293. A port 294 is drilled completely therethrough. The base receives a solid-state lamp 282 and its 5-volt power supply lead 284. Light from the SSL passes through the port, through the V-block opening to a phototransducer 283 mounted in the top plate. The output line 295 from the sensor transducer, like the 4-channels outputs 17 of the OCR head, is directed (see 74 in FIG. 1) to the LCM 7 where it is received as an input to the interface board. When the edge of a carrier 9 enters the V-block opening and intercepts the light path, the presence of the carrier is sensed by the transducer output pulse and is transmitted to the LCM.

FIGS. 15A-C and 16A-C show in plan view and perspective, respectively, a series of views of the operation of the card track assembly 130 and the insert mechanism, including reading the credit cards by the ECR head 13, forwarding them into the laydown door mechanism 22, laying the cards down and inserting them into the carriers 9. FIG. 15A corresponds to FIG. 16A, 15B to 16B, and 15C to 16C. As before, only essential parts changing positions are identified in FIGS. B and C of these series. The card track assembly 130 is mounted above the insert mechanism (load bucket) 21. The drive mechanism, having been shown above in FIGS. 1, 5, 6, 8 and 9, is omitted for clarity. A first card 8a has just been inserted in pocket 24 of carrier 9 ith the insert wire 184 near the end of its stroke and the picker flag 152 at its home position in the insert sensor 153.

Note in FIG. 15A-C the read position of the ECR head fingers is shown by the arrow 13. A second card 8b is in position in the ECR head just prior to a picker stroke that would advance the card through the card read station 13 and collect data for transmission via input line 20 to the LCM. The picker/drive assembly 10 drives the laydown assembly 22 and the insert mechanism 21 and is kept in proper timing sequence by ribbon insert cable 182 passing from picker drive 10 to the insert spool 181 (having a torsion spring rewind action), and laydown ribbon cable 158 from the picker drive 10 to the laydown spool 157 (also having a torsion spring rewind). The picker/drive assembly cycles back and forth from the forward "insert" position of FIGS. 15A and 16A to the back "read" position of FIGS. 15B and 16B and back again to the front, FIGS. 15C and 16C showing the picker drive being halfway back to the "home" or insert position. As the picker oscillates or cycles, the laydown and insert spools are rotated by the cables and their internal torsion springs. The laydown and insert mechanisms are coupled to those drive spools as described below.

As the picker drive 10 cycles, the laydown spool 157 rotates and actuates the laydown door pusher arm 195 to rotate the laydown door 22 on its pivot rod 196. This is best seen by comparing FIGS. 15B/16B with FIGS. 15C/16C. In these figures, the tapered laydown door pusher pin 197 contacts the outer edge 195a of the laydown door pusher arm 195. The laydown spool 157 rotates counterclockwise (as seen in FIGS. 15B and 15C) due to the unwinding of the cable 158 during pull of the picker drive on the return stroke of the picker flag 152. The pusher arm 195 pivots on pusher arm pivot 198 mounted on the laydown door 22. This pushes the door over to a horizontal position until card release tab 260 comes into contact with the card release notch 261 in the center wall of the mechanical module frame 262. See FIGS. 15C/16C which show the card 8b having just been released and dropping down onto the load bucket insert plate 180.

During this time, the insert spool 181 (connected to the picker drive assembly 10 by cable 182 passing around idler 204), has rotated approximately 180°. Note the position of insert crank drive pin 185 and its rotation in the direction of the arrow shown in FIG. 16C to the position shown in FIG. 16A. The insert crank drive pin 185 as shown in FIG. 16C just commences to contact the insert crank 183. In turn, the crank actuates the insert wire 184 which travels in slot 189 in the load bucket insert plate 180. As best shown by comparing FIGS. 16C with 16A, as the insert spool 181 continues to rotate, the pin 185, crank 183 and insert wire 184 assembly pushes card 8a into the pocket 24 of carrier 9. During this time, the laydown door has returned to its vertical position by means of a torsion retraction spring (not shown) and is ready to receive the next card 8b.

Card 8b is pushed through the ECR read station by the next card in the card stack by the picker finger 150 (shown in FIGS. 6A through 6C). At the end of the insert stroke, (FIGS. 15A/16A), the spool 181 and crank pin 185 reverse direction as the picker returns to its start position and the load bucket insert plate is cleared for receiving the next card. When the spool 181 reverses direction on rewind (cycling of picker/drive flag 152 back to the read sensor position 154, compare FIGS. 15A/16A to 15B/16B), the insert crank return pin 203 contacts the right side (as seen in FIG. 15A) of the insert crank 183 bringing it and the insert wire back to the cleared position of FIGS. 15B/16B. The cycle then continues with advance of the carrier, laydown of the card 8b and insert into pocket 28.

The picker operation is as follows: picker 150 travels in slot 249 formed by spacing apart the upper portion 192a of the card track from the lower portion 192b. In FIGS. 15A–C, the upper portion 192a has been removed for clarity. Cards 8 are biased to the face of the card track by pusher block 19. The cards are read by ECR fingers traversing the back side of the card embossings, i.e., the cards are "read" face down. Accordingly, the card track 192 has grooves for clearance of the embossings thereon, and includes a guide groove 194 for passage and tracking of the type "7B" font across the ECR head.

Referring to FIG. 15A, the picker 150 has at its forward end a card picking notch or shoulder 247 (called Hook 1) which removes the card, here 8c, from the stack and passes it into the ECR read station, card 8c pushing card 8b across the ECR read head fingers (arrow 13), and data is transmitted to the LCM via line 20 (FIG. 16A). The picker 150 is pivotally attached to the picker/drive 10 by picker pivot wire 244 which is spring biased toward the track by picker spring 241.

As the picker travels toward the back, compare FIGS. 15A with 15B, picker cam pin 243 contacts picker cam 242 on the back of the track. The picker nose with notch 247 (Hook 1) pivots away from the track, leaving card 8c in the position shown (same as card 8b in FIG. 16A) just ahead of the ECR read head fingers. By the pivoting action, overstroke and last card notch 248 has contacted the rear edge of card 8b, pushing it entirely into the card laydown door 22. At the same time, picker flag 152 has interrupted read sensor 154. This position is as seen in FIGS. 15B/16B. Pulse transmitted via line 74 lets the LCM "know" the machine has a card in the laydown position. The LCM compares the prior OCR-read carrier input/instruction data with the data on the card just read by the ECR. If there is a data match, the LCM activates the accept-/reject solenoid 156. This retracts a clapper, letting the pusher arm drop onto the laydown spool where it is contacted by the pusher pin 197 causing card to be laid down (FIGS. 15C/16C) as the picker/drive 150 with its flat 152 returns to the home "insert" position 154 (going from FIGS. 15C/16C back to 15A/16A). If the card does not match, the solenoid 156 is not activated, the arm does not drop down, and there is no laydown. The "rejected" card remains in the door. Then when card 8c is advanced on the next stroke, it pushes the rejected card into the reject hopper 25. On return of the flag to home, the insert sensor 153 is interrupted, a pulse goes to LCM 7 advising of insertion stroke completion and the cycle is then repeated.

Card track 192 has a step 267 just downstream of the ECR head to assist in the overstroke notch catching the card. This is important so that when the card is the last one in a batch, the hook #2 can push the card through to the laydown door without assist of any other cards. The laydown spool also has an override wire 199 which raises the pusher arm 195 into position to contact and be retrained by the accept/reject solenoid 156 when the spool unwinds (travel from 15C back to 15A). It also is a safety raising the door in the event the accept/reject solenoid is activated too long or sticks in an energized position.

FIGS. 27A and 27B are enlarged section views through the P-1 pocket position of the insert mechanism 21. The P-1 pocket sensor 102 is aligned with port 298 in index floor 101 so that it signals the LCM when carrier 9 is indexed into the P-1 pocket position. As the carrier glides into the P-1 pocket position, that lateral motion being outwardly from FIG. 27A toward the viewer, the pocket 24 is opened at 190 by long tongue 188 which at its right end (as seen in FIG. 27A) is fastened to the bottom of the load bucket insert plate 180 (not shown). Initial card position is in phantom, final in solid. As shown, card 8 is pushed by the insert wire 184 from right to left as the insert wire travels along slot 189 in the load bucket insert plate 180. The front (left) edge of the card contacts the insert card deflector 186 and into the open pocket 190, deflecting the long tongue to position 188'. As the right-hand end of the card 8 reaches the left-hand end of the load bucket insert plate 180, it falls off and downwardly to the position 8a. When this occurs, the weight of the card pulls the pocket 24 downwardly. In order to hold the pocket open for insertion of a second card, FIG. 27B, short tongue 187 is provided to catch the tip 191 of the pocket, holding it open for insertion of a second card. After the second card is inserted, the carrier is again indexed to the P-2 pocket position and a card, if called for, is inserted. I should be understood that in a 2-card issue, one card is placed in each of the P-1 and P-2 pockets, 24 and 28. If three cards are called for, two cards go in the P-2 pocket 28 and one in the P-1 pocket 24. Where four cards are called for in a 2-pocket carrier, two cards are placed in each pocket.

FIGS. 17A and 17D show in perspective the operation of the wrap station 140. Mounted on wrap drive frame 141 is the wrap roller assembly 142. Power comes in from the wrap side of the mechanical module frame as described above in FIG. 8. In FIG. 17A, the outer O panel of carrier 9 has been pushed by the wrap fingers 202 (as best shown in FIG. 6A) between the upper floating pinch roller 205a and the belt 221 carried by the pinch pulley 208a. The carrier has then been drawn into the nip between the upper wrap roller 206a and the floating wrap pulley 209a. Note that the floating wrap pulley 209a is offset to the left (rearwardly) of the upper wrap roller 206a. This causes the leading edge 18 of the O-panel to become deflected at an angle upwardly to be received by the wrap bar 143.

As best seen in FIG. 17B, the forward edge of the O-panel has now progressed all the way up the wrap bar 143 to catch in the wrap bar pocket 225. By comparing FIGS. 17B with 17C, it can be seen that the warp bar then commences pivoting around wrap bar pivot shaft 144 as shown by arrow 228. Wiper lip 226 at the lower edge of the warp bar 143 creases and folds the O-panel over the card 8b, the M panel and the P panel as shown by arrow 30. The wrapping is completed with the carrier passing between the output roller 207a and the output pulley 210a. The tension on belt 221 may be adjusted by moving the belt tension bracket 220 forward or backward in the slots 222 and securing it in position by screws 223 (see FIG. 17A).

Power for the wrap station comes through the sidewall 266 of the frame via shaft 215 on which are mounted the pinch pulleys 208a and b. This shaft is fixed at its ends into the sidewalls 266 and 262, Wrap pulley arms 217a and 217b, one being on each side of the wrap drive assembly, is pivoted around shaft 215, and biased upwardly by springs 218a and b, respectively. At the other end of the wrap pulley arm 217a is mounted shaft 216 which carries the free floating wrap pulley 209a. The output roller shaft 214 and output pulley shaft 219 are fixedly mounted in the belt tension bracket 220. The upper floating pinch rollers 205a and b are mounted on pinch roller shaft 211 which is retained in downward depending end-flanges of the pinch roller plate 213. This plate is pivoted on shaft 212 which also carries the upper wrap rollers 206a and b. The shaft 212 is secured into the sidewalls 266 and 262 in a fixed position.

The assembly of wrap rollers and pulleys is a reverse floating arrangement. That is, the upper pinch roller floats as shown by arrow 224, while the lower wrap pulleys float as shown by arrow 227. The pinch roller plate is pressed downwardly from above by the reject tray 25 which is mounted above it. Thus, when the leading edge 18 of a carrier 9 approaches the pinch rollers 205, the edge is caught in the nip with the pinch pulleys 208. This draws-in the flexible O panel of the carrier. When this flexible panel is drawn far enough in to reach the nip between the upper wrap rollers 206 and the lower floating wrap pulleys 209, it will bend and be directed upwardly to the wrap bar pocket 225 as above described. However, when the credit card 8b passes through the nip of the pinch roller and pinch pulley, it is sufficiently stiff to deflect these upwardly against the pressure from the reject tray. Likewise, when the credit card reaches the nip between the wrap roller 206 which is fixed vertically, and the floating wrap pulley 209, its rigidity can cause the floating wrap pulley 209 to deflect downward. The credit card should not be deflected upwardly and follow the line of travel of the O panel toward the wrap bar pocket 225. Because the upper wrap rollers 206 are fixed and only the floating wrap pulleys 209 deflect downwardly, the credit card can continue horizontally without change of direction and the wiper lip 226 can fold the O panel back over the M and P panels and the credit card. The completely folded carrier as seen in FIG. 17D is then ejected into the wrap carrier output hopper 31 as shown by the arrow 229.

LOGIC COMMAND MODULE—CONSTRUCTION AND OPERATION

Referring first to FIG. 18 and then to FIGS. 19–26, the operation of the logic command module 7 and associated circuitry will be described in detail. Referring to FIG. 18, the logic command module 7 is seen to include the display 76, the control keyboard assembly 75 and a logic module 400. The LCM 7 receives operator commands on leads 319 through operation of the keys or switches of the control keyboard assembly 75 including the mode selection switches 318, the display control switches 320 and the manual control switches 322. The logic module 400 also receives input signals from the machine function or status sensors 74 and account data signals from the OCR read head 16 and the ECR read head 13. In accordance with these various input signals, the machine operations and program contained therein, the logic module 400 provides suitable output signals to six of the machine clutch drivers 402 at appropriate times to effect the desired functions performed by the mechanical module. The logic module 400 also provides suitable signals to display 76 and signals on outputs 403 to status indicator lamps (not shown in FIG. 18) associated with various ones of the keyboard control switches 75. The logic module 400 also provides a suitable output signal to an audio alarm circuit 356 upon occurrence of alarm conditions.

Power is applied to logic module 400 through a power on/off switch 358. A mechanical hour meter 360 is energized whenever power is applied to logic module 400 through power on/off switch 358 to keep a continuous time record of operation of the logic module 400. A mechanical carrier counter 361 is incremented by one count in response to each sensing operation of the carrier feed sensor 95 to keep a continuous count of the total number of carriers processed by the logic module 400. Likewise, a mechanical card counter 362 is incremented by one count in response to each sensing operation performed by the read sensor 154 to keep a continuous count of the total number of cards processed by the logic module 400.

Referring to FIG. 7, the keyboard control inputs 319 are derived from mode selection input switches 318, display control input switches 320 and manual control input switches 322. All of these keyboard switches are conventional push-push, single-throw switches. The switches have translucent covers bearing the labels shown in FIG. 7, and described below. Associated with each switch is a status indicator lamp which illuminates its associated switch cover and label when energized to provide visual status indication to the operator, as will be described in more detail hereinafter. All of the keyboard control input signals are generated in response to manual actuation of these push button switches.

The mode selection switches include a stop switch 404, a step switch 406, an auto switch 408 and a run next batch switch 410. Actuation of the stop switch 404 provides a signal to logic module 400 to place it in a stop mode in which it immediately causes termination of all mechanical functions of machine operation. In addition, when the logic module 400 is placed in the stop mode, a stop lamp circuit 492, FIG. 19B, is energized to provide a visual indication to the operator that the machine is in the stop mode. As will be described below, conditions occurring during operation may also result in the logic module 400 reverting to the stop mode. When this occurs, the audio alarm 356 is energized to alert the operator. In addition, certain memories contained within the logic module 400 are cleared when in the stop mode.

The remaining mode selection switches also enable an operator to manually change the mode of operation. Actuation of the auto switch 408 causes a signal to be applied to the logic module 400 to cause it to automatically and repetitively step through a multi-step cycle of operation which will be described below with reference to FIG. 20. Actuation of the step switch 406 likewise applies a signal to the logic module 400 to cause it to advance the machine through the various steps of the multi-step cycle of operation, so long as the step switch is manually held in its actuated position. If the step switch 406 is only briefly actuated, the machine will be caused to increment through only one step of the cycle of operation. Actuation of the run next batch switch 410 results in a signal being applied to logic module 400 to cause it to continue automatic operation after the end of a batch of cards which it would otherwise not do.

Referring still to FIGS. 7 and 18, the display control switches or keys 320 include an OCR switch 412, an ECR switch 414, a batch total switch 416 and a batch reset switch 418. Briefly, actuation of the OCR switch 412 causes the logic module 400 to cause the display 76 to display the information being read by the OCR head 16. Actuation of the ECR switch 414 causes the logic module 400 to provide signals to display 76 to display the information being read by the ECR head 13. Likewise, actuation of the batch total switch 416 causes the logic module 400 to provide input signals to display 76 to display the total number of carriers and cards processed in a batch which has been stored in a batch total portion of a random access memory of the logic module 400 shown in FIG. 19B. Finally, actuation of the batch total reset switch 418 causes the logic module 400 to clear or reset the batch total portion of its random access memory (shown in FIG. 19A).

The manual control switches or keys 322 enable an operator to manually control operation. These switches comprise an upper feed switch 420, a lower feed switch 422, a burst switch 424, a card switch 426 and an index switch 428. Actuation of the upper feed switch results in application of a signal to the logic module 400 to cause it to energize the upper carrier feed clutch driver 245. Likewise, actuation of the lower feed switch 420 results in the logic module 400 energizing the lower carrier feed clutch driver 246. Actuation of the burst switch 424 provides a signal to the logic module 400 which causes it to energize the burst clutch driver 119. Similarly, actuation of the card and index switches 426 and 428 results in appropriate signals being applied to logic module 400 to cause it to energize the card clutch driver 232 and the carrier index clutch driver 230, respectively.

An important aspect of the present invention is that the logic module 400 is continually being provided with feedback information indicating the status of various mechanical functions or steps performed by the machine under control of the logic module 400. This enables the logic module 400 to commence operation at any one of the steps of the multi-step sequence of operation described below with reference to FIG. 20. This machine function or status feedback information is provided to the logic module 400 through seven machine function or status sensors 74. Each of these sensors provide a signal to the logic module 400 when the mechanical function commanded to be performed by the logic module 400 has been completed. Only after the step has been completed will the logic module 400 advance to the next step of operation. These status sensors 74 comprise the read sensor 154, the insert sensor 153, the carrier feed sensor 95, the burst up sensor 115, the burst down sensor 117, the pocket one or P-1 pocket sensor 102, the pocket two or P-2 pocket sensor 103 and a wrap sensor 430.

Briefly reviewing the operation of these sensors, the read sensor 154 comprises a photosensor located on the card track to provide an input signal to the logic module 400 in response to the card picker mechanism 10 moving to a position indicating that a card has passed through the ECR read head 13 and that ECR data is complete. The insert sensor 153 likewise comprises a photosensor located along the card track having substantially the same structure as the read sensor 154. The insert sensor 153 senses when the card picker mechanism 10 has returned to its home position to provide a signal to the logic module 400. Based on this information, the logic module 400 makes a decision as to whether the picker mechanism 10 should be cycled to advance the next card through the ECR head 13. The carrier feed sensor 95 provides a signal to the logic module 400 whenever a carrier has reached the burst station and is ready for the burst operation described above with reference to FIGS. 11A-C and 12A-C. The burst up sensor 115 and burst down sensor 117 provide input signals to the logic module 400 respectively in response to the burst bar being in an up position and in a down position. When a bursted carrier has moved to the pocket one position, the pocket one sensor 102 provides an input signal to the logic module 400 to indicate same. Likewise, the pocket two or P-2 sensor 103 provides an input signal to logic module 400 in response to sensing that a bursted carrier is in the correct position at pocket two. Finally, a wrap sensor 430, while not coupled to the logic module 400, does provide an input signal to the wrap clutch driver 64 in response to sensing a completed carrier at the wrap station ready for the wrap operation.

The last type of information received by the logic module 400 is account information or data. Account data is provided by the OCR head 16 and the ECR read head 13, briefly described above and described in more detail in copending application Ser. No. 723,215 entitled "Embossed Character Reader" of James E. Hill and Baesley I. Dahlstrom, assigned to the assignee of the present invention. The OCR head 16, in addition to providing account number information to the logic module 400 for comparison with the account number of the associated carrier, reads batch count information provided on the last carrier of a batch of carriers. The logic module 400 responds to this information to display batch totals and to terminate operation unless the run next batch switch 410 has been actuated. The OCR head 16 also provides card count information to the logic module 400 which indicates the number of cards to be inserted into the carrier being read. The ECR head 13, in addition to providing account number information for comparison by the logic module 400, also indicates to the logic module 400 when a card is in a ready position to be advanced through the ECR read head 13.

Referring now to FIGS. 19A and 19B, the logic module 400 is seen to include a single board computer or SBC, FIG. 19A, and two 8-bit, input/output (I/O) ports 434 and 436. The I/O ports 434 and 436 are provided to expand the input/output capability of the SBC 432. In the preferred embodiment, the SBC 432 comprises an SBC 80/10 Single Board Computer purchased from Intel Corporation of Santa Clara, Calif. Since the SBC 80/10 is available from Intel Corporation, and the circuit details thereof form no part of the present invention, the details thereof are not discussed herein. However, reference may be had to the SBC 80/10 Single Board Computer Hardware Reference Manual, 1976 edition, published by Intel Corporation if a description of the circuit details is desired. Briefly, as seen in FIG. 19A, the single board computer 432 includes a central processing unit or CPU 438, a random access memory or RAM 440, a programmable read only memory or PROM 442, a set of memory buffers 444 and parallel I/O interface circuitry 446. The RAM 440 and PROM 442 are interconnected through a memory bus 448. The CPU 438 is connected with the RAM 440 and PROM 442 through an internal bus 450 and through memory bus buffers 444. In addition, the CPU 430, RAM 440 and PROM 442 are connected to external circuitry through parallel I/O interface circuit 446, FIG. 19A, and I/O ports 434 and 436, FIG. 19B.

While the hardware of the Intel 80/10 single board computer 432 is not a part of the present invention, the program burned into programmable read only memory 442 which causes the computer to function in the manner which will be described below does form a part of the invention. The general nature of this program will become apparent from the following description of operation and a listing of the preferred program itself is attached hereto as Appendix A, incorporated herein, and is available to the public in the file wrapper of this application. The program is written in assembly language in a manner described in Volumes 1 and 2 of the May 1974 preliminary edition of the "Programming Manual for the 8080 Microprocessor System" published by and available from Intel Corporation.

The Intel ® single board computer 432 includes a plurality of terminals which may function as either input terminals or output terminals depending upon the program in PROM 442. Those terminals are designated on the Intel single board computer by numerals with alphanumeric prefixes J1, J2 and P1. These terminal designations are shown in FIG. 19A of the drawing. Input terminals are designated by an arrowhead pointing into the terminal, and output terminals are designated by an arrowhead pointed away from the terminal.

As seen in FIG. 19A, the carrier feed sensor 95, the burst up sensor 115, the burst down sensor 117, the read sensor 154, the insert sensor 153, the P-1 sensor 102 and the P-2 sensor 103 are respectively connected to input terminals J2-43, J2-45, J2-47, J2-49, J2-41, J2-39 and J2-37. The output of the carrier feed sensor 95 is also connected to the carrier counter 361 to keep track of the total number of processed accounts. Likewise, the output of the read sensor 154 is connected to the input of card counter 362.

The upper feed clutch driver 245, the lower feed clutch driver 246, the burst clutch driver 119, the index clutch driver 230 and its associated index brake driver 452, the card clutch driver 232 and its associated card brake driver 454 and the accept or match solenoid driver 156 respectively receive input signals through lines connected with output terminals J1-43, J1-41, J1-45, J1-47, J1-39 and J1-37 of the Intel single board computer 432.

The indicator lamps associated with the keyboard control switches, schematically illustrated in FIG. 18, include an upper feed lamp 458, a lower feed lamp 460, a batch total lamp 462, a burst lamp 464, a card lamp 466, a run next batch lamp 468, an OCR lamp 470 and an ECR lamp 472 respectively connected with output terminals J2-5, J2-7, J2-9, J2-3, J2-11, J2-13, J2-15 and J2-17.

Referring to FIG. 19B, energization of an additional set of indicator lamps 474 is controlled by the single board computer 432 through control of I/O port 436. Both I/O port 436 and I/O port 434 comprise 8212 8-Bit Input/Output Ports made by Intel Corporation. These I/O ports 434 and 436 may be purchased from Intel Corporation, and the detail circuitry thereof forms no part of the present invention. However, if further information is desired, reference may be had to pages 10-114 through 10-127 of the 1977 Data Catalog published by Intel Corporation.

Briefly, the I/O port 436 is operated to function exclusively as an output port. SBC 432 causes energization of a selected one of the set of indicator lamps 474, FIG. 19B, by addressing I/O port 436 while providing appropriate signals on the data bus lines 476. Data bus lines 476 labeled DO-D7 are respectively connected to terminals 73, 74, 71, 72, 69, 70, 67 and 68 of single board computer 432 and to inputs DI1 through DI8, respectively, of I/O port 436. The I/O port 436 is addressed through the application of signals to appropriate ones of address lines 478. The address lines 478 labeled INIT, IORC, ADR7, ADR6, ADR5, ADR4, ADR0, ADR1, IOWC and XACK which are respectively connected to terminals P1-14, P1-21, P1-52, P1-51, P1-54, P1-53, P1-57, P1-58, P1-22 and P1-23 of SBC 432. The I/O port 436 has two device select inputs labeled DS1 and DS2. When DS1 is in a logic zero state and DS2 is in a logic one state, the I/O port 436 is addressed for device selection. This is achieved whenever 0-state signals are applied to all five inputs of a NOR gate 480 having its output connected to input DS2 and a 0-state signal is applied to input DS1. Address line ADR5 is coupled to one of the inputs of NOR gate 480 through an inverter 482. Thus, I/O port 436 is addressed when 0-state signals are applied to address lines ADR7, ADR6, ADR4, ADR1 and IOWC and a 1-state signal is applied to address line ADR5.

The set of indicator lamp 474 include an index lamp circuit 484, a batch reset lamp circuit 486, an auto lamp circuit 488, a step lamp circuit 490 and a stop lamp circuit 492, respectively connected to outputs of I/O port 436, D01, D02, D05, D06 and D07. The audio alarm circuit 356 is connected with an output D08 of I/O port 436. As indicated, to provide an energization signal to a selected one of indicator lamps 474 or alarm circuit 356, the I/O port 436 is addressed and a signal is applied to a corresponding one of the data bus lines D0-D7. For example, to energize batch reset lamp circuit 486 connected with output D02, a select signal is applied to input DI2 of I/O port 436. To clear the selection, a suitable signal is applied to address line INIT which is coupled to an input CLR of I/O port 436.

The I/O port 434 is connected to function solely as an input port. It has outputs D01-D08 respectively connected to data bus lines 436 labeled D0 through D7 and has inputs DI1 through DI8 respectively connected with ECR head sensors ECR1, ECR2, ECR3 and ECR4 and to OCR head sensors OCR1, OCR2, OCR3 and OCR4, respectively. Like the I/O port 436, the I/O port 434 is addressed when a 0-state signal is applied to its device select input DS1 and a 1-state signal is applied to its device select input DS2. The DS2 input is taken from the output of a NOR gate 484 having five inputs respectively connected to address lines ADR7, ADR6, ADR5, ADR4 and ADR0. The DS1 input is directly connected with the address line IORC. In addition, the I/O port 434 has a mode input MD connected with ground which causes the output buffer state to be determined by the logic states of DS1 and DS2. When I/O port 434 is addressed, signals from the ECR and OCR heads applied to inputs D11 through D18 result in corresponding output signals to be applied to data bus lines D0 through D7 coupled to the single board computer 432. The I/O ports 434 and 436 are, of course, not addressed at the same time. Accc dingly, the data bus lines 436 are sometimes used to receive ECR and OCR information and at other times to transmit select signals for actuation of the set of indicator lamps 474 or the alarm circuit 356.

Referring to FIG. 21, a schematic wiring diagram of the carrier index clutch driver 230 and its associated index brake driver 452, previously shown in block form in FIG. 19A is shown. The carrier index clutch driver 230 is seen to include an NPN transistor 485 having its emitter coupled with ground and its collector connected through an index clutch coil 487 to a source of positive D.C. potential V+. The base of transistor 485 receives input signals through a resistor 489. A diode 491 is connected in parallel with coil 487 in a reverse polarity direction with its cathode coupled to the D.C. source of potential V+ and its anode connected to the collector of transistor 485 to suppress inductive spikes.

The carrier index brake driver 452 similarly comprises an NPN transistor 495, an index brake coil 493, a diode 494 and a base resistor 496 connected in a similar fashion as transistor 484, diode 490 and index coil 486 and resistor 488. In addition, the carrier index brake driver 452 includes an inverter 498 connected between the input of carrier index clutch driver 230 and resistor 496.

Whenever a logic 1-state signal is applied to the input of the carrier index clutch driver 230, transistor 485 switches on to conduct energizing current through coil 487 to engage the clutch. At the same time, the 1-state signal applied to the input of carrier index clutch driver 230 is inverted by inverter 498 which applies a 0-state signal to the base of NPN transistor 495. This places transistor 495 in cut-off and deenergizes the brake coil 493. Conversely, when a 0-state signal is applied to the input of the carrier index clutch driver 230, transistor 485 turns off to deenergize coil 487 and transistor 495 turns on to energize the brake coil 493.

The circuitry of each of the upper feed clutch drivers 245, the lower feed clutch driver 246, the burst clutch driver 119, the card clutch driver 232 and the accept or match solenoid driver 158 is substantially identical to and operates in substantially the same manner as the carrier index clutch driver circuit 230 described above. Likewise, the index brake driver circuit 452 is identifical to that of the carrier index brake driver 454 and functions in substantially the same manner as described.

Referring to FIG. 22, a circuit schematic of a representative one of the various lamp drivers shown in FIGS. 19A and 19B, such as upper feed lamp driver 458, is seen. Each of the lamp driver circuits are substantially identical and operate in substantially the same manner as described below. Each of the lamp driver circuits has a lamp 500 connected in series between a source of D.C. potential B+ and the collector 502 of an NPN transistor 504. The emitter transistor 504 is connected to ground and the base is connected through a resistor 506 and a diode 508 to the input 510 of the circuit. A pull-up or base bias resistor 512 is connected to the junction between diode 508 and resistor 506 to D.C. potential source B+. When a 0-state signal is applied to input 510, diode 508 assumes a conductive state to couple ground to resistor 506. Transistor 502 in response to this 0-state signal applied to its base is maintained in a cut-off condition to keep lamp 500 in an off condition. When a 1-state signal is applied to input 510, on the other hand, the 1-state signal resulting at the base of transistor 504 causes it to assume a conductive state and current is conducted through lamp 500 causing it to emit light.

Referring to FIG. 23, a schematic diagram of a preferred circuit for the carrier feed sensor 95, burst up sensor 115 and burst down sensor 117 is shown. Each of these sensors include a source of light 514 provided by a light emitting diode 516 connected between ground and a source of positive D.C. potential B+ through a resistor 518. When the light 514 impinges the base junction 520 of a phototransistor 522, transistor 522 turns on and couples the D.C. voltage B+ to the junction between an emitter resistor 524 and a base resistor 526. This 1-state signal is applied through resistor 526 to the base of an NPN transistor 528 which has its emitter connected to ground and its collector connected to the source of D.C. potential B+ through a load resistor 530. A capacitor 532 coupled between the collector and base of transistor 528 functions to filter high frequency noise. Transistor 528 turns on in response to the 1-state signal applied to its base and couples a 0-state signal to the input of a Schmitt inverter 534. This causes the inverter 534 to produce a 1-state signal on its output 536. When a mask is placed between the light emitting diode 516 and the base 520 of transistor 522, such that light 514 does not impinge upon the base 520, phototransistor 522 switches off. This causes transistor 528 to turn off and couple a 1-state signal to the input of inverter 534. Schmitt inverter 534 in response to the 1-state signal generates a 0-state signal on its output 536.

The P1 sensor 102 and the P2 sensor 103 have circuits substantially identical to that of FIG. 23, except that the output signal produced on output 536 is amplified and inverted by an additional inverter circuit receiving its input from the output of Schmitt inverter 534. The wrap sensor 430 likewise is embodied in a circuit substantially identical to FIG. 23 except that Schmitt inverter 534 is lacking and the output is taken directly off of the collector of transistor 528.

Referring to FIG. 24, a schematic of the preferred circuit for the read sensor 154 and insert sensor 153 is shown. A source of light 538 is provided by a light emitting diode 540 connected between ground and the source of D.C. potential B+ through a resistor 542. When the light 538 is not blocked from impinging the base 544 or an NPN phototransistor 546, the phototransistor 546 switches to a conductive state. This causes a 0-state signal to be applied to a junction 548 between a resistor 550 connected to the D.C. source B+ and a diode 552. The cathode of diode 552 is connected to one side of a resistor 554, the other side of which is connected to the base of an NPN transistor 556. Transistor 556 has its emitter connected to ground and its collector connected to the D.C. potential source B+ through a collector resistor 558. A filter capacitor 560 is coupled between the collector and base of transistor 556.

When light is impinging phototransistor 546, diode 552 is reverse biased and a 0-state signal is applied to the base of transistor 556 to cause it to assume a nonconductive or off state. When transistor 556 is off, a 1-state signal is applied through resistor 558 to the input of Schmitt inverter 562 which generates a 0-state signal on its output 564. When the light 538 is blocked and prevented from impinging base 544, transistor 546 turns off, and a 1-state signal is applied to the base of transistor 556. Transistor 556 turns on in response to this 1state signal to apply a 0-state signal to the input of Schmitt inverter 562 which, in turn, generates a 1-state signal on its output 564.

Shown in FIG. 25 is a detailed schematic of a preferred circuit for each of photosensors ECR1, ECR2, ECR3 and ECR4 previously shown in block form in FIG. 19A. When light 566 is permitted to impinge the base 568 of a phototransistor 570, it turns on to couple a source of D.C. potential B+ at its collector to a junction 572 connected to its emitter. This 1-state signal at junction 572 is applied to the base of another NPN transistor 574 which turns on in response thereto. A variable resistor 576 connected between the emitter and base of transistor 574 is provided to make response sensitivity adjustments for transistor 574. When transistor 574 turns on, the source of D.C. potential B+ is coupled through a resistor 580 to the base of another NPN transistor 582. Transistor 582 has its emitter coupled to ground and its collector connected to D.C. source B+ through a collector load resistor 584. In response to the 1-state signal at its base, transistor 582 turns on and couples ground or a 0-state signal to the input of Schmitt inverter 585 which, in turn, generates a 1-state signal on its output 586. When light 566 is blocked and prevented from impinging base 568 transistor 570 turns off. Transistor 574 also turns off in response to turn off of transistor 570 which causes transistor 582 to also turn off. When transistor 582 turns off, a 1-state signal is coupled through resistor 584 to the input of Schmitt inverter 585 which generates a 0-state signal on its output.

Referring to FIG. 26, a schematic of the preferred circuit for the OCR head sensor blocks OCR1, OCR2, OCR3 and OCR4 of FIG. 19B is shown. A source of light 588 is provided by a light emitting diode 590 coupled between ground and the source of D.C. potential B+ through a resistor 592. When the light 588 impinges the base 594 of an NPN phototransistor 596, transistor 596 turns on to couple ground to a junction 598. Junction 598 is coupled to the base of a transistor 600 through a base resistor 602. A load resistor 604 is connected between D.C. source B+ to the collector of transistor 600. The load of transistor 596 is adjustable through operation of a variable resistor 603 coupled between the collector of transistor 596 or junction 598 and the D.C. source B+ through a fixed resistor 605. When transistor 596 turns on, a 0-state signal is thus coupled to the base of transistor 600 which causes it to turn off. When transistor 600 turns off, a 1-state signal is applied to the input of the Schmitt inverter 606 which, in response thereto, generates a 0-state signal on its output 608. When phototransistor 596 turns off, a 1-state signal is applied to the base of transistor 600 which turns on and applies a 0-state signal to the input of Schmitt inverter 606. Schmitt inverter 606 in response thereto generates a 1-state signal on its output 608.

Referring now to FIGS. 20A through 20G, the sequence of operation performed by the logic module will be described. There are twenty possible steps to the sequence of operation which have been consecutively numbered S1 through S20 in FIG. 20. Operation of the upper feed clutch, FIG. 20A, is associated with ten of the steps, and operation of the lower feed clutch, FIG. 20B, is associated with the remaining ten steps. Thus, for a given carrier there are only ten possible steps to the sequence of operation performed thereon. Each step is associated with energization of one or more of the clutch drivers 402, FIG. 18, and the wrap clutch driver 200.

A particular advantageous feature of the present invention is that because the logic module 400 monitors the status of the machine through the various machine function sensors 74, it can commence operation at any one of the steps of the sequence of operations if the conditions therefor are permitted by the microprocessor program. In addition to the machine status information, the logic module 400 receives card count information through the ECR read head 13 from each of the carriers which indicates the number of cards to be inserted into the particular carrier. At the end of each step of operation, the logic module 400 decides, based on the machine status information and the card count information, whether it should advance to another step, and, if so, which step. The machine will not necessarilly go through all ten steps of operation for a given carrier. For example, the steps necessary for inserting the second and third cards into a carrier are skipped when only one card is indicated for insertion.

Before proceeding to the description of operation, the notations used in FIGS. 20A–20G will be briefly discussed. Each of steps S1–S20 corresponds to 500 milliseconds during which an operational step may be performed. The pulses of FIGS. 20A and 20B represent operation of the upper feed clutch 245 and the lower feed clutch 246, respectively. The pulses labeled DN and UP of FIG. 20C indicate the period of time during which the burst down and burst up operations are performed, respectively, The pulses W/U and W/L of FIG. 20D represent the wrap operations performed on the upper and lower carrier, respectively. The pulses labeled P1, P2 and W of FIG. 20E represent the card index operations performed to move a card to pocket one and pocket two and the wrap station. In addition, the OCR read operation is performed on the carrier during the P1 pulse. The pulses of FIG. 20F labeled I1, I2, I3 and I4 represent card insert operations performed on the first, second, third and fourth cards for a given carrier. Further with regard to FIG. 20F, pulses labeled R1, R2, R3 and R4 respectively represent ECR read operations performed on the first, second, third and fourth cards of a given carrier. The 0-state pulses occurring during the various read steps represent the time periods during which match operations are performed by the logic module 400.

FIG. 20G illustrates the manner in which various steps are skipped depending upon the card count stored in the RAM 440, FIG. 19A. When each carrier is read, the card count information is stored in a card count memory portion of RAM 440. Whenever the logic module 400 compares the card account number with the carrier account number at the end of the card read operation and the numbers match, the count in card count memory is decreased by a count of one. At the end of each insert operation, the logic module 400 reads the card counter and, depending upon the count, decides whether to go to the next step or to skip one or more steps. For example, at the end of step S8, the logic module 400 will cause the mechanical module to advance to step S9 if the card counter contains a count of 3 or 4 ($C = \frac{3}{4}$). If the count is 1 or 2 ($C = \frac{1}{2}$), the machine will be caused to skip steps S9 and S10 and go directly to step S11. If, at the end of step S12, the count is 1 to 2 ($C = \frac{1}{2}$), the logic module 400 will advance to step S13. If, on the other hand, the count is 0 ($C = 0$), the steps S13 and S14 are skipped and the machine advances to step S15.

For security purposes, cards are usually not left in the machine during nonworking hours. Thus, to commence operation both cards and carriers must be loaded. An advantageous feature of the invention is that the logic module 400 through control of display 76 and the various status indicator lamps, will provide instructions to an operator for start up and will also provide diagnostic information to the operator in the event of an automatic termination of operation or receipt of invalid keyboard commands from the operator.

Start up is initiated by application of electrical power to the logic module 400 through manual actuation of power on/off switch 358. Upon initial receipt of power by the logic module 400 a power-up circuit contained therein generates a reset or clear pulse to clear RAM 440 of all information including card count, flag, account number, etc. information. In addition, the PROM 442 is directed to go to the first address to call out an appropriate message, such as "VIS by DYNETICS", for display by display 76. Display of this message indicates to the operator that power is on, and the machine is ready for the next start-up step.

Presuming that the mechanical module contains neither cards nor carriers and the operator then actuates the auto switch 408, FIG. 7, the logic module 400 will cause energization of card clutch driver 232 and deenergization of card brake driver 454 to cause the picker mechanism to perform one operational cycle and attempt to advance a card to the ECR read station. In addition, the burst bar must be in its up position before machine operation can commence. Thus, if the burst bar is not in the up position as indicated to the logic module 400 by burst up sensor 115 and burst down sensor 117, the logic module 400 will cause energization of the burst clutch driver 119 to bring the burst bar to the up position.

Since no cards are in the machine, a card is not placed under the ECR head 13 in response to the card picker operation. All of the sense fingers of the ECR head 13 remain in a down position which indicates to the logic module 400 that a card has not been placed at the card read position. In response to this indication the logic module 400 causes the message "LOAD CARDS" to be shown on display 76 and energizes audio alarm 356 to alert the operator. In addition, the logic module 400 enters into its stop mode and indicates this to the operator by providing a signal to stop lamp circuit 492, FIG. 19B.

Presuming that the operator in response to the load card indication loads the cards into the card hopper, when the auto switch 408 is again actuated, the logic module 400 again causes energization of card clutch driver 232. Since cards have been loaded, the card picker will advance the first card to the read position which will be sensed by the ECR read head 13. In response to sensing that a card has been placed at the read position of the ECR read head 13, the logic module 400 will cause the message "SELECT UPPER/LOWER" to be shown on display 76 and again enters the stop mode.

This directs the operator to actuate either the upper feed switch 420 or the lower feed switch 422. Presuming that the upper feed switch 420 is actuated, the logic module 400 in response thereto will generate a signal to the upper feed clutch driver 245. This will cause rotation of the upper carrier feed roller to attempt to move the upper carrier through the carrier path. If at the end of the carrier feed operation a carrier is not sensed by the carrier feed sensor 95, the logic module 400 in response thereto will terminate energization of the upper carrier feed clutch driver 245 and will cause the message "LOAD UPPER" to be shown on display 76. After the operator has loaded the upper carrier and the auto switch 408 is again actuated, the logic module 400 will again energize the upper carrier feed clutch to advance the upper carrier until it is sensed by the carrier feed sensor 95. The logic module 400 will continue in its automatic mode of operation going through the steps shown in FIG. 20 until the lower carrier feed clutch 246 is energized, and, because lower carriers have not been loaded, a carrier is not sensed by carrier feed sensor 95. The logic module 400 in response to nonreceipt of a carrier feed sense signal will then enter its stop mode and cause the message "LOAD LOWER" to be shown on display 76. Once the lower carrier has been loaded and the auto switch 408 again actuated, the logic module 400 will enter its automatic mode if the other status sensors indicate to the logic module 400 that the machine is in a valid condition for the automatic mode.

Presuming that both cards and carriers are loaded and the auto switch has been actuated, and all of the sensor conditions indicate that to the logic module 400 that the machine is in condition for automatic operation, the logic module 400 will cause the machine to operate automatically as follows. Referring to FIG. 20, it is presumed that the upper carrier has reached the position where it has been sensed by the carrier feed sensor 95 and the upper carrier feed clutch driver 245 has been deenergized. Then, at the beginning of step S6, the logic module 400 will generate a signal to energize the burst clutch driver 119. Actuation of the burst clutch driver 119 will result in the burst bar to travel downwardly through the bursting path to burst the upper carrier form and to move the bursted form away from the carrier feed sensor 95. The burst bar reaching the burst down position is sensed by the burst down sensor 117 to provide an indication of same to the logic module 400. The logic module 400 is response to the burst down sensor signal terminates the signal energizing the burst clutch driver 119. At this time the burst operation is complete at the end of step S6, and further movement of the burst bar is temporarily terminated.

If the carrier has been properly bursted and folded, which will be sensed by the OCR read head, the logic module 400 will generate an output signal to energize the carrier index clutch driver 230 at the beginning of step S7. This will cause the bursted carrier to be moved to the pocket one position and through the OCR read head 16. The card count information and account number on the carrier is read by the OCR head 16 during movement of the carrier to the pocket one position, and this information is fed to the logic module 400 and stored in RAM 440. At the same time, the logic module 400, in response to the burst down sensor signal, generates an output signal to energize the card clutch driver 232. This causes the picker mechanism to pick the next card from the hopper and to move it to the ECR head 13 where the account information thereon is read into the logic module 400 and stored in RAM 440.

Before the end of step S7, the read sensor 154 generates a signal to the logic module 400 indicating that the card has been read by the ECR head 13. In response to this signal, the logic module 400 inhibits further reading of ECR information into the RAM 440. When the card picker returns to its home position, this is sensed by the insert sensor which provides a signal to the logic module 400 indicating same. The logic module 400, based on this information and the count, then makes a decision as to whether the picker should wait or index the next card.

After the end of the ECR reading operation on the first card and before the end of the carrier index operation being formed on the first carrier (i.e., before the end of step S7), the logic module 400 performs its verification or matching operation. First, the raw data from the ECR head is checked to determine if it has the proper number of 21 characters. If so, the raw ECR data is entered into RAM 440. Each three bytes of raw ECR data corresponds to one OCR character. The raw ECR data is decoded through operation of PROM 442 and the central processor unit 438 into the binary code of the OCR data. After this is done, the OCR and ECR data stored in RAM 440 are compared on a character-by-character basis. If the account number of the card matches the account number of the carrier, i.e., a true compare condition results, the logic module 400 stores the number in another portion of RAM 440 for display if desired. In addition, the logic module 400 at the end of step S7 generates a signal in response to the P-1 sensor 102 to energize the burst clutch driver 119 to cause the burst bar to return to its up position. Upon reaching the up position, the burst up sensor 115 generates a signal to the logic module 400 which causes it to deenergize the burst clutch driver 119 and terminates further movement of the burst bar.

The logic module 400 also generates a signal at the beginning of step S8 in response to the true compare and to a signal from the insert sensor 153 to generate an output signal energizing accept solenoid driver 156. This causes the card laydown function to be performed to initiate insertion of the first card into the first pocket of the first carrier. When the card reaches the wrap sensor 430, the wrap sensor automatically generates a signal to energize the accept solenoid driver 156 to cause card insertion.

At the end of step S8, the logic module 400 then checks the count in the card counter memory portion of RAM 440. If the card count is three or four, the carrier is held in the pocket one position and the card clutch driver 232 is energized to cause advancement of the next card through the ECR read head 13. Before the end of step S9, a compare or match operation is again performed by logic module 400 and if the compare is true, the necessary operations described above are performed to insert the second card into the first pocket and to decrease the card counter memory by a count of one.

At the end of step S10, the logic module 400 again checks the card counter. If the count is one or two, the logic module 400 advances to step S11. In step S11, the carrier index clutch driver 230 is energized to cause advancement of the carrier to the pocket two position. At the same time, the card clutch driver is energized to advance the third card through the ECR read head 13. Again, a match comparison is made and if the comparison is true, the necessary operations described above for inserting a card in the carrier are performed to insert the third card into the second pocket. Also during steps S11 and S12, the logic module 400 generates a signal to energize the lower carrier feed clutch driver 246 to prepare it for the burst operation subsequently performed after all of the cards have been inserted in the first carrier and the completed carrier moved out of the system.

At the end of step S12, the logic module 400 again checks the card count. If the card count is a one or two, the operations described above are again repeated to insert the fourth card into the second pocket of the first carrier. At the end of step S14, the logic module 400 checks the card count memory, and if the count is zero, step S15 of the operation sequence is performed. At the beginning of step S15, the logic module 400 in reponse to a signal from the insert sensor 153 generates an output signal to energize the accept solenoid 156. This causes the filled carrier to move to the wrap station. Upon reaching the wrap station, the wrap sensor 430 generates a detection signal which is applied to the wrap clutch driver 200. This causes the completed carrier to be moved into the wrap rollers and out of the system. After the end of the step S15, the sequence described above is repeated for the next carrier.

If less than four cards are indicated for insertion in the carrier, not all of the steps described above are performed. Thus, referring again to the end of step S8 of FIG. 20, if only one card is indicated for insertion in the carrier, after the match operation, the card counter of RAM 440 will have a count of zero. Accordingly, at the end of step S8, the program will automatically switch to step S15 whereat the carrier containing the single card is wrapped and moved into the wrap rollers and out of the system. Likewise, if the number of cards to be inserted into a carrier is only two, at the end of step S8, the count in card counter will be a count of one and the program will automatically step to step S11 to insert the second card into the second pocket of the carrier. At the end of step S12, the count in the card counter will be zero, and the program will step to step S15. Finally, if the carrier is to have three cards inserted, after the first card is inserted, the carrier will be moved to the pocket two position, and the second card is inserted into the second pocket during step S12. At the end of step S12, the count in the card counter will normally be one, and the program will advance to step S13 and S14 to insert the third card into the second pocket of the carrier before the wrap operation.

In the event of a mismatch, i.e., a false compare, the logic module 400 will inhibit generation of a signal to energize the accept solenoid driver 156. This will cause the card to be rejected during energization of the card clutch driver 232. In addition, the picker is caused to return to its home position, and the logic module 400 causes the message "MATCH ERROR" to appear on display 76. Further, the logic module 400 energizes the audio alarm 356.

In the event that the operator attempts to command the machine through the keyboard control inputs to perform a function which is invalid, the logic module 400 will degrade to the stop mode. In the stop mode, the stop indicator lamp is lit, the audio alarm is sounded and the logic module 400 causes the message "CYCLE INCOMPLETE" to be displayed. The logic module 400 will also degrade to the stop mode in the event that any of the status sensors fail to give a sense signal within 150% of the time period allowed for completion of the operation to be detected by the sensor. The logic module 400 will also degrade to the step mode in the event that an OCR signal is not received after performance of the burst operation. In the event of the occurrence of a condition resulting in degradation of the logic module to the stop mode, all clutches are immediately deenergized. Occurrence of a condition causing degradation to the step mode, on the other hand, results in termination of further operation only after the completion of the step of the operational sequence being performed.

It should be understood that various modifications within the scope of this invention can be made by one of ordinary skill in the art without departing from the spirit thereof. We therefore wish our invention to be defined by the scope of the appended claims as broadly as the prior art will permit, and in view of this specification if need be.

We claim:

1. Method of automatic verification and insertion of credit cards in carriers therefor comprising the steps of:
   (a) providing carriers to a first station, said carriers having disposed thereon machine readable information relating to an individual cardholder account, said information being selected from information on the number of credit cards authorized for said account, and information uniquely identifying said cardholder or account,
   (b) machine reading at least a portion of said information on said carriers in said frist station,
   (c) providing credit cards to a second station, said cards having thereon machine readable information relating to an individual cardholder or account,
   (d) machine reading said information on said cards in said second station,
   (e) sequentially comparing said card information with said carrier information until a condition of matched information is produced,
   (f) inserting the correct number of properly matched cards into the appropriate carrier in response to said matched information condition.

2. Method as in claim 1 which includes the step of folding said carriers after insertion of said cards therein.

3. Method as in claim 2 which includes the steps of comparing the information of each of said carriers and cards with information on undesired accounts to determine a condition of match, and removing said carriers having cards inserted therein from said sequence in response to said matched information condition.

4. Method as in claim 2 which includes the step of detecting the number of cards in said carriers, and rejecting carriers containing an insufficiency or excess in response to a preselected number of cards for each carrier.

5. Method as in claim 2 which includes the step of insertion of said carriers in mailing envelopes.

6. Method as in claim 5 which includes the step of detecting the number of cards in said envelopes after said carrier has been inserted in said envelopes, and rejecting envelopes containing an insufficiency or excess of cards in response to a preselected number of cards for each envelope.

7. Method as in claim 6 wherein said numbers of cards information is machine read from said carriers when disposed in said envelopes, comparing said numbers information to the detected number in the envelope, and rejecting envelopes on conditions of mismatch.

8. Method as in claim 6 which includes the step of comparing carrier of card information with information on undesired accounts to determine a condition of match, and removing envelopes containing said matched information on cards or carriers from among a plurality of said envelopes.

9. Method as in claim 5 which includes the step of depositing preselected information on said carriers prior to providing said carriers to said first station.

10. Method as in claim 9 which includes the step of applying said information relating to said individual cardholder or account to virgin credit cards.

11. Method as in claim 1 wherein said carriers are provided in a continuous web form, and which includes separating individual ones of said carriers from said continuous web.

12. Method as in claim 11 wherein said carriers are provided two wide in said continuous carrier web, and which includes the steps of:
   (a) separating said carriers into a first and a second one-wide stream, and
   (b) feeding said one-wide streams alternately into said separation means so that individual carriers are separated alternately from said streams.

13. Method as in claim 1 which includes the step of depositing preselected information on said carriers prior to providing said carriers to said first station.

14. Method as in claim 13 wherein said step of depositing includes applying said information on said carrier or to a label applied to said carrier.

15. Method as in claim 14 wherein said operation of applying is selected from printing, embossing, punching and encoding a magnetically susceptible material.

16. Method as in claim 13 wherein said operation of depositing is selected from printing, embossing, punching, and encoding a magnetically susceptible material.

17. Method as in claim 13 which includes the step of applying said information relating to said individual cardholder or account to virgin credit cards.

18. Method of automatic verification and insertion of credit cards to carriers therefor comprising the steps of:
   (a) providing carriers adapted to retain credit cards in association therewith,
   (b) providing credit cards having thereon machine readable information uniquely identifying a cardholder or account,
   (c) inserting the correct number of credit cards into each said carrier in accordance with information on the number of cards authorized for said cardholder or account,
   (d) identifying said carrier with information uniquely identifying the cardholder or account cards inserted therein.

19. The method as in claim 18 in which said step of inserting comprises the step of placing the correct number of credit cards in releasable retentive engagement with the carrier associated therewith.

20. Method as in claim 19 wherein said step of identifying includes depositing information on said carrier.

21. Method as in claim 20 wherein said step of depositing includes applying said information on said carrier or to a label applied to said carrier.

22. Method as in claim 21 wherein said operation of applying is selected from printing, embossing, punching, and encoding a magnetically susceptible material.

23. Method as in claim 20 wherein said step of depositing is selected from printing, embossing, punching, and encoding a magnetically susceptible material.

24. The method as in claim 20 which includes the step of folding said carriers after insertion of said cards therein, and stuffing said carriers into mailing envelopes.

25. Method as in claim 20 which includes the steps of applying said information to virgin credit cards, controlling said identifying of carriers and said information applying to credit cards to provide said carriers and cards in sequence so that said insertion produces a matched condition of said cards and said carriers.

26. Method as in claim 20 wherein said step of depositing occurs prior to said insertion of said cards in carriers.

27. Method as in claim 26 which includes the steps of applying said information to virgin credit cards, controlling said identifying of carriers and said information applying to credit cards to provide said carriers and cards in sequence so that said insertion produces a matched condition of said cards and said carriers.

28. Method as in claim 19 wherein said step of identifying includes depositing information on an envelope into which said carrier is stuffed or on a mailer.

29. Method as in claim 28 wherein said step of depositing includes applying information on said envelope or mailer, or to a label applied to said envelope or mailer.

30. Method as in claim 29 wherein said operation of applying is selected from printing, embossing, punching, and encoding a magnetically susceptible material.

31. Method as in claim 28 wherein said step of identifying is selected from printing, embossing, punching, and encoding a magnetically susceptible material.

32. Method as in claim 19 which includes steps of comparing the information of each of said carriers or cards with information on undesired accounts to determined a condition of match, and removing said carriers having cards inserted therein from said sequence in response to said matched information condition.

33. Method as in claim 19 which includes the step of detecting the number of cards in said carriers, and rejecting envelopes containing an insufficiency or excess of cards responsive to a preselected number of cards for each carrier.

34. Method as in claim 19 which includes the step of insertion of said carriers in mailing envelopes.

35. Method as in claim 34 which includes the step of detecting the number of cards in said envelopes after said carrier has been inserted in said envelopes, and rejecting envelopes containing an insufficiency or excess of cards in response to a preselected number of cards for each envelope.

36. Method as in claim 35 which includes the step of comparing carrier or card information with information on undesired accounts to determine a condition of match, and removing envelopes containing said matched information on cards or carriers from among a plurality of said envelopes.

37. Method as in claim 34 which includes the step of comparing carrier or card information with information on undesired accounts to determine a condition of match, and removing envelopes containing said matched information on cards or carriers from among a plurality of said envelopes.

38. Method as in claim 19 wherein said step of identifying occurs prior to said insertion of said cards in carriers.

39. Method as in claim 38 which includes the steps of applying said information to virgin credit cards, controlling said identifying of carriers and said information applying to credit cards to provide said carriers and cards in sequence so that said insertion produces a matched condition of said cards and said carriers.

40. The method as in claim 39 which includes the step of folding said carriers after insertion of said cards into association therewith, and stuffing said carriers into mailing envelopes.

41. Method as in claim 40 wherein said carriers are provided in a continuous web.

42. Method as in claim 41 wherein said carriers are provided one-wide, and which includes the step of separating individual ones of said carriers from said web.

43. Method of automatic verification and retentive engagement of credit cards in association with carriers therefor comprising the steps of:
(a) providing carriers to a first station, said carriers having disposed thereon machine readable information relating to an individual cardholder account, said information being selected from information on the number of credit cards authorized for said account, and information uniquely identifying said cardholder or account,
(b) machine reading at least a portion of said information on said carriers in said first station,
(c) providing credit cards to a second station, said cards having thereon machine readable information relating to an individual cardholder or account,
(d) machine reading said information on said cards in said second station,
(e) comparing said card information with said carrier information until a condition of matched information is produced,
(f) retainingly engaging the correct number of properly matched cards into association with the appropriate carrier in response to said matched information condition.

44. Method as in claim 43 which includes the step of folding said carriers after engagement of said cards into associated therewith.

45. Method as in claim 44 which includes the steps of the comparing the information of each of said carrier or cards with information on undesired accounts to determine a condition of match, and removing said carriers having cards engaged therewith from said sequence in response to said matched information condition.

46. Method as in claim 44 which includes the step of detecting the number of cards in said carriers, and rejecting carriers containing an insufficiency or excess in response to a preselected number of cards for each carrier.

47. Method as in claim 44 which includes the step of stuffing of said carriers in mailing envelopes.

48. Method as in claim 47 which includes the step of detecting the number of cards in said envelopes after said carrier has been stuffed in said envelopes, and rejecting envelopes containing an insufficiency or excess of cards in response to a preselected number of cards for each envelope.

49. Method as in claim 48 wherein said numbers of cards information is machine read from said carriers when disposed in said envelopes, comparing said numbers information to the detected number in the envelope, and rejecting envelopes on conditions of mismatch.

50. Method as in claim 48 which includes the step of comparing carrier or card information with information on undesired accounts to determine a condition of match, and removing envelopes containing said matched information on cards or carriers from among a plurality of said envelopes.

51. Method as in claim 47 which includes the step of depositing preselected information on said carriers prior to providing said carriers to said first station.

52. Method as in claim 51 which includes the step of applying said information relating to said individual cardholder or account to virgin credit cards.

53. Method as in claim 43 wherein said carriers are provided in a continuous web form, and which includes separating individual ones of said carriers from said continuous web.

54. Method as in claim 43 which includes the step of depositing preselected information on said carriers prior to providing said carriers to said first station.

55. Method as in claim 54 wherein said step of depositing includes applying said information on said carrier or to a label applied to said carrier.

56. Method as in claim 55 wherein said operation of applying is selected from printing, embossing, punching and encoding a magnetically susceptible material.

57. Method as in claim 54 wherein said operation of depositing is selected from printing, embossing, punching, and encoding a magnetically susceptible material.

58. Method as in claim 54 which includes the step of applying said information relating to said individual cardholder or account to virgin credit cards.

\* \* \* \* \*